(12) United States Patent
Claes et al.

(10) Patent No.: US 8,563,624 B2
(45) Date of Patent: *Oct. 22, 2013

(54) CURABLE LIQUIDS AND INKS FOR TOYS AND FOOD PACKAGING APPLICATIONS

(75) Inventors: Roland Claes, Dendermonde (BE); Johan Loccufier, Zwijnaarde (BE)

(73) Assignee: Agfa Graphics NV, Mortsel (BE)

( * ) Notice: Subject to any disclaimer, the term of this patent is extended or adjusted under 35 U.S.C. 154(b) by 337 days.

This patent is subject to a terminal disclaimer.

(21) Appl. No.: 12/739,162

(22) PCT Filed: Oct. 16, 2008

(86) PCT No.: PCT/EP2008/063957
§ 371 (c)(1),
(2), (4) Date: Apr. 22, 2010

(87) PCT Pub. No.: WO2009/053305
PCT Pub. Date: Apr. 30, 2009

(65) Prior Publication Data
US 2011/0124768 A1  May 26, 2011

Related U.S. Application Data

(60) Provisional application No. 60/982,466, filed on Oct. 25, 2007.

(30) Foreign Application Priority Data

Oct. 24, 2007  (EP) .................................... 07119181

(51) Int. Cl.
| | | |
|---|---|---|
| C08F 2/50 | (2006.01) | |
| C08F 2/46 | (2006.01) | |
| C08J 3/28 | (2006.01) | |
| C08J 7/16 | (2006.01) | |
| C08J 7/18 | (2006.01) | |
| C08J 7/04 | (2006.01) | |
| C08J 7/06 | (2006.01) | |
| C09D 11/00 | (2006.01) | |

(52) U.S. Cl.
USPC ............... 522/182; 522/34; 522/35; 522/71; 522/81; 522/113; 522/121; 522/120; 522/178; 522/904; 522/909; 427/508; 427/511; 427/514; 427/517

(58) Field of Classification Search
USPC ......... 522/34, 35, 71, 81, 113, 121, 120, 178, 522/182, 904, 909; 427/508, 511, 514, 517
See application file for complete search history.

(56) References Cited

U.S. PATENT DOCUMENTS

| | | | |
|---|---|---|---|
| 2,692,256 A * | 10/1954 | Bauer et al. .................... | 526/320 |
| 6,310,115 B1 | 10/2001 | Vanmaele et al. | |
| 6,767,980 B2 * | 7/2004 | Yurugi et al. .................. | 526/320 |
| 6,803,112 B1 | 10/2004 | Chatterjee et al. | |
| 6,814,791 B2 * | 11/2004 | Moore et al. ................. | 106/31.37 |
| 8,133,551 B2 * | 3/2012 | Claes ............................. | 427/511 |
| 8,227,047 B2 * | 7/2012 | Loccufier et al. ............. | 427/466 |
| 8,344,038 B2 * | 1/2013 | Loccufier et al. ............... | 522/28 |
| 8,372,913 B2 * | 2/2013 | Claes ............................ | 524/853 |
| 2003/0199655 A1 * | 10/2003 | Yurugi et al. .................. | 526/320 |
| 2004/0163570 A1 * | 8/2004 | Vanmaele et al. ......... | 106/31.13 |
| 2005/0287476 A1 | 12/2005 | Ishikawa et al. | |
| 2006/0014848 A1 | 1/2006 | Loccufier et al. | |
| 2008/0171272 A1 * | 7/2008 | Nakashima et al. .............. | 430/7 |
| 2009/0000508 A1 * | 1/2009 | Edison et al. ................ | 106/31.6 |
| 2009/0326091 A1 * | 12/2009 | Loccufier et al. ............. | 522/26 |
| 2010/0041784 A1 * | 2/2010 | Loccufier et al. ............. | 522/26 |
| 2010/0048756 A1 * | 2/2010 | Loccufier et al. ............. | 522/10 |
| 2010/0304149 A1 * | 12/2010 | Loccufier et al. ............. | 428/412 |

FOREIGN PATENT DOCUMENTS

| | | |
|---|---|---|
| EP | 1 721 943 A1 | 11/2006 |
| WO | 2006/085992 A2 | 8/2006 |

OTHER PUBLICATIONS

Official Communication issued in International Patent Application No. PCT/EP2008/063957, mailed on Feb. 11, 2009.
Loccufier et al., "Curable Liquids and Inks for Toys and Food Packaging Applications", U.S. Appl. No. 12/739,160, filed Apr. 22, 2010.

* cited by examiner

Primary Examiner — Sanza McClendon
(74) Attorney, Agent, or Firm — Keating & Bennett, LLP

(57) ABSTRACT

A free radical curable liquid for inkjet printing of food packaging materials includes no initiator or otherwise one or more initiators selected from the group consisting of non-polymeric di- or multifunctional initiators, oligomeric initiators, polymeric initiators, and polymerizable initiators; wherein the polymerizable composition of the liquid consists essentially of: a) 25-100 wt % of one or more polymerizable compounds A having at least one acrylate group G1 and at least one second ethylenically unsaturated polymerizable functional group G2 different from the group G1; b) 0-55 wt % of one or more polymerizable compounds B selected from the group consisting of monofunctional acrylates and difunctional acrylates; and c) 0-55 wt % of one or more polymerizable compounds C selected from the group consisting of trifunctional acrylates, tetrafunctional acrylates, pentafunctional acrylates and hexafunctional acrylates. If the weight percentage of compounds B>24 wt %, then the weight percentage of compounds C>1 wt %; and wherein all weight percentages of A, B and C are based upon the total weight of the polymerizable composition. At least one polymerizable compound B or C is present in the polymerizable composition if the free radical curable liquid contains no initiator. The polymerizable compound A has a copolymerization ratio of $$0.002 < r2/r1 < 0.200$$

with r1 and r2 representing the copolymerization parameters of methyl-G1 respectively methyl-G2 determined according to the method of Kelen-Tudos.

17 Claims, 1 Drawing Sheet

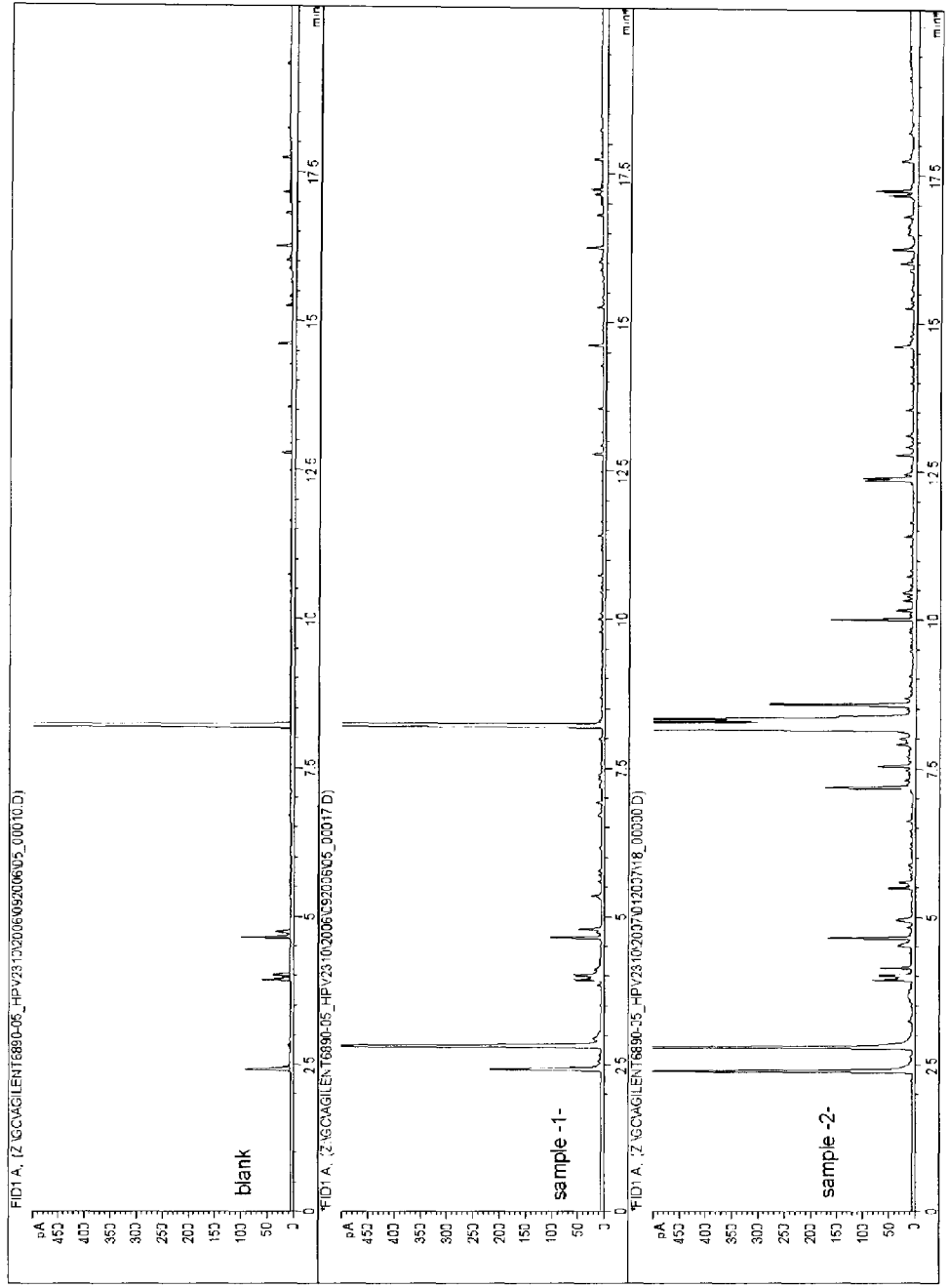

CURABLE LIQUIDS AND INKS FOR TOYS AND FOOD PACKAGING APPLICATIONS

CROSS-REFERENCE TO RELATED APPLICATIONS

This application is a 371 National Stage Application of PCT/EP2008/063957, filed Oct. 16, 2008. This application claims the benefit of U.S. Provisional Application No. 60/982,466, filed Oct. 25, 2007, which is incorporated by reference herein in its entirety. In addition, this application claims the benefit of European Application No. 07119181.1, filed Oct. 24, 2007, which is also incorporated by reference herein in its entirety.

BACKGROUND OF THE INVENTION

1. Field of the Invention

The present invention relates to curable inks, more particularly curable inkjet inks and their use in inkjet printing methods for toys and food packaging applications.

2. Description of the Related Art

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

When jetting the inkjet ink onto an ink-receiver, the ink typically includes a liquid vehicle and one or more solids, such as dyes, pigments and polymers. Ink compositions can be roughly divided in:

water-based, the drying mechanism involving absorption, penetration and evaporation;
solvent-based, the drying primarily involving evaporation;
oil-based, the drying involving absorption and penetration;
hot melt or phase change, in which the ink is liquid at the ejection temperature but solid at room temperature and wherein drying is replaced by solidification; and
UV-curable, in which drying is replaced by polymerization.

It should be clear that the first three types of ink compositions are more suitable for an absorbing ink-receiver, whereas hot melt inks and UV-curable inks can also be printed on non-absorbing ink-receivers. Due to thermal requirements posed by hot melt inks on the substrates, especially radiation curable inks have gained the interest of the industry in inkjet printing applications.

Migrateable residues in cured layers of inkjet ink on toys or packaging of foodstuffs may present a health risk and consequently they should be kept to an absolute minimum. In general, UV-curable inks contain colorants, monomers, photoinitiators and polymerization synergists. Known measures to reduce extractables of the photoinitiating system from cured ink layers include the use of polymeric or co-polymerizable photoinitiators and synergists instead of the usual low molecular weight compounds.

For example, US 2006014848 (AGFA) discloses radiation curable inkjet inks including a polymeric co-initiator including a dendritic polymer core with at least one co-initiating functional group as an end group. Aliphatic amines and aromatic amines are included as suitable co-initiating functional groups. The dendritic polymeric architecture allows to obtain low extractables and at the same time to minimize the increase in viscosity of the ink.

The colorants used in curable inkjet inks can be dyes, but are generally colour pigments which together with a polymeric dispersant attached to the surface of the pigment are usually very difficult to extract. The remaining problem for extractables includes the monomers. The use of polymerizable oligomers or crosslinkable polymers instead of low molecular weight monomers is only possible up to a certain amount in the ink due to limitations of inkjet printing requiring the inks to possess a low viscosity at the jetting temperature.

In general, the curable inkjet inks are cured by radiation. Thermal curing and electron beam curing of inkjet inks are alternatives for the more preferred radiation curing, more particularly UV-radiation curing. The polymerization mechanism is usually either free radical polymerization or cationic polymerization. There is widespread belief that cationic inkjet inks would be more suitable for food packaging applications. Cationic inkjet inks tend to polymerize slower than free radical polymerizable inkjet inks but to a larger extent. This means that free radical inkjet inks polymerize much faster but the cured image layer contains more extractables, i.e. unreacted monomers.

U.S. Pat. No. 6,803,112 (SUN CHEMICAL) discloses a method for producing a low-extractable film packaging from an actinic radiation curable aqueous composition containing a water soluble compound having at least one $\alpha,\beta$-ethylenically unsaturated, radiation polymerizable group and water as essential components carried out by applying the aqueous composition to a surface which is then irradiated in a single step with actinic radiation in the presence of the water thereby forming a cured film wherein less than 50 ppb of the water soluble compound or its residual components are extractable by a food simulant.

The volatility of some of these monomers in curable inkjet inks also contribute to unpleasant odors from printed matter. For non-food printing applications, these unpleasant odors have been camouflaged by addition of deodorizers. For example, US 2005287476 (KONICA MINOLTA) discloses photocurable compositions including a photopolymerizable compound, a photoinitiator and a compound selected from the group consisting of a deodorizer, a perfume and an antioxidant. Also EP 1721943 A (FUJI) discloses the use of flagrances in a curable ink.

US 2003199655 (NIPPON CATALYTIC CHEM) discloses an activated energy ray-curable ink composition for ink-jet printing including a diluent according to Table 1 containing substantially VEEA and monofunctional photoinitiator.

WO 2006/085992 A (HEXION) discloses a radiation curable inkjet ink including a radiation curable composition including about 0.1 to about 15 wt. % of an ethylenically unsaturated mono functional monomer, about 30 to about 80 wt. % of an ethylenically unsaturated difunctional monomer and may further include VEEA and monofunctional photoinitiator.

U.S. Pat. No. 6,310,115 B1 (AGFA) discloses ultraviolet curable ink compositions for ink jet printing including an ultraviolet curable monomer having a vinylether function and a (meth)acrylate function.

Therefore, it would be desirable to have curable inkjet inks that combine the best of both worlds, i.e. the high curing speed of free radical inkjet inks and the complete curing of cationic curable inkjet inks. Furthermore, a need continues to exist for radiation-curable inkjet inks that do not cause bad smell without adding deodorizers or perfumes.

SUMMARY OF THE INVENTION

A preferred embodiment of the invention provides inkjet inks exhibiting improved complete curing and high curing speed, making them more suitable for food packaging applications.

Another preferred embodiment of the invention provides inkjet inks exhibiting a good stability.

Another preferred embodiment of the invention provides printed matter exhibiting no or almost no unpleasant odors without using deodorizers to mask the unpleasant odor.

These and other preferred embodiments of the invention will become apparent from the description hereinafter.

It was found that inkjet inks exhibited improved complete curing and high curing speed, as well as improved adhesion and reduced unpleasant odors by using a specific composition including a sufficient amount of specific monomers. Very low amounts of extractables were found after full curing, which opened perspective for radiation curable inkjet applications for food and toys.

Preferred embodiments of the invention have been realised with a free radical curable liquid as defined below.

Preferred embodiments of the invention have also been realised with an inkjet printing method as defined below.

Further advantages and preferred embodiments of the present invention will become apparent from the following description.

BRIEF DESCRIPTION OF THE DRAWINGS

The FIGURE shows desorption chromatograms of volatile extractables from cured Samples of free radical curable liquids coated on a substrate.

DETAILED DESCRIPTION OF THE PREFERRED EMBODIMENTS

Definitions

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as a colorant that is practically insoluble in the application medium under the pertaining ambient conditions, hence having a solubility of less than 10 mg/L therein.

The term "monofuntional initiator", as used in disclosing the present invention, means an initiator having only one initiating functional group.

The term "difunctional initiator", as used in disclosing the present invention, means an initiator having two initiating functional groups.

The term "multifunctional initiator", as used in disclosing the present invention, means an initiator having more than two initiating functional groups.

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The terms "weight %", "wt %" and "weight percentage" all have the same meaning.

The term "actinic radiation" as used in disclosing the present invention, means electromagnetic radiation capable of initiating photochemical reactions.

The term "ultraviolet radiation" as used in disclosing the present invention, means electromagnetic radiation in the wavelength range of about 100 to about 400 nanometers.

Curable Liquids and Inks

The curable liquid according to a preferred embodiment of the present invention is preferably a curable inkjet liquid, more preferably a radiation curable inkjet liquid, and most preferably a UV radiation curable inkjet liquid.

The curable liquid preferably includes at least one photoinitiator.

The curable liquid is preferably part of an inkjet ink set wherein at least one, more preferably all inks have a curable composition according to a preferred embodiment of the present invention.

The curable liquid may contain one or more colour pigments as colorant, and at that moment a skilled person refers to it as a curable ink instead of a curable liquid.

A curable inkjet ink set preferably includes at least one yellow curable inkjet ink (Y), at least one cyan curable inkjet ink (C) and at least one magenta curable inkjet ink (M) and preferably also at least one black curable inkjet ink (K). The curable CMYK inkjet ink set may also be extended with extra inks such as red, green, blue, and/or orange to further enlarge the colour gamut of the image. The CMYK ink set may also be extended by the combination of full density and light density inks of both colour inks and/or black inks to improve the image quality by lowered graininess.

In a preferred embodiment, the radiation curable inkjet ink set is a UV-curable pigment inkjet ink set.

The curable liquid or ink may further also contain at least one inhibitor.

The curable liquid or ink may further also contain at least one surfactant.

The curable liquid or ink is most preferably a non-aqueous inkjet liquid or ink. The term "non-aqueous" refers to a liquid carrier which should contain no water. However sometimes a small amount, generally less than 5 wt % of water based on the total weight of the ink, can be present. This water was not intentionally added but came into the formulation via other components as a contamination, such as for example polar organic solvents. Higher amounts of water than 5 wt % tend to make the non-aqueous inkjet inks instable, preferably the water content is less than 1 wt % based on the total weight dispersion medium and most preferably no water at all is present.

The curable liquid or ink preferably does not contain an evaporable component such as an organic solvent. But sometimes it can be advantageous to incorporate a small amount of an organic solvent to improve adhesion to the surface of a substrate after UV-curing. In this case, the added solvent can be any amount in the range that does not cause problems of solvent resistance and VOC, and preferably 0.1-10.0 wt %, and particularly preferably 0.1-5.0 wt %, each based on the total weight of the curable ink.

The pigmented curable ink preferably contains a dispersant, more preferably a polymeric dispersant, for dispersing the pigment. The pigmented curable ink may contain a dispersion synergist to improve the dispersion quality of the ink. Preferably, at least the magenta ink contains a dispersion synergist. A mixture of dispersion synergists may be used to further improve dispersion stability.

The viscosity of the ink is preferably smaller than 100 mPa·s at 30° C. and at a shear rate of 100 s$^{-1}$. The viscosity of the inkjet ink is preferably smaller than 30 mPa·s, more preferably lower than 15 mPa·s, and most preferably between 2 and 10 mPa·s at a shear rate of 100 s$^{-1}$ and a jetting temperature between 10 and 70° C.

The polymerizable compounds used in the curable ink, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Polymerizable Compounds A

The copolymerization parameter, also frequently called the reactivity ratio, is well-known to the skilled person in polymer chemistry for describing the distribution of monomers in a copolymer. Taking into consideration a monomer mix of two components $M_1$ and $M_2$ and the four different reactions that can take place at the reactive chain end terminating in either monomer (M*) with their reaction rate constants k:

$$M_1^* + M_1 \xrightarrow{k_{11}} M_1 M_1^*$$

$$M_1^* + M_2 \xrightarrow{k_{12}} M_1 M_2^*$$

$$M_2^* + M_1 \xrightarrow{k_{21}} M_2 M_1^*$$

$$M_2^* + M_2 \xrightarrow{k_{22}} M_2 M_2^*$$

and with the copolymerization parameters defined as:

$$r_1 = \frac{k_{11}}{k_{12}} \; r_2 = \frac{k_{22}}{k_{21}},$$

the copolymer equation is given as:

$$\frac{d[M_1]}{d[M_2]} = \frac{[M_1](r_1 \cdot [M_1] + [M_2])}{[M_2]([M_1] + r_2 \cdot [M_2])}$$

with the concentration of the components given in square brackets. The equation gives the copolymer composition at any instant during the polymerization.

From this equation several limiting cases can be derived:

$r_1 \gg 1$ and $r_2 \gg 1$

If both copolymerization parameters are very high the two monomers have no inclination to react with each other except with themselves leading to a mixture of two homopolymers;

$r_1 > 1$ and $r_2 > 1$

If both copolymerization parameters are larger than 1, homopolymerization of component $M_1$ is favoured but in the event of a crosspolymerization by $M_2$ the chain-end will continue as such giving rise to block like copolymers;

$r_1 \approx 1$ and $r_2 \approx 1$

If both copolymerization parameters are around 1, monomer $M_1$ will react as fast with another monomer $M_1$ or monomer $M_2$ and a random copolymer results;

$r_1 \approx 0$ and $r_2 \approx 0$

If both copolymerization parameters approach 0, each monomer prefers to react with the other monomer. This results is an alternating polymer; and $r_1 \gg r_2$ In the initial stage of the copolymerization monomer $M_1$ is incorporated faster and the copolymer is rich in monomer $M_1$. When this monomer gets depleted, more monomer $M_2$ segments are added. This is called composition drift.

The copolymerization parameters $r_1$ and $r_2$ for pairs of monomers $M_1$ and $M_2$ have been described in many scientific articles. A skilled person is aware that this data is subject to the copolymerization conditions. For example, the data in Table 1 is for free radical copolymerization under standard conditions and the values would be very different for ionic copolymerization. For example, for the copolymerization of styrene and methyl methacrylate under cationic initiation, $r_1$ was found to be 10.5 and $r_2$ was found to be 0.1. And if anionic initiation was used, $r_1$ was found to be 0.12 and $r_2$ was found to be 6.4.

TABLE 1

| $M_1$ | $r_1$ | $M_2$ | $r_2$ |
|---|---|---|---|
| Styrene | 0.80 | Isoprene | 1.68 |
| Styrene | 0.52 | Methyl methacrylate | 0.46 |
| Styrene | 55 | Vinyl Acetate | 0.01 |
| Styrene | 0.04 | Acrylonitrile | 0.40 |
| Styrene | 0.04 | Maleic anhydride | 0.02 |

Methods for the determination of the copolymerization parameters are also well known to the skilled person, and are discussed in more detail in the next paragraph on the Method of Kelen-Tudos.

By using different methods for the determination of the copolymerization parameters, different values have been reported in literature for the same two monomers. Therefore, the values listed in John Wiley. POLYMER HANDBOOK. 4th edition. Edited by BRANDRUP J., et al. NEW YORK: WILEY_INTERSCIENCE, 1999. ISBN 0471166286. p. II/182-II/308. were taken as the reference values for the copolymerization parameters for as far as they were documented. If for a specific combination of monomers, more than one value was listed, the values were averaged as an estimation of the copolymerisation parameters.

In contrast to the use of the copolymerization parameters of two monomers for designing copolymers, the copolymerization parameters are used in a preferred embodiment of the present invention on a single polymerizable compound A having at least two different ethylenically unsaturated polymerizable functional groups.

The free radical curable liquid for inkjet printing of food packaging materials according to a preferred embodiment of the present invention includes no initiator or one or more initiators selected from the group consisting of non-polymeric di- or multifunctional initiators, oligomeric initiators, polymeric initiators and polymerizable initiators; wherein the polymerizable composition of the liquid consists essentially of:

a) 25-100 wt % of one or more polymerizable compounds A having at least one acrylate group G1 and at least one second ethylenically unsaturated polymerizable functional group G2 different from the group G1;

b) 0-55 wt % of one or more polymerizable compounds B selected from the group consisting of monofunctional acrylates and difunctional acrylates; and c) 0-55 wt % of one or more polymerizable compounds C selected from the group consisting of trifunctional acrylates, tetrafunctional acrylates, pentafunctional acrylates and hexafunctional acrylates, with the proviso that if the weight percentage of compounds B>24 wt %, then the weight percentage of compounds C>1 wt %;

and wherein all weight percentages of A, B and C are based upon the total weight of the polymerizable composition;

with the proviso that at least one polymerizable compound B or C is present in the polymerizable composition if the free radical curable liquid contains no initiator;

wherein the polymerizable compound A has a copolymerization ratio of $$0.002 < r_2/r_1 < 0.200$$

with $r_1$ and $r_2$ representing the copolymerization parameters of methyl-G1 respectively methyl-G2 determined according to the method of Kelen-Tudos if the combination of G1 and G2 is not listed in Table 2:

TABLE 2

| G1-group | G2-group | $r_1$ | $r_2$ |
|---|---|---|---|
| acrylate | allylether | 11.0 | 0.04 |
| acrylate | allylester | 11.0 | 0.04 |
| acrylate | allylcarbonate | 10.2 | 0.04 |
| acrylate | vinylether | 3.6 | 0.02 |
| acrylate | vinylester | 3.5 | 0.02 |
| acrylate | vinylcarbonate | 3.5 | 0.02 |
| acrylate | fumarate | 1.9 | 0.09 |
| acrylate | maleate | 1.9 | 0.09 |

In a preferred embodiment, the $r_2$ to $r_1$ ratio is smaller than 0.150, more preferably smaller than 0.100.

In a preferred embodiment, the one or more initiators are polymerizable initiators, e.g. possessing one or two acrylate groups. In the latter case the photopolymerizable initiator must be regarded as a polymerizable compound B of the free radical curable liquid according to a preferred embodiment of present invention. Consequently the weight percentage of the one or more polymerizable compounds A must be smaller than 100. This is also true for other types of compounds, for example, polymerizable surfactants, polymerizable inhibitors and polymerizable co-initiators. In these case the content of compound A of the curable liquid or ink according to a preferred embodiment of the present invention is preferably smaller than 99 wt %, more preferably smaller than 98 wt % and most preferably smaller than 95 wt % all based upon the total weight of the polymerizable composition.

The curable liquid or ink according to a preferred embodiment of the present invention includes a polymerizable composition consisting essentially of one or more polymerizable compounds A and optionally one or more polymerizable compounds B and/or polymerizable compounds C. The wording "consisting essentially" in the present invention means that other polymerizable compounds different from the compounds A, B and C may be used as long as they do not lead to large amounts of extractables from the cured layer. For example, a polymerizable compound having two vinylether groups but no acrylate group can be added to the polymerizable composition of the curable liquid or ink only in small amounts without causing large amounts of extractables. Amounts of 25 wt % or more of a divinylether compound based upon the total weight of the polymerizable composition do not result in curable liquids or inks suitable for inkjet printing on toys or food packaging applications. The amount of polymerizable compounds different from the polymerizable compounds A, B and C should preferably be smaller than 5 wt % and more preferably smaller than 2 wt % based upon the total weight of the polymerizable composition. Most preferably no other polymerizable compounds other than the polymerizable compounds A, B and C are present in the curable liquid or ink, i.e. the polymerizable liquid or ink consists of one or more polymerizable compounds A and optionally one or more polymerizable compounds B and/or polymerizable compounds C. It should also be noted that at least one acrylate group is present in the polymerizable compounds A, B and C. Replacement of the acrylate group by a methacrylate group does not result in curable liquids or inks suitable for inkjet printing on toys or food packaging applications.

The free radical curable liquid and inks according to a preferred embodiment of the present invention preferably include a polymerizable composition including 60 to 90 wt % of one or more polymerizable compounds A and 10 to 40 wt % of one or more polymerizable compounds C, both based upon the total weight of the polymerizable composition.

The rate and the completeness of a polymerization can be influenced through the type and concentration of monofunctional and polyfunctional monomers in the ink. Monofunctional monomers have only one polymerizable functional group for taking part in the polymerization process and usually also exhibit a lower viscosity, whereby the polymerization can continue for a longer time than polyfunctional monomers, but at the end results in a certain amount of unreacted monomers trapped in the polymerized layer. Generally, polyfunctional monomers have larger probability of taking part in the polymerization because they have two or more polymerizable functional groups. However, because they can react more rapidly and frequently, vitrification of the layer occurs much faster leading to unreacted polyfunctional monomers getting trapped in the polymerized network. These trapped monomers contribute significantly to the extractables which limit the possibilities for inkjet printing in toys and food packaging applications.

In a preferred embodiment of the present invention, the principles of determining copolymerization parameters in copolymerization reactions are applied to a polymerizable compound A having at least one acrylate group G1 and at least one second ethylenically unsaturated polymerizable functional group G2 different from the group G1. The method for determining copolymerization parameters for compound A uses two model compounds methyl-G1, i.e. methylacrylate, and methyl-G2, but is explained further on.

The polymerizable compound A is preferably represented by the Formula (I):

Formula (I)

wherein
G1 represents an acrylate group;
G2 represents an ethylenically unsaturated polymerizable functional group different from the group G1;
GX and GY are independently selected from the group consisting of G1 and G2;
n and m are independently selected integers having a value of 0 or 1; and
L represents a (n+m+2)-valent linking group including at least one carbon atom. For example is n=1 and m=0 than the (n+m+2)-valent linking group represents a trivalent linking group represents a trivalent linking group including at least one carbon atom. In a preferred embodiment, the integers n and m both have a value equal to 0.

In a preferred embodiment the linking group is an aliphatic chain, preferably including 1 to 6 carbon atoms.

In another preferred embodiment the linking group includes one or more ethyleneoxide units and/or one or more propyleneoxide units.

A single polymerizable compound A may be used in the ink or a mixture of different polymerizable compounds A may be used as long as the total amount of the different polymerizable compounds A expressed as weight % stays within the defined range for the one or more polymerizable compounds A.

In a preferred embodiment, the polymerizable compound A has one or more second polymerizable functional groups G2 independently selected from the group consisting of an allyl ether group, an allyl ester group, an allyl carbonate group, a vinyl ester group, a vinyl ether group, a vinyl carbonate group, a fumarate group and a maleate group.

In another preferred embodiment, the polymerizable compound A has one or more second polymerizable functional groups G2 independently selected from the group consisting of an allyl ether group, an allyl ester group, an allyl carbonate group, a vinyl ester group, a vinyl carbonate group, a fumarate group and a maleate group.

In a very preferred embodiment, the polymerizable functional group G2 is a vinyl ether group. Most preferably, the polymerizable compound A is 2-(vinylethoxy)ethyl acrylate.

Typical polymerizable compounds suitable for the curable liquids and inks according to a preferred embodiment of the present invention are shown in Table 3, without being limited thereto.

TABLE 3

PC-1 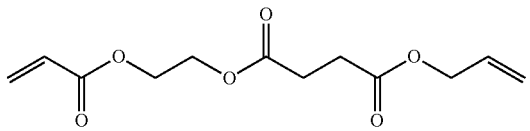 [SMILES: C=CCOC(=O)CCC(=O)OCCOC(=O)C=C]

PC-2 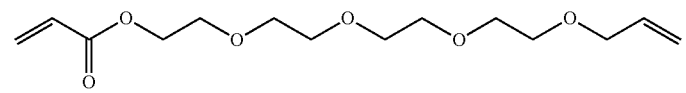 [SMILES: C=CCOCCOCCOCCOCCOC(=O)C=C]

PC-3 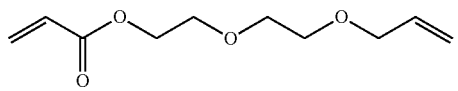

PC-4 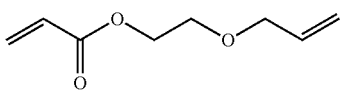

PC-5 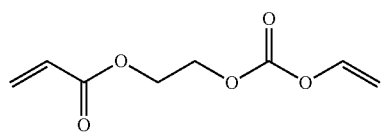

PC-6 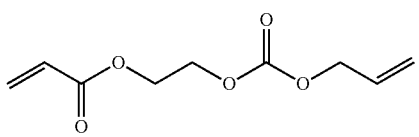

PC-7 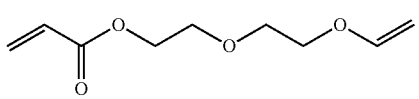

PC-8 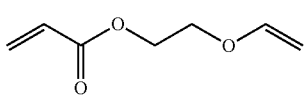

PC-9 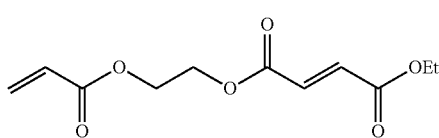 [SMILES: C=CC(=O)OCCOC(=O)/C=C/C(=O)OCC]

TABLE 3-continued

PC-10
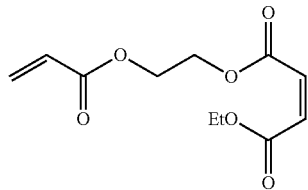 [SMILES: C=CC(=O)OCCOC(=O)/C=C\C(=O)OCC]

PC-11
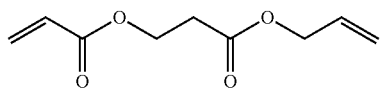

PC-12
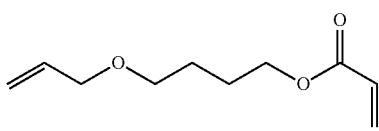

PC-13
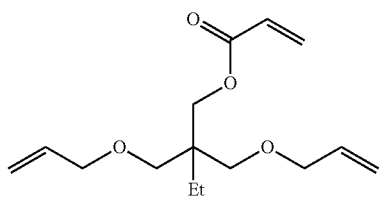 [SMILES: C=CCOCC(CC)(COCC=C)COC(=O)C=C]

PC-14
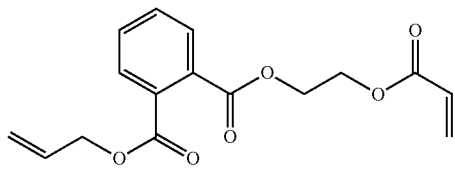 [SMILES: C=CCOC(=O)c1ccccc1C(=O)OCCOC(=O)C=C]

PC-15
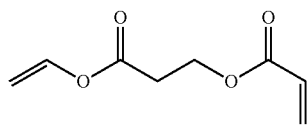

PC-16
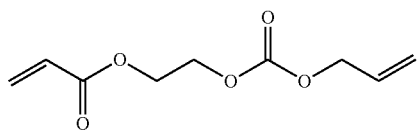

The polymerizable compound A preferably has a molecular weight smaller than 800 Dalton, more preferably smaller than 500 Dalton, and most preferably smaller than 400 Dalton.

The polymerizable compound A can be advantageously used for reducing the extractables from an image layer.

The polymerizable compound A can also be advantageously used for reducing unpleasant odors from printed matter.

Method of Kelen-Tudos

The model for the copolymerisation of two monomers $M_1$ and $M_2$ takes the four elementary reactions into account:

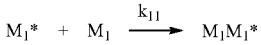
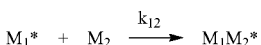
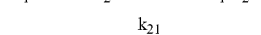
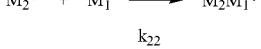

where $M_1^*$ represents a propagating polymer having $M_1$ as last monomer and $M_2^*$ represents a propagating polymer having $M_2$ as last monomer.

Factors such as the penultimate effect and potential transfer reactions are omitted, to be able to handle the model and avoid complicated mathematics. In this model, it is assumed that there is a steady state concentration of the two different propagating radicals, which means that:

$$k_{21}[M_2^*][M_1] = k_{12}[M_1^*][M_2] \quad \text{Equation (1)}$$

The consumption of the two monomers as a function of time is give by equation (2) and (3):

$$-\frac{d[M_1]}{dt} = k_{11}[M_1^*][M_1] + k_{21}[M_2^*][M_1] \quad \text{Equation (2)}$$

$$-\frac{d[M_2]}{dt} = k_{22}[M_2^*][M_2] + k_{12}[M_1^*][M_2]. \quad \text{Equation (3)}$$

The copolymerisation parameters or copolymerisation reactivity ratios are defined as follows:

$$r_1 = k_{11}/k_{12} \quad r_2 = k_{22}/k_{21}$$

Combining equation (1), (2) and (3) and integrating the definition of the copolymerisation parameters leads to the copolymerisation equation (4):

$$\frac{d[M_1]}{d[M_2]} = \frac{[M_1]}{[M_2]} \frac{(r_1[M_1] + [M_2])}{([M_1] + r_2[M_2])} \quad \text{Equation (4)}$$

A lot of effort has been done in search of a linear method for determining the copolymerisation reactivity ratios as discussed by Kelen and Tudos in J. Macromol. Sci.-Chem., A9(1), 1-27 (1975).

For a limited conversion $d[M_1]/d[M_2]$ can be considered as the concentration ratio of the monomers in the copolymer. When defining x as $[M_1]/[M_2]$ and y as $d[M_1]/d[M_2]$, equation (4) can be transferred to equation (5):

$$y = x\frac{1 + r_1 x}{r_2 + x} \quad \text{Equation (5)}$$

Equation (5) can be linearized to lead to the Fineman-Ross-equation (6) or (7), $$G = r_1 F - r_2 \quad \text{Equation (6)}$$

$$\frac{G}{F} = -r_2 \frac{1}{F} + r_1 \quad \text{Equation (7)}$$

where $$G = \frac{x(y-1)}{y} \text{ and } F = x^2/y.$$

Graphical plotting of equation (6) gives $r_1$ as the slope and $r_2$ as the intercept, while the plot of equation (7) leads to $r_2$ as the slope and $r_1$ as the intercept. However, the classical Fineman-Ross equation does not give very accurate copolymerisation reactivity ratios for different reasons, as discussed by Kelen and Tudos (J. Macromol. Sci.-Chem., A9(1), 1-27 (1975)). Kelen and Tudos propose a different linearization, defined as follows:

$$\frac{G}{\alpha + F} = \left(r_1 + \frac{r_2}{\alpha}\right)\frac{F}{\alpha + F} - \frac{r_2}{\alpha} \quad \text{Equation (8)}$$

by introducing:

$$\eta = \frac{G}{\alpha + F}$$

and $$\xi = \frac{F}{\alpha + F}$$

equation (8) can be written as equation (9) or (10).

$$\eta = \left(r_1 + \frac{r_2}{\alpha}\right)\xi - \frac{r_2}{\alpha} \quad \text{equation (9)}$$

$$\eta = r_1 \xi - \left(\frac{r_2}{\alpha}(1 - \xi)\right) \quad \text{equation (10)}$$

where $\alpha$ denotes an arbitrary constant ($\alpha > 0$). The most feasible choice of $\alpha$ will be dealt with later.

The variable $\xi$ can only take a positive value in the interval (0, 1). Thus by plotting the $\eta$ values, calculated from the experimental data in function of $\xi$, a straight line is obtained, which on extrapolation to $\xi$ to 0 gives $-r_2/\alpha$ and on extrapolation of $\xi$ to 1 gives $r_1$ (both as intercepts).

As most optimal choice, the value for $\alpha$ is defined as $$\alpha = \sqrt{F_m F_M}$$

where the F-values are calculated from the experimental data and $F_m$ stands for the lowest value and $F_M$ stands for the highest value.

By applying this method more reliable copolymerisation reactivity ratios (copolymerisation parameters) are obtained compared to the classical Fineman-Ross equation and similar linearizations of the copolymerisation equation (4).

Other Polymerizable Compounds

The polymerizable compound A may be combined in the ink with another monomer or oligomers having at least one acrylate group.

A combination of other monomers and/or oligomers may also be used. The monomers and/or oligomers may possess different degrees of functionality, and a mixture including combinations of mono-, di-, tri- and higher functionality monomers and/or oligomers may be used. The viscosity of the curable ink may be adjusted by varying the ratio between the monomers and/or oligomers.

Any polymerizable compound commonly known in the art may be employed and includes monofunctional and/or polyfunctional acrylate monomers and oligomers.

Suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate, isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyxyethylphthalic acid, 2-acryloxyethyl-2-hydroxyethyl-phthalic acid, lactone modified flexible acrylate and t-butylcyclohexyl acrylate.

Suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate, neopentyl glycol diacrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate.

Suitable trifunctional acrylates include propoxylated glycerine triacrylate, propoxylated trimethylolpropane triacrylate, trimethylolpropane triacrylate, EO modified trimethylolpropane triacrylate, tri(propylene glycol) triacrylate, caprolactone modified trimethylolpropane triacrylate and pentaerythritol triacrylate, Suitable higher functional acrylates include pentaerithritol tetraacrylate, pentaerythritolethoxy tetraacrylate, dipentaerythritol hexaacrylate, ditrimethylolpropane tetraacrylate, glycerinpropoxy triacrylate, caprolactam modified dipentaerythritol hexaacrylate, di-trimethylolpropane tetraacrylate, dipentaerythritol pentaacrylate, ethoxylated pentaerythritol tetraacrylate, methoxylated glycol acrylates and acrylate esters.

Polymerizable oligomers which may be used, include epoxy acrylates, aliphatic urethane acrylates, aromatic urethane acrylates, polyester acrylates, and straight-chained acrylic oligomers.

Initiators

The curable ink according to a preferred embodiment of the present invention preferably contains a photoinitiator or photoinitiator system such as, for example, one or more photoinitiators and one or more co-initiators. The photoinitiator or photoinitiator system absorbs light and is responsible for the production of initiating species, i.e. free radicals which induce the polymerization of monomers, oligomers and polymers and with polyfunctional monomers and oligomers thereby also induce cross-linking.

Irradiation with actinic radiation may be realized in two steps by changing wavelength or intensity. In such cases it is preferred to use 2 types of photoinitiator together.

Free radical photoinitiators can act as a Norrish type I or a Norrish type II initiator. Tertiary amines are today admixed to free radical polymerizable radiation curable formulations for two main reasons:

i) They counteract air inhibition, provided that the particular amine contains abstractable α-hydrogens, by formation of radicals, which can participate and trigger radical polymerisation of acrylic groups. Tertiary amines can therefore be used together with Norrish type I photoinitiators to reduce air inhibition and thereby increase cure speed; and ii) They can act as co-initiators together with ketones, for example, of the benzophenone type, wherein the excited keto groups abstract a hydrogen from the amine, whereby radicals are formed promoting radical polymerisation of acrylic groups and the like. This is the so called Norrish type II of photopolymerization.

For safety reasons, in particular for food packaging applications, the curable liquid according to a preferred embodiment of the present invention contains a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Monofunctional photoinitiators with a molecular weight in that range are not diffusion hindered photoinitiators. Both type I and type II photoinitiators can be used in preferred embodiments of the present invention, alone or in combination. Most preferably the diffusion hindered photoinitiator is a polymerizable initiator.

A preferred amount of diffusion hindered photoinitiator is 0-50 wt %, more preferably 0.1-20 wt %, and most preferably 0.3-15 wt % of the total weight of the curable ink.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Other photoinitiators suitable for the photoinitiating functional groups in preparing diffusion hindered photoinitiators are disclosed by CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, UK, 1998 edited by Dr. G. Bradley; ISBN 0471 978922, page 287-294.

Difunctional and Multifunctional Photoinitiators

Typical non-polymeric di- and multifunctional initiators have been disclosed in WO 2005/040083 (LAMBERTI S. P. A), WO 2004/099262 (CIBA SPECIALTY CHEMICALS) and Burrows et al., Surface Coatings International, Part B: Coatings Transactions 87(B2), 127-135 (2004) and by Ye et al., Polymer 47(13), 4603-4612 (2006).

Suitable non-polymeric multifunctional initiators are given below in Table 4 without being limited thereto.

TABLE 4
INI-A1 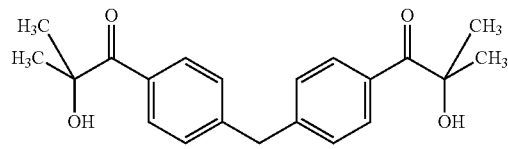 [SMILES: CC(C)(O)C(=O)c1ccc(Cc2ccc(C(=O)C(C)(C)O)cc2)cc1]
INI-A2 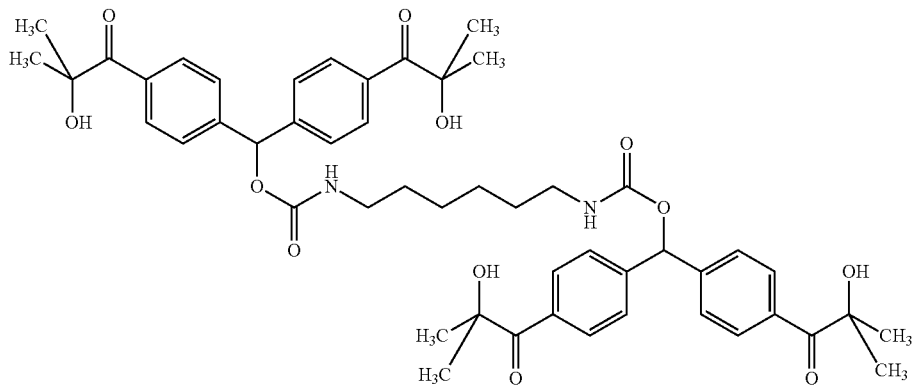 [SMILES: CC(C)(O)C(=O)c1ccc(C(OC(=O)NCCCCCCNC(=O)OC(c2ccc(C(=O)C(C)(C)O)cc2)c2ccc(C(=O)C(C)(C)O)cc2)c2ccc(C(=O)C(C)(C)O)cc2)cc1]
INI-A3 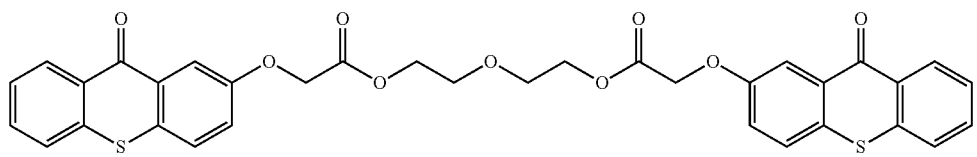 [SMILES: O=C(COc1ccc2sc3ccccc3c(=O)c2c1)OCCOCCOC(=O)COc1ccc2sc3ccccc3c(=O)c2c1]
INI-A4 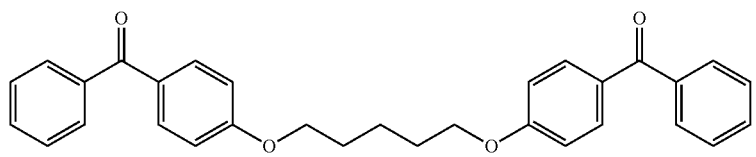 [SMILES: O=C(c1ccccc1)c1ccc(OCCCCCOc2ccc(C(=O)c3ccccc3)cc2)cc1]
INI-A5 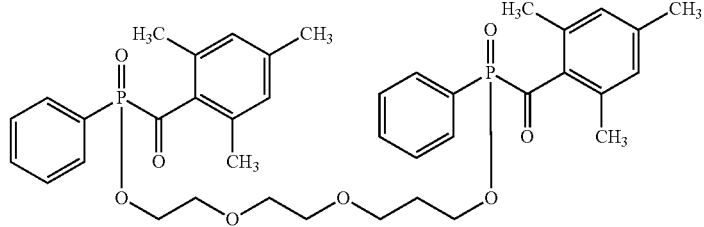 [SMILES: Cc1cc(C)c(C(=O)P(=O)(OCCCOCCOCCOP(=O)(C(=O)c2c(C)cc(C)cc2C)c2ccccc2)c2ccccc2)c(C)c1]
INI-A6 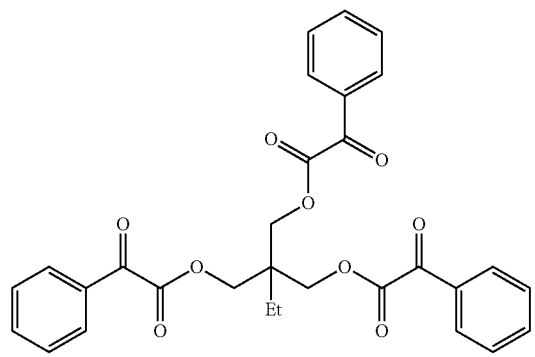 [SMILES: CCC(COC(=O)C(=O)c1ccccc1)(COC(=O)C(=O)c1ccccc1)COC(=O)C(=O)c1ccccc1]

TABLE 4-continued

INI-A7

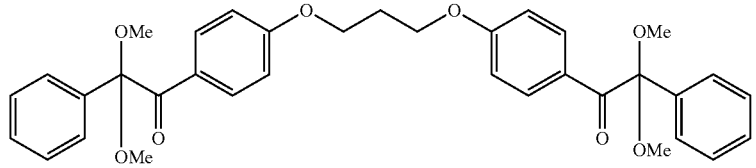 [SMILES: COC(OC)(C(=O)c1ccc(OCCCOc2ccc(C(=O)C(OC)(OC)c3ccccc3)cc2)cc1)c1ccccc1]

INI-A8

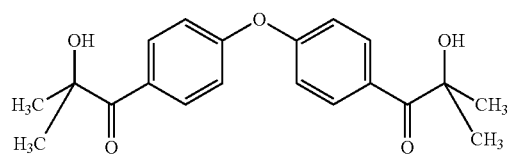 [SMILES: CC(C)(O)C(=O)c1ccc(Oc2ccc(C(=O)C(C)(C)O)cc2)cc1]

INI-A9

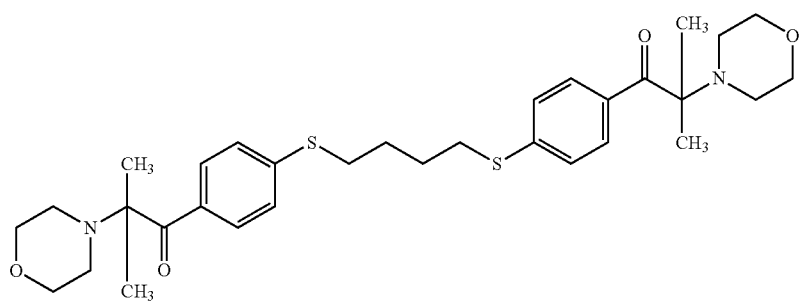 [SMILES: CC(C)(C(=O)c1ccc(SCCCCSc2ccc(C(=O)C(C)(C)N3CCOCC3)cc2)cc1)N1CCOCC1]

INI-A10

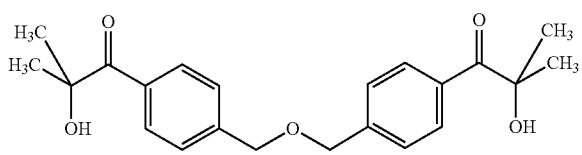 [SMILES: CC(C)(O)C(=O)c1ccc(COCc2ccc(C(=O)C(C)(C)O)cc2)cc1]

In comparison with their monofunctional analogues, it was observed that non-polymeric di- and multifunctional photoinitiators resulted in far less detectable extractables. Another advantage, especially for inkjet inks, is that non-polymeric di- and multifunctional photoinitiators have limited or no influence on the viscosity, contrary to the polymeric photoinitiators.

Polymeric Photoinitiators

Suitable polymeric initiators have been recently reviewed by Hrdlovic P. (Polymer News, 30(6), 179-182 (2005) and Polymer News, 30(8), 248-250 (2005)) and Corrales T. (Journal of Photochemistry and Photobiology A: Chemistry 159 (2003), 103-114). Further interesting polymeric photoinitiators can be found in CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, UK, 1998 edited by Dr. G. Bradley; ISBN 0471 978922, page 208-224.

Particularly suitable polymeric and oligomeric photoinitiators have been disclosed by Bertens et al. (RadTech Europe 05, Conference Proceedings (2005) 1, 473-478), by WO 03/033452 (COATES BROTHERS) and by WO 03/033492 (COATES BROTHERS).

For reasons of obtaining low viscosity, the preferred polymeric architecture used in jettable radiation curable compositions and inkjet inks is a dendritic polymeric architecture, more preferably a hyperbranched polymeric architecture. Preferred hyperbranched polymeric photoinitiators are those disclosed in US 2006014851 (AGFA) and US 2006014853 (AGFA) incorporated herein as a specific reference.

Suitable polymeric and oligomeric initiators are given below in Table 5 without being limited thereto. The hyperbranched structures (INI-B1, INI-B4 and INI-B11) are illustrated with one specific molecular weight and degree of substitution out of the mixture for the sake of clarity.

TABLE 5
INI-B1
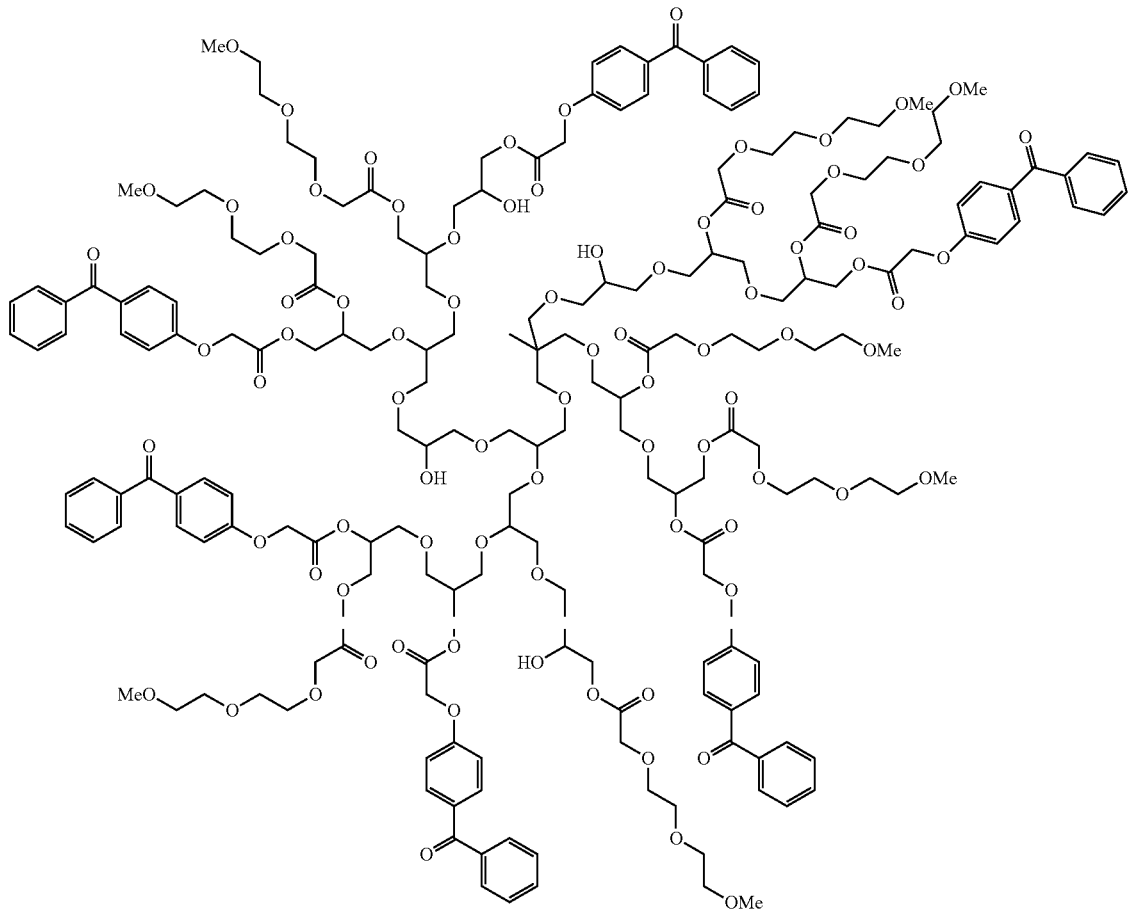 [SMILES: COCCOCCOCC(=O)OCC(O)COCC(COC(COCC(O)COCC(COCC(COC(=O)COCCOCCOC)OCC(O)COC(=O)COc1ccc(C(=O)c2ccccc2)cc1)OCC(COC(=O)COc1ccc(C(=O)c2ccccc2)cc1)OC(=O)COCCOCCOC)COCC(C)(COCC(O)COCC(COCC(COC(=O)COc1ccc(C(=O)c2ccccc2)cc1)OC(=O)COCCOCCOC)OC(=O)COCCOCCOC)COCC(COCC(COC(=O)COCCOCCOC)OC(=O)COc1ccc(C(=O)c2ccccc2)cc1)OC(=O)COCCOCCOC)OCC(COCC(COC(=O)COCCOCCOC)OC(=O)COc1ccc(C(=O)c2ccccc2)cc1)OC(=O)COc1ccc(C(=O)c2ccccc2)cc1]
INI-B2
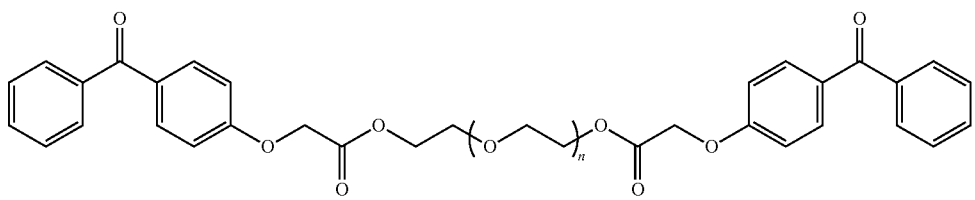
n = 5 on average
INI-B3
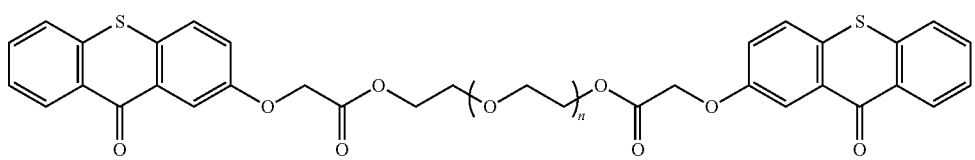
n = 15 on average

TABLE 5-continued
INI-B4
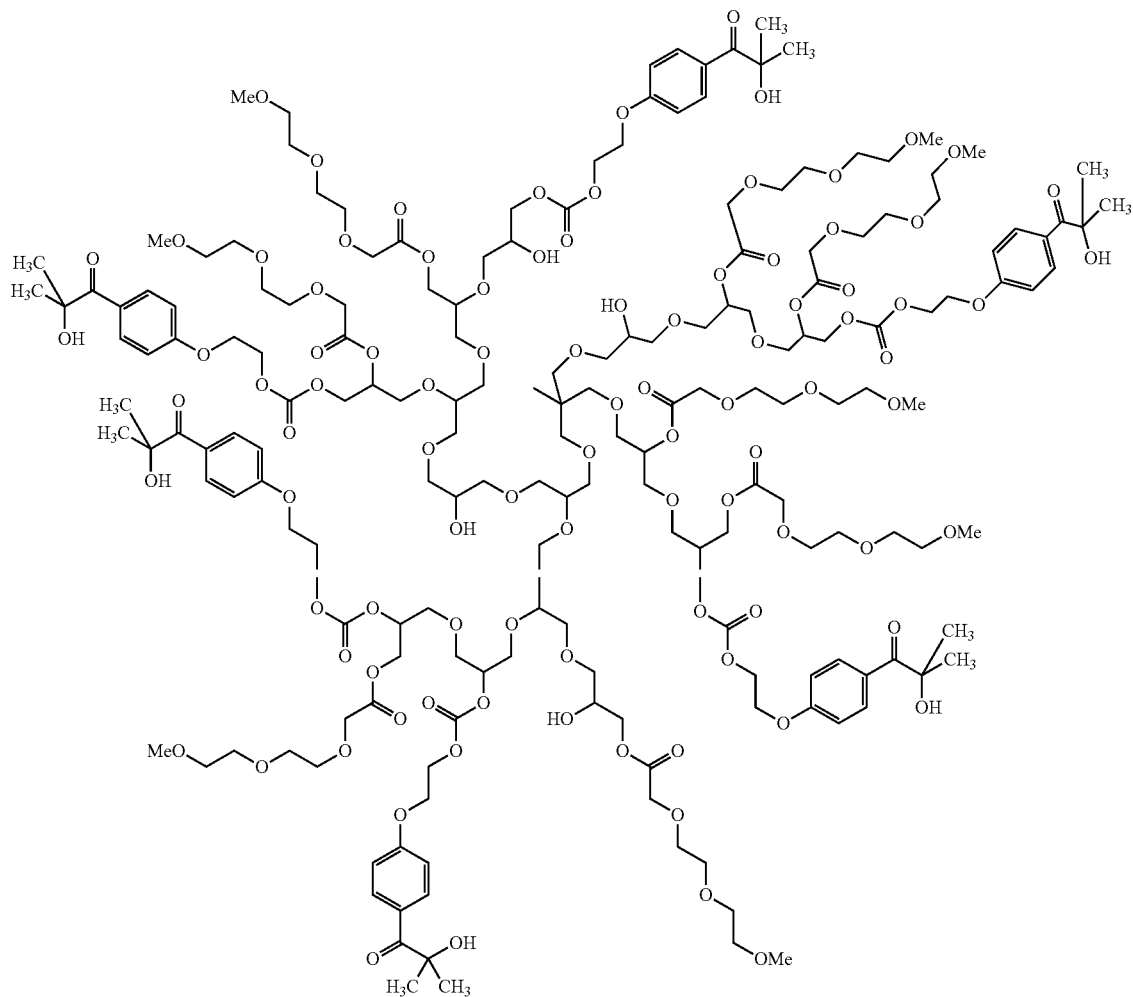 [SMILES: COCCOCCOCC(=O)OCC(O)COCC(COC(COCC(O)COCC(COCC(COC(=O)COCCOCCOC)OCC(O)COC(=O)OCCOc1ccc(C(=O)C(C)(C)O)cc1)OCC(COC(=O)OCCOc1ccc(C(=O)C(C)(C)O)cc1)OC(=O)COCCOCCOC)COCC(C)(COCC(O)COCC(COCC(COC(=O)OCCOc1ccc(C(=O)C(C)(C)O)cc1)OC(=O)COCCOCCOC)OC(=O)COCCOCCOC)COCC(COCC(COC(=O)COCCOCCOC)OC(=O)OCCOc1ccc(C(=O)C(C)(C)O)cc1)OC(=O)COCCOCCOC)OCC(COCC(COC(=O)COCCOCCOC)OC(=O)OCCOc1ccc(C(=O)C(C)(C)O)cc1)OC(=O)OCCOc1ccc(C(=O)C(C)(C)O)cc1]
INI-B5
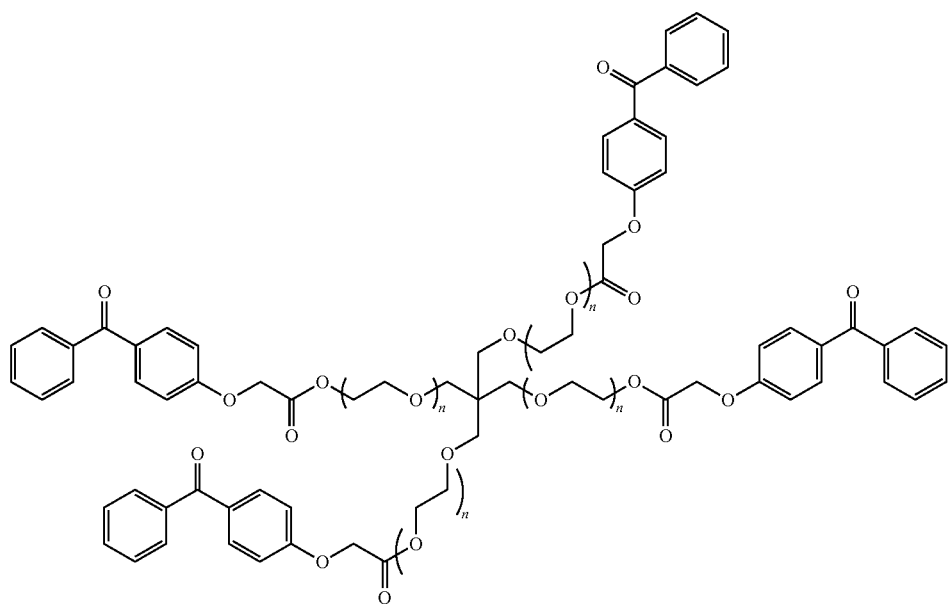
derived from pentaerythritol ethoxylate (15/4 EO/OH)

TABLE 5-continued
INI-B6
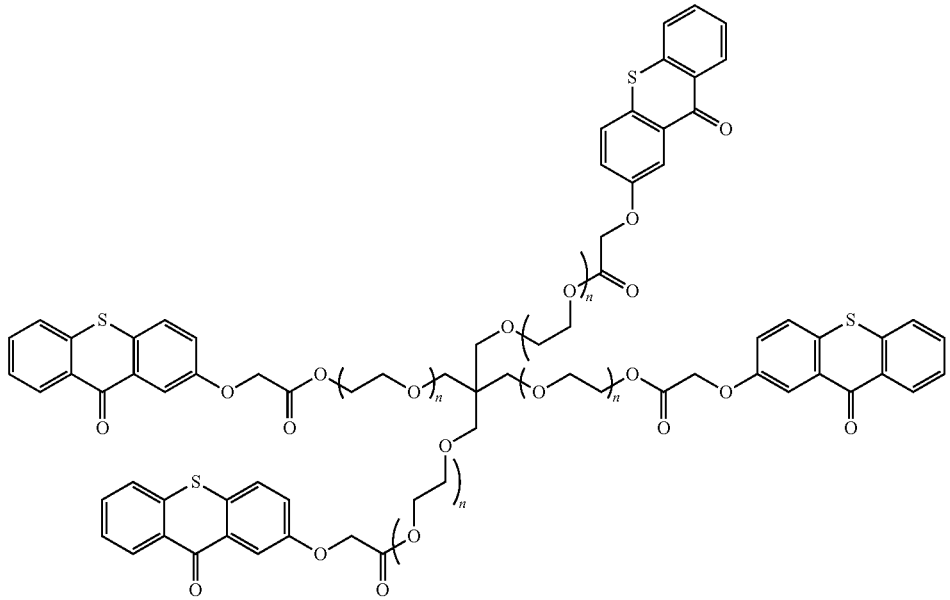
derived from pentaerythritol ethoxylate (15/4 EO/OH)
INI-B7
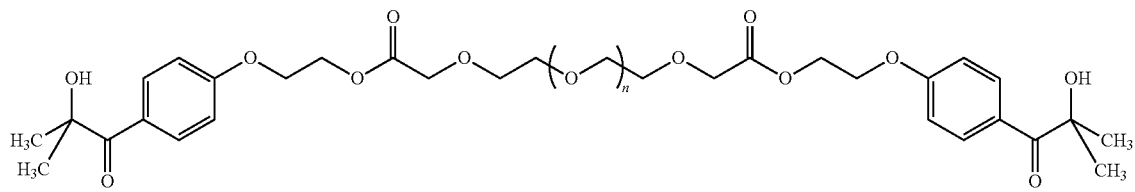
derived from poly(ethylene glycol) bis(carboxymethyl) ether with MW of 250
INI-B8
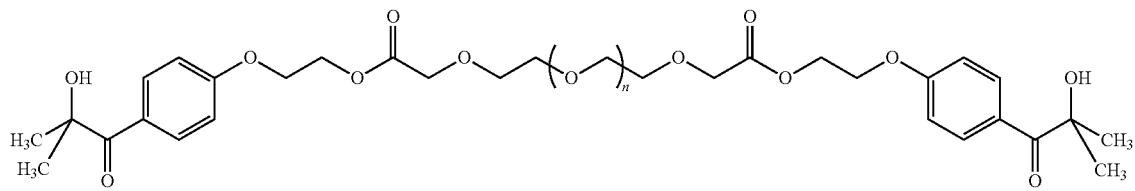
derived from poly(ethylene glycol) bis(carboxymethyl) ether with MW of 600
INI-B9
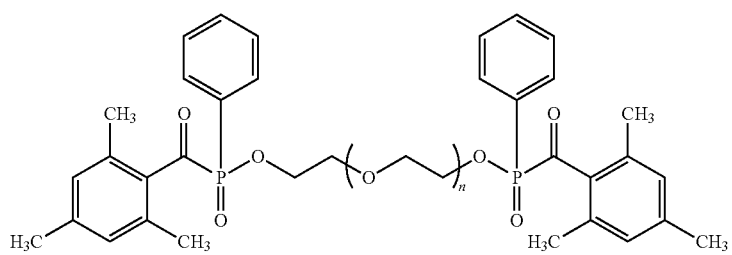
derived from poly(ethylene glycol) with MW of 200

TABLE 5-continued

INI-B10

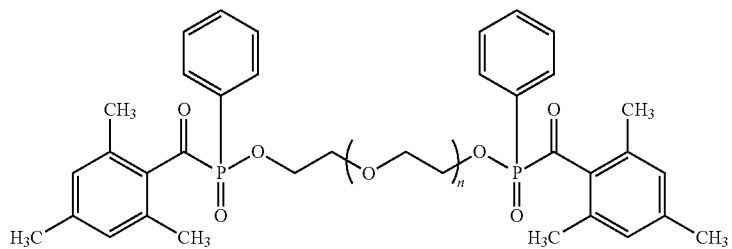

derived from poly(ethylene glycol) with MW of 600

INI-B11

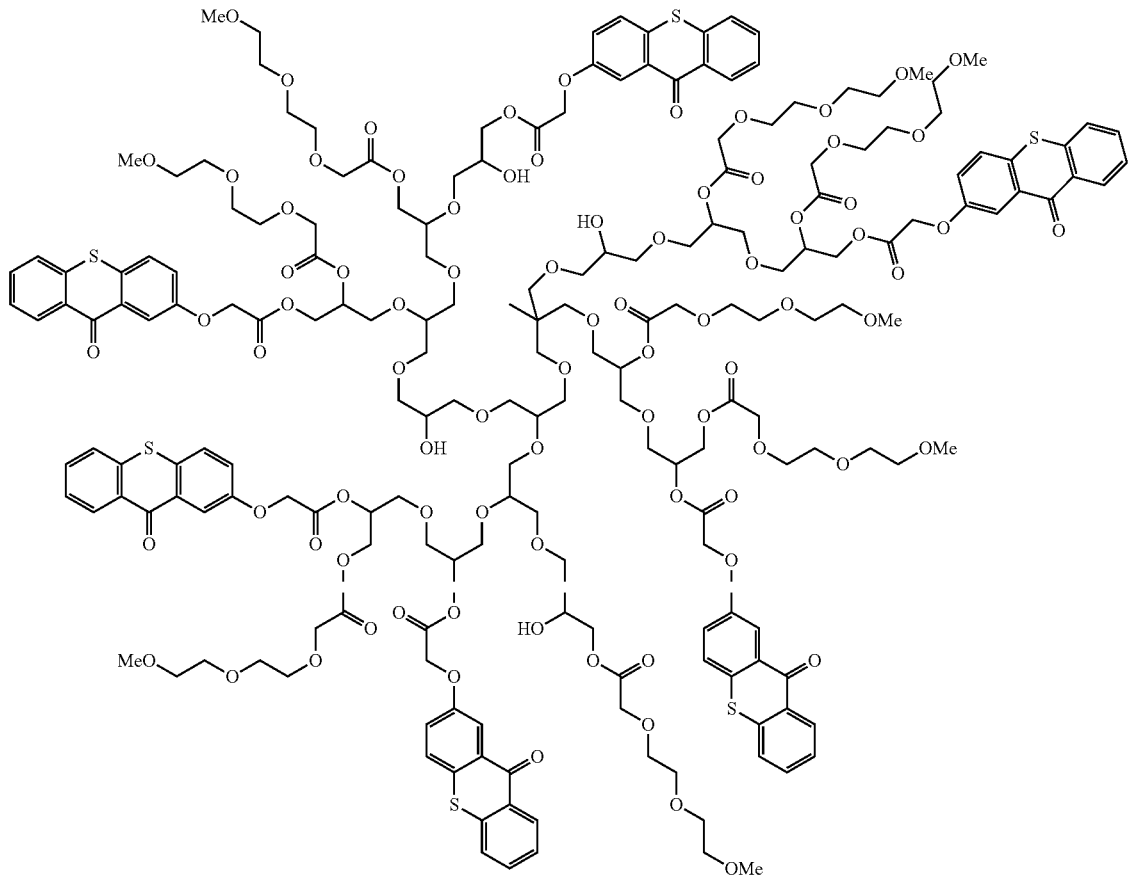 [SMILES: COCCOCCOCC(=O)OCC(O)COCC(COC(COCC(O)COCC(COCC(COC(=O)COCCOCCOC)OCC(O)COC(=O)COc1ccc2sc3ccccc3c(=O)c2c1)OCC(COC(=O)COc1ccc2sc3ccccc3c(=O)c2c1)OC(=O)COCCOCCOC)COCC(C)(COCC(O)COCC(COCC(COC(=O)COc1ccc2sc3ccccc3c(=O)c2c1)OC(=O)COCCOCCOC)OC(=O)COCCOCCOC)COCC(COCC(COC(=O)COCCOCCOC)OC(=O)COc1ccc2sc3ccccc3c(=O)c2c1)OC(=O)COCCOCCOC)OCC(COCC(COC(=O)COCCOCCOC)OC(=O)COc1ccc2sc3ccccc3c(=O)c2c1)OC(=O)COc1ccc2sc3ccccc3c(=O)c2c1]

Polymerizable Photoinitiators

Suitable polymerizable photoinitiators have been disclosed in DE 3534645 (MERCK) and EP 0377191 A (BASF). Other suitable polymerizable photoinitiators have been disclosed by Baeumer et al. (RADCUR '86, Conference Proceedings (1986), 4/43-4/55), Ruhlmann et al. (European Polymer Journal, 28(9), 1063-1067 (1992)) and Allen et al. (Journal of Photochemistry and Photobiology, A: Chemistry: 130(1,2), 185-189 (1997)).

In a preferred embodiment the polymerizable photoinitiator includes at least one (meth)acrylate group, most preferably at least one acrylate group.

Preferred polymerizable photoinitiators are given below in Table 6, without being limited thereto.

TABLE 6
INI-C1
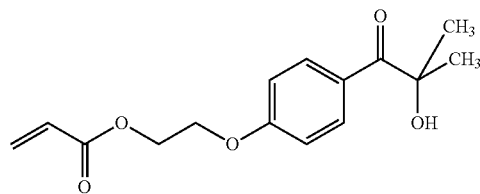 [SMILES: C=CC(=O)OCCOc1ccc(C(=O)C(C)(C)O)cc1]
INI-C2
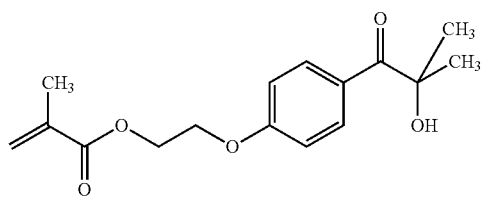 [SMILES: C=C(C)C(=O)OCCOc1ccc(C(=O)C(C)(C)O)cc1]
INI-C3
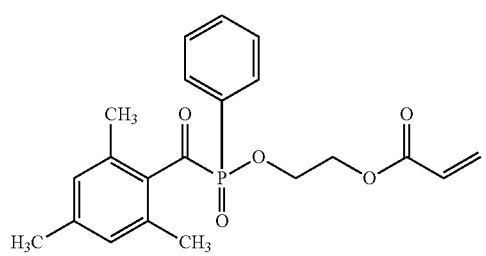 [SMILES: C=CC(=O)OCCOP(=O)(C(=O)c1c(C)cc(C)cc1C)c1ccccc1]
INI-C4
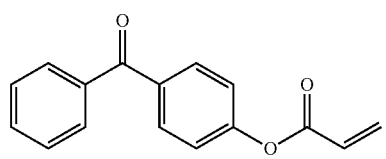 [SMILES: C=CC(=O)Oc1ccc(C(=O)c2ccccc2)cc1]
INI-C5
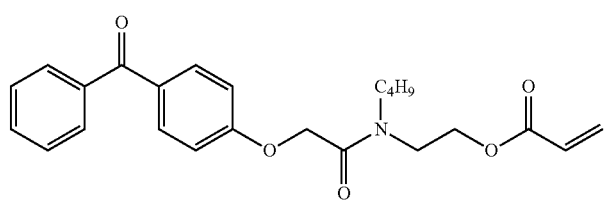
INI-C6
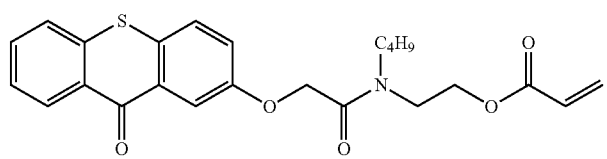
INI-C7
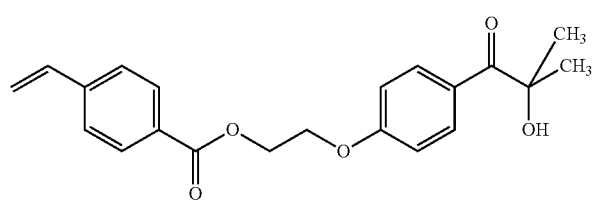 [SMILES: C=Cc1ccc(C(=O)OCCOc2ccc(C(=O)C(C)(C)O)cc2)cc1]

TABLE 6-continued

INI-C8
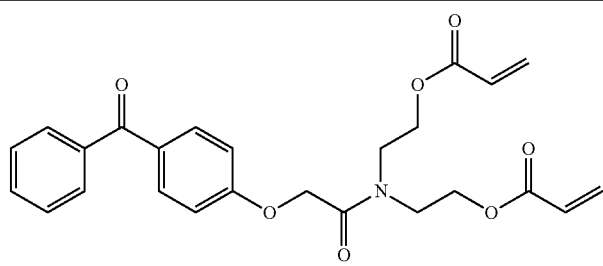

INI-C9
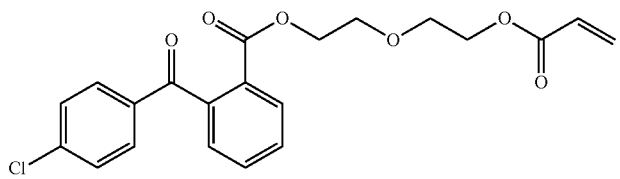 [SMILES: C=CC(=O)OCCOCCOC(=O)c1ccccc1C(=O)c1ccc(Cl)cc1]

INI-C10
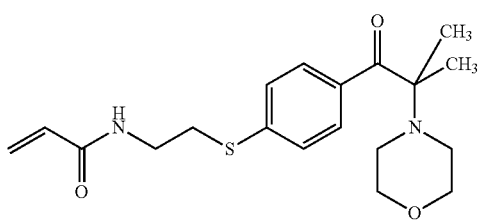 [SMILES: C=CC(=O)NCCSc1ccc(C(=O)C(C)(C)N2CCOCC2)cc1]

INI-C11
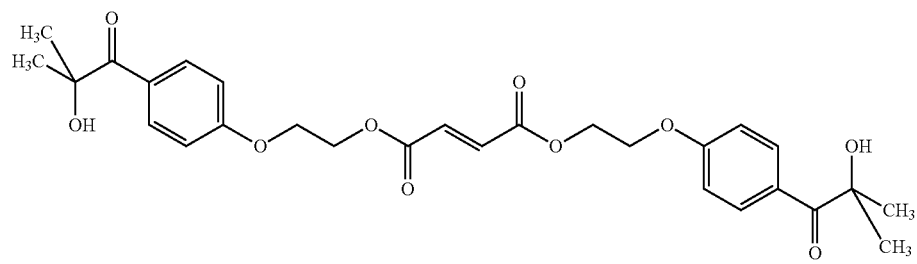 [SMILES: CC(C)(O)C(=O)c1ccc(OCCOC(=O)/C=C/C(=O)OCCOc2ccc(C(=O)C(C)(C)O)cc2)cc1]

INI-C12
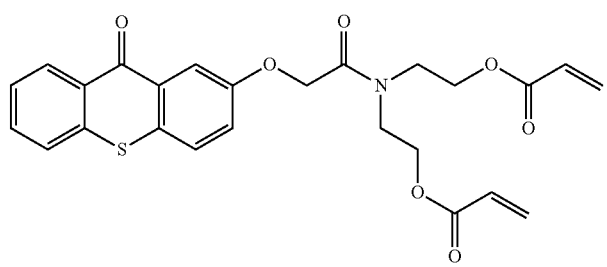 [SMILES: C=CC(=O)OCCN(CCOC(=O)C=C)C(=O)COc1ccc2sc3ccccc3c(=O)c2c1]

INI-C13
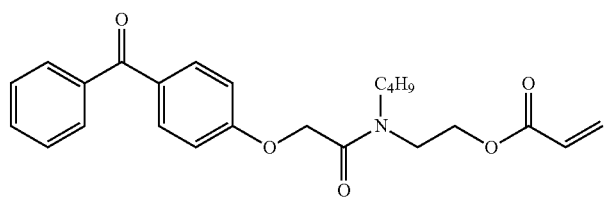

Diffusion Hindered Co-Initiators

When one or more co-initiators are included into the curable liquid or ink according to a preferred embodiment of the present invention, preferably these co-initiators are diffusion hindered.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator.

A preferred diffusion hindered co-initiator is a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

A more preferred diffusion hindered co-initiator is one or more polymerizable co-initiators. In a preferred embodiment the polymerizable co-initiator includes at least one (meth)acrylate group, most preferably at least one acrylate group.

A preferred polymerizable co-initiator is a co-initiator according to Formula (CO-I):

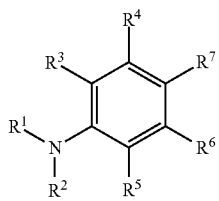

Formula (CO-I)

wherein, $R^1$ and $R^2$ are independently selected from the group consisting of an alkyl group, an alkenyl group, an alkynyl group, an aralkyl group, an alkaryl group, an aryl group and a heteroaryl group;

$R^3$ to $R^6$ are independently selected from the group consisting of hydrogen, an alkyl group, an alkenyl group, an alkynyl group, an acyl group, a thioalkyl group, an alkoxy group, a halogen, an aralkyl group, an alkaryl group, an aryl group and a heteroaryl group;

$R^7$ is selected from the group consisting of hydrogen, an aldehyde group, a ketone group, an ester group, an amide group, an acyl group, a thioalkyl group, an alkoxy group, a halogen, a nitrile group, a sulphonate group, a sulphonamide group, an alkyl group, an alkenyl group, an alkynyl group, an aralkyl group, an alkaryl group, an aryl group and a heteroaryl group;

$R^1$ and $R^2$, $R^1$ and $R^3$, $R^2$ and $R^5$, $R^3$ and $R^4$, $R^4$ and $R^7$, $R^5$ and $R^6$, and $R^6$ and $R^7$ may represent the necessary atoms to form a 5- to 8-membered ring; and with the proviso that the aromatic amine has at least one Alfa hydrogen; and at least one of $R^1$ to $R^7$ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile. In the polymerizable co-initiator, preferably $R^7$ represents an electron withdrawing group selected from the group consisting of an aldehyde, a ketone, an ester and an amide, and more preferably $R^3$, $R^4$, $R^5$ and $R^6$ all represent hydrogen.

The alkyl groups, alkenyl groups, alkynyl groups, aralkyl groups, alkaryl groups, aryl groups and heteroaryl groups used for $R^1$ to $R^7$ can be substituted or unsubstituted groups, i.e. a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group may be used.

In a preferred embodiment, the polymerizable co-initiator corresponds to Formula (CO-II):

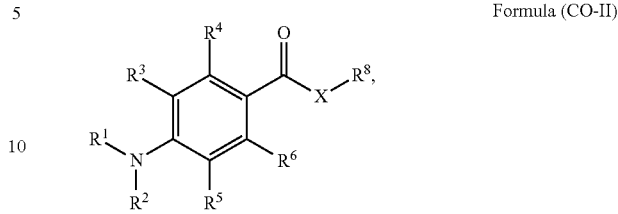

Formula (CO-II)

wherein, $R^1$ to $R^6$ have the same meaning as defined for Formula (CO-I);

X is selected from the group consisting of O, S and $NR^9$;

$R^8$ and $R^9$ are independently selected from the group consisting of hydrogen, an alkyl group, an alkenyl group, an alkynyl group, an aralkyl group, an alkaryl group, an aryl group and a heteroaryl group;

$R^1$ and $R^2$, $R^1$ and $R^3$, $R^2$ and $R^5$, $R^3$ and $R^4$, $R^5$ and $R^6$, $R^4$ and $R^8$, $R^6$ and $R^8$, and $R^8$ and $R^9$ may represent the necessary atoms to form a 5- to 8-membered ring; and at least one of $R^1$ to $R^6$ and $R^8$ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile. In the polymerizable co-initiator, preferably $R^3$, $R^4$, $R^5$ and $R^6$ all represent hydrogen.

In one preferred embodiment of the polymerizable co-initiator having Formula (CO-II), R1 represents methyl or ethyl and $R^2$ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile; and more preferably also $R^3$, $R^4$, $R^5$ and $R^6$ all represent hydrogen.

In another preferred embodiment of the polymerizable co-initiator having Formula (CO-II), R1 and $R^2$ independently represent methyl or ethyl and $R^8$ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile; and more preferably also $R^3$, $R^4$, $R^5$ and $R^6$ all represent hydrogen.

In a more preferred embodiment, the polymerizable co-initiator corresponds to Formula (CO-III):

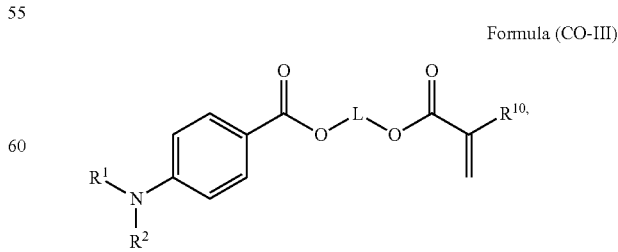

Formula (CO-III)

$R^1$ and $R^2$ are independently selected from the group consisting of methyl, ethyl, propyl and butyl;

L represents a divalent linking group including at least one carbon atom; and $R^{10}$ represents hydrogen, methyl, ethyl, propyl or butyl.

In a preferred embodiment the divalent linking group L includes 1 to 30 carbon atoms, more preferably 2 to 10 carbon atoms and most preferably 3 to 6 atoms.

The polymerizable co-initiator may contain two, three or more polymerizable ethylenically unsaturated functional groups independently selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile.

The polymerizable co-initiator may also contain more than one tertiary amine functional group, preferably the second or third tertiary amine functional group is also an aromatic tertiary amine, most preferably a dialkylamino benzoic acid derivative.

Suitable polymerizable co-initiators are given below in Table 7 without being limited thereto.

TABLE 7

COINI-1
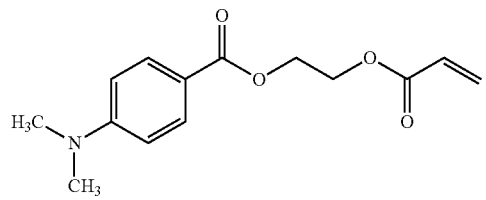 [SMILES: C=CC(=O)OCCOC(=O)c1ccc(N(C)C)cc1]

COINI-2
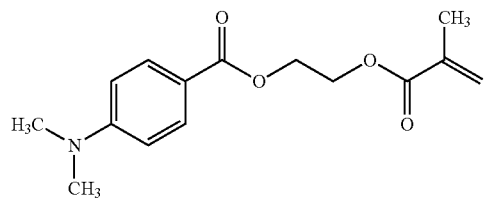 [SMILES: C=C(C)C(=O)OCCOC(=O)c1ccc(N(C)C)cc1]

COINI-3
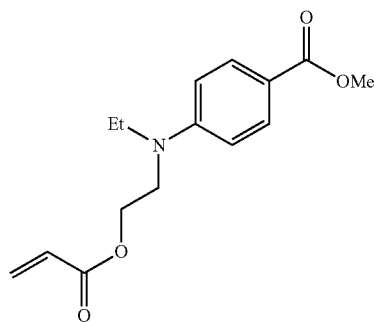 [SMILES: C=CC(=O)OCCN(CC)c1ccc(C(=O)OC)cc1]

COINI-4
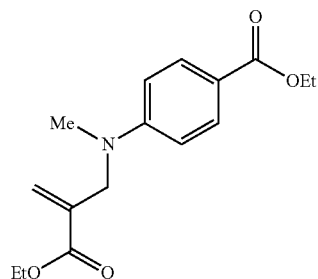 [SMILES: C=C(CN(C)c1ccc(C(=O)OCC)cc1)C(=O)OCC]

COINI-5
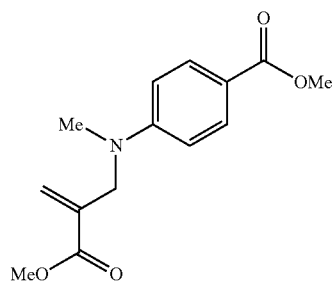 [SMILES: C=C(CN(C)c1ccc(C(=O)OC)cc1)C(=O)OC]

TABLE 7-continued
COINI-6
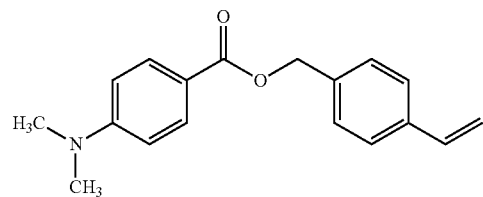 [SMILES: C=Cc1ccc(COC(=O)c2ccc(N(C)C)cc2)cc1]
COINI-7
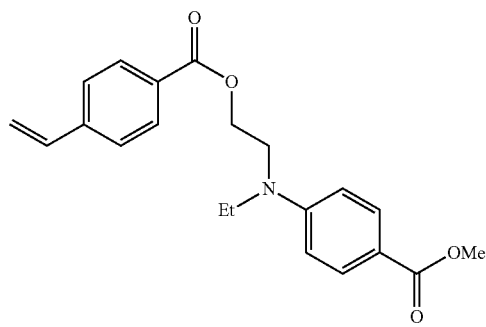 [SMILES: C=Cc1ccc(C(=O)OCCN(CC)c2ccc(C(=O)OC)cc2)cc1]
COINI-8
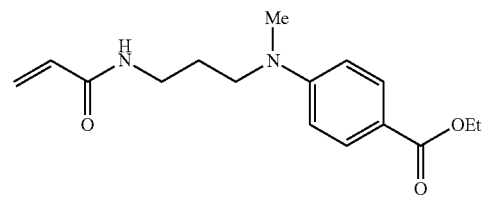 [SMILES: C=CC(=O)NCCCN(C)c1ccc(C(=O)OCC)cc1]
COINI-9
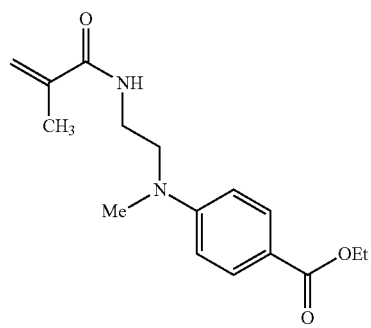 [SMILES: C=C(C)C(=O)NCCN(C)c1ccc(C(=O)OCC)cc1]
COINI-10
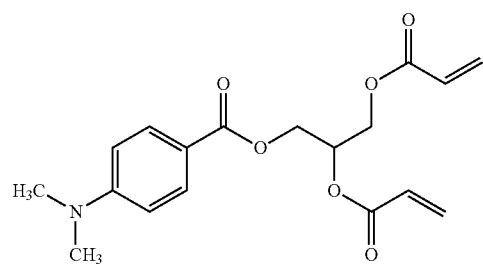 [SMILES: C=CC(=O)OCC(COC(=O)c1ccc(N(C)C)cc1)OC(=O)C=C]

TABLE 7-continued
COINI-11
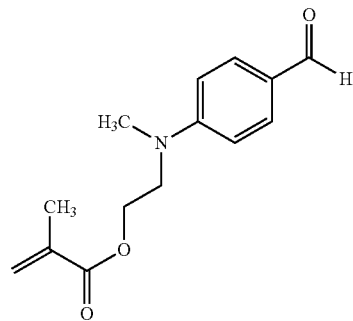 [SMILES: C=C(C)C(=O)OCCN(C)c1ccc(C=O)cc1]
COINI-12
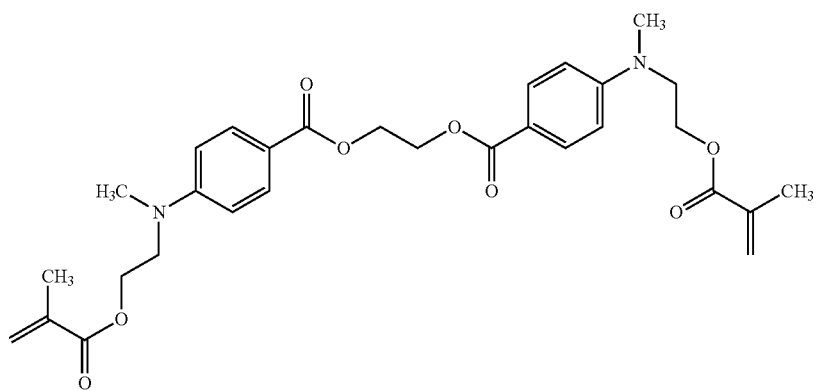 [SMILES: C=C(C)C(=O)OCCN(C)c1ccc(C(=O)OCCOC(=O)c2ccc(N(C)CCOC(=O)C(=C)C)cc2)cc1]
COINI-13
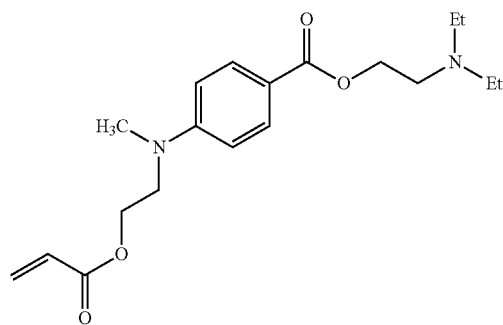 [SMILES: C=CC(=O)OCCN(C)c1ccc(C(=O)OCCN(CC)CC)cc1]
COINI-14
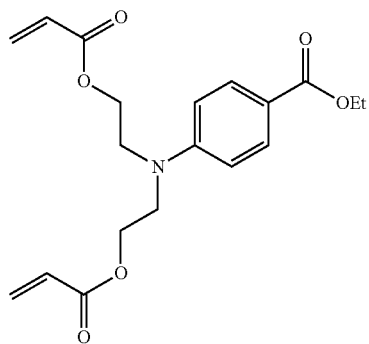 [SMILES: C=CC(=O)OCCN(CCOC(=O)C=C)c1ccc(C(=O)OCC)cc1]
COINI-15
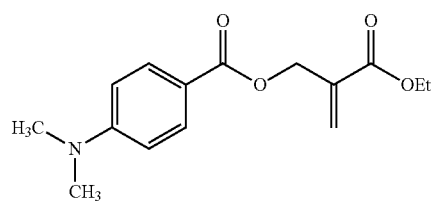 [SMILES: C=C(COC(=O)c1ccc(N(C)C)cc1)C(=O)OCC]

TABLE 7-continued
COINI-16 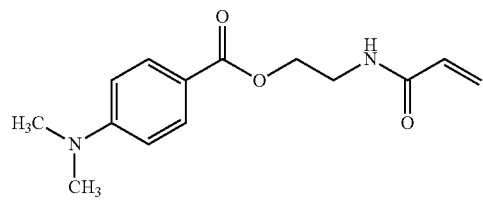 [SMILES: C=CC(=O)NCCOC(=O)c1ccc(N(C)C)cc1]
COINI-17 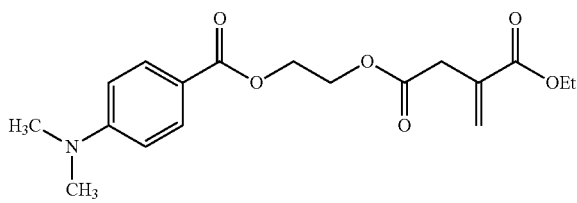 [SMILES: C=C(CC(=O)OCCOC(=O)c1ccc(N(C)C)cc1)C(=O)OCC]
COINI-18 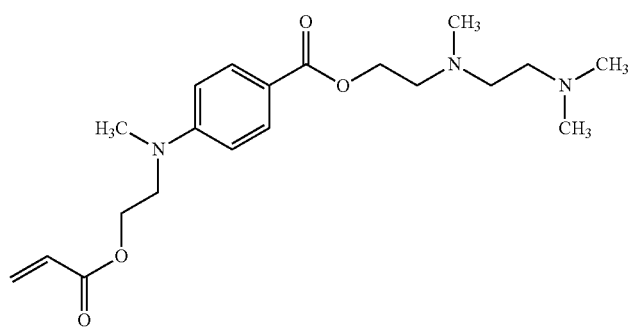 [SMILES: C=CC(=O)OCCN(C)c1ccc(C(=O)OCCN(C)CCN(C)C)cc1]
COINI-19 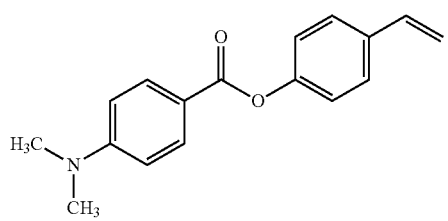 [SMILES: C=Cc1ccc(OC(=O)c2ccc(N(C)C)cc2)cc1]
COINI-20 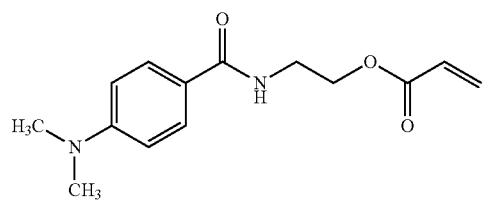
COINI-21 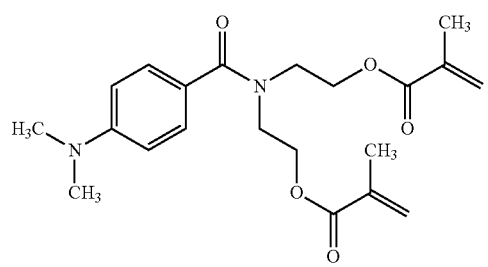 [SMILES: C=C(C)C(=O)OCCN(CCOC(=O)C(=C)C)C(=O)c1ccc(N(C)C)cc1]

The curable ink preferably includes the polymerizable co-initiator in an amount of 0.1 to 50 wt %, more preferably in an amount of 0.5 to 25 wt %, most preferably in an amount of 1 to 10 wt % of the total weight of the ink.

Colorants

The curable ink may contain a colorant. Colorants used in the curable inks may be dyes, pigments or a combination thereof. Organic and/or inorganic pigments may be used.

The colorant is preferably a pigment or a polymeric dye, most preferably a pigment. In food packaging applications, low molecular weight dyes, e.g. smaller than 1000 Dalton, can still migrate into the food or be extracted by the food giving undesired coloration of the food, or even worse allergic reactions after consuming the solid or liquid food. Most preferably the colorant is a pigment.

The pigments may be black, white, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley—VCH, 2004. ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 266, 270 and 272.

Particular preferred pigments are C.I. Pigment Violet 1, 2, 19, 23, 32, 37 and 39.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from Ciba Specialty Chemicals.

Carbon black is preferred as a black pigment. Suitable black pigments include carbon blacks such as Pigment Black 7 (e.g. Carbon Black MA8® from MITSUBISHI CHEMICAL), REGAL® 400R, MOGUL® L, ELFTEX® 320 from CABOT Co., or Carbon Black FW18, Special Black 250, Special Black 350, Special Black 550, PRINTEX® 25, PRINTEX® 35, PRINTEX® 55, PRINTEX® 90, PRINTEX® 150T from DEGUSSA. Additional examples of suitable pigments are disclosed in U.S. Pat. No. 5,389,133 (XEROX).

It is also possible to make mixtures of pigments. For example, in some inkjet ink application a neutral black inkjet ink is preferred and can be obtained e.g. by mixing a black pigment and a cyan pigment into the ink. Also pigments may be combined to enlarge the colour gamut of an ink set. The inkjet application may also require one or more spot colours. Silver and gold are often desired colours for making a product more attractive by giving it an exclusive appearance.

Also non-organic pigments may be present in the inks. Suitable pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black. However, care should be taken to prevent migration and extraction of heavy metals in food application. In the preferred embodiment no pigments are used which contain a heavy metal selected from the group consisting of arsenic, lead, mercury and cadmium.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness, but mainly also because very small pigment particles or individual pigment molecules thereof may still be extracted in food packaging applications.

The numeric average pigment particle size of pigment particles is best determined with a Brookhaven Instruments Particle Sizer BI90plus based upon the principle of dynamic light scattering. The ink is then diluted, for example, with ethyl acetate to a pigment concentration of 0.002 wt %. The measurement settings of the BI90plus are: 5 runs at 23° C., angle of 90°, wavelength of 635 nm and graphics=correction function.

In the case of a white curable ink, preferably a pigment with a refractive index greater than 1.60, preferably greater than 2.00, more preferably greater than 2.50 and most preferably greater than 2.60. The white pigments may be employed singly or in combination.

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in a preferred embodiment of this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high coloring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable.

The numeric average particle diameter of the titanium oxide or other white pigments is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a MALVERN™ nano-S available from Goffin-Meyvis. A sample can be, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

The pigment is preferably used in a pigment dispersion used for preparing inkjet inks in an amount of 10 to 40 wt %, more preferably of 15 to 30 wt % based on the total weight of the pigment dispersion. In a curable inkjet ink the pigment is preferably present in an amount of 0.1 to 20 wt %, preferably 1 to 10 wt % based on the total weight of the inkjet ink.

Dispersants

The dispersant is preferably a polymeric dispersant. Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

statistically polymerized monomers (e.g. monomers A and B polymerized into ABBAABAB);
alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;
graft copolymers (graft copolymers consist of a polymeric backbone with polymeric side chains attached to the backbone); and
mixed forms of these polymers, e.g. blocky gradient copolymers.

Polymeric dispersants may have different polymer architecture including linear, comb/branched, star, dendritic (including dendrimers and hyperbranched polymers). A general review on the architecture of polymers is given by ODIAN, George, Principles of Polymerization, 4th edition, Wiley-Interscience, 2004, p. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multi-step synthesis), while hyperbranched polymers have a plurality of branch points and multifunctional branches that lead to further branching with polymer growth (one-step polymerization process).

Suitable polymeric dispersants may be prepared via addition or condensation type polymerizations. Polymerization methods include those described by ODIAN, George, Principles of Polymerization, 4th edition, Wiley-Interscience, 2004, p. 39-606.

Addition polymerization methods include free radical polymerization (FRP) and controlled polymerization techniques. Suitable controlled radical polymerization methods include:
RAFT: reversible addition-fragmentation chain transfer;
ATRP: atom transfer radical polymerization
MADIX: reversible addition-fragmentation chain transfer process, using a transfer active xanthate;
Catalytic chain transfer (e.g. using cobalt complexes);
Nitroxide (e.g. TEMPO) mediated polymerizations;
Other suitable controlled polymerization methods include:
GTP: group transfer polymerization;
Living cationic (ring-opening) polymerizations;
Anionic co-ordination insertion ring-opening polymerization; and
Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN J. F. et al., Facile Synthesis of comb, star, and graft polymers via reversible addition-fragmentation chain transfer (RAFT) polymerization, Journal of Polymer Science, Part A: Polymer Chemistry, Vol. 40, 2956-2966, 2002.

Group transfer polymerization (GTP): the method of GTP used for synthesis of AB block copolymers is disclosed by SPINELLI, Harry J, GTP and its use in water based pigment dispersants and emulsion stabilisers, Proc. of 20th Int. Conf. Org. Coat. Sci. Technol., New Platz, N.Y., State Univ. N.Y., Inst. Mater. Sci. p. 511-518.

The synthesis of dendritic polymers is described in the literature. The synthesis of dendrimers in NEWCOME, G. R., et al. Dendritic Molecules: Concepts, Synthesis, Perspectives. VCH: WEINHEIM, 2001. Hyperbranching polymerization is described by BURCHARD, W. Solution properties of branched macromolecules. *Advances in Polymer Science.* 1999, vol. 143, no. II, p. 113-194. Hyperbranched materials can be obtained by polyfunctional polycondensation as disclosed by FLORY, P. J. Molecular size distribution in three-dimensional polymers. VI. Branched polymer containing A-R-Bf-1-type units. *Journal of the American Chemical Society.* 1952, vol. 74, p. 2718-1723.

Living cationic polymerizations is e.g. used for the synthesis of polyvinyl ethers as disclosed in WO 2005/012444 (CANON), US 20050197424 (CANON) and US 20050176846 (CANON). Anionic co-ordination ring-opening polymerization is e.g. used for the synthesis of polyesters based on lactones. Living anionic ring-opening polymerization is e.g. used for the synthesis of polyethylene oxide macromonomers.

Free radical Polymerization (FRP) proceeds via a chain mechanism, which basically consists of four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by combination).

Polymeric dispersants having several of the above polymer compositions are disclosed in U.S. Pat. No. 6,022,908 (HP), U.S. Pat. No. 5,302,197 (DU PONT) and U.S. Pat. No. 6,528,557 (XEROX).

Suitable statistical copolymeric dispersants are disclosed in U.S. Pat. No. 5,648,405 (DU PONT), U.S. Pat. No. 6,245,832 (FUJI XEROX), U.S. Pat. No. 6,262,207 (3M), US 20050004262 (KAO) and U.S. Pat. No. 6,852,777 (KAO).

Suitable alternating copolymeric dispersants are described in US 20030017271 (AKZO NOBEL).

Suitable block copolymeric dispersants have been described in numerous patents, especially block copolymeric dispersants containing hydrophobic and hydrophilic blocks. For example, U.S. Pat. No. 5,859,113 (DU PONT) discloses AB block copolymers, U.S. Pat. No. 6,413,306 (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK), U.S. Pat. No. 6,521,715 (DU PONT).

Suitable branched copolymeric dispersants are described U.S. Pat. No. 6,005,023 (DU PONT), U.S. Pat. No. 6,031,019 (KAO), U.S. Pat. No. 6,127,453 (KODAK).

Suitable dendritic copolymeric dispersants are described in e.g. U.S. Pat. No. 6,518,370 (3M), U.S. Pat. No. 6,258,896 (3M), US 2004102541 (LEXMARK), U.S. Pat. No. 6,649,138 (QUANTUM DOT), US 2002256230 (BASF), EP 1351759 A (EFKA ADDITIVES) and EP 1295919 A (KODAK).

Suitable designs of polymeric dispersants for inkjet inks are disclosed in SPINELLI, Harry J., Polymeric Dispersants in Inkjet technology, *Advanced Materials,* 1998, Vol. 10, no. 15, p. 1215-1218.

The monomers and/or oligomers used to prepare the polymeric dispersant can be any monomer and/or oligomer found in the Polymer Handbook Vol. 1+2, 4th edition, edited by J. BRANDRUP et al., Wiley-Interscience, 1999.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable examples of monomers for synthesizing polymeric dispersants include: acrylic acid, methacrylic acid, maleic acid (or there salts), maleic anhydride, alkyl(meth)acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth)acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g. oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrene sulfonic acid; (meth)acrylonitrile; (meth)acrylamides (including N-mono and N,N-disubstituted) such as N-benzyl(meth)acrylamide; maleimides such as N-phenyl maleimide; vinyl derivatives such as vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate.

Suitable condensation type polymers include polyurethanes, polyamides, polycarbonates, polyethers, polyureas, polyimines, polyimides, polyketones, polyesters, polysiloxanes, phenol-formaldehydes, urea-formaldehydes, melamine-formaldehydes, polysulfides, polyacetals or combinations thereof.

Suitable copolymeric dispersants are acrylic acid/acrylonitrile copolymers, vinyl acetate/acrylic ester copolymers, acrylic acid/acrylic ester copolymers, styrene/acrylic acid copolymers, styrene/methacrylic acid copolymers, styrene/methacrylic acid/acrylic ester copolymers, styrene/α-methylstyrene/acrylic acid copolymers, styrene/α-methylstyrene/acrylic acid/acrylic ester copolymers, styrene/maleic acid copolymers, styrene/maleic anhydride copolymers, vinylnaphthalene/acrylic acid copolymers, vinylnapthalene/maleic acid copolymers, vinyl acetate/ethylene copolymers, vinyl acetate/fatty acid/ethylene copolymers, vinyl acetate/maleic ester copolymers, vinyl acetate/crotonic acid copolymers and vinyl acetate/acrylic acid copolymers.

Suitable chemistries of copolymeric dispersants also include:

Copolymers which are the product of a condensation process of poly(ethylene imine) with a carboxylic acid terminated polyester (made by addition polymerization); and Copolymers which are the product of a reaction of a multifunctional isocyanate with:

a compound monosubstituted with a group that is capable of reacting with an isocyanate, e.g. polyester;

a compound containing two groups capable of reacting with an isocyanate (cross-linker); and/or a compound with at least one basic ring nitrogen and a group that is capable of reacting with an isocyanate group.

A detailed list of suitable polymeric dispersants is disclosed by MC CUTCHEON, Functional Materials, North American Edition, Glen Rock, N.J.: Manufacturing Confectioner Publishing Co., 1990, p. 110-129.

Suitable pigment stabilisers are also disclosed in DE 19636382 (BAYER), U.S. Pat. No. 5,720,802 (XEROX), U.S. Pat. No. 5,713,993 (DU PONT), WO 96/12772 (XAAR) and U.S. Pat. No. 5,085,689 (BASF).

One polymeric dispersant or a mixture of two or more polymeric dispersants may be present to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant has preferably a polymerization degree DP between 5 and 1,000, more preferably between 10 and 500 and most preferably between 10 and 100.

The polymeric dispersant has preferably a number average molecular weight Mn between 500 and 30,000, more preferably between 1,500 and 10,000.

The polymeric dispersant has preferably a weight average molecular weight Mw smaller than 100,000, more preferably smaller than 50000 and most preferably smaller than 30,000.

The polymeric dispersant has preferably a polymeric dispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from DEGUSSA;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH.

Particularly preferred dispersants for UV-curable pigmented dispersions are SOLSPERSE™ 32000, 35000 and 39000 dispersants from NOVEON.

The polymeric dispersant is preferably used in an amount of 2 to 600 wt %, more preferably 5 to 200 wt % based on the weight of the pigment.

Inhibitors

The curable ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol, 2,6-di-tert.butyl-4-methylphenol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, 5110, 5120 and 5130) from Cytec Surface Specialties.

The inhibitor is preferably a polymerizable inhibitor.

In a preferred embodiment, the polymerizable inhibitor is a polymerizable phenolic polymerization inhibitor according to formula (II):

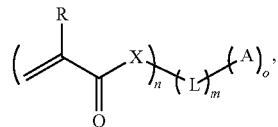

Formula (II)

wherein

R represents a hydrogen or a methyl group;

X represents O or $NR_1$, m represents 0 or 1;

n represents an integer from 1 to 5;

o represents an integer from 1 to 6;

A represents a substituted or unsubstituted phenolic moiety;

L represents a (n+o)-valent linking group including at maximum 20 carbon atoms;

$R_1$ represents a group selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl group and a substituted or unsubstituted heteroaryl group.

In a preferred embodiment of the polymerizable phenolic polymerization inhibitor according to formula (II), R represents hydrogen.

In a further preferred embodiment of the polymerizable phenolic polymerization inhibitor according to Formula (II), n and o are equal to 1.

In a particularly preferred embodiment of the polymerizable phenolic polymerization inhibitor according to Formula (II), A is represented by Formula (III):

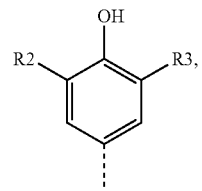

Formula (III)

wherein the dotted line represents the bonding site of L or X to the carbocyclic aromatic compound; and $R_2$ and $R_3$ are selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl group. Substituted or unsubstituted alkyl groups are particularly preferred.

In another particularly preferred embodiment of the polymerizable phenolic polymerization inhibitor according to Formula (II), A is represented by Formula (IV):

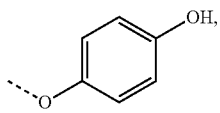

Formula (IV)

wherein the dotted line represents the bonding site of L or X to the carbocyclic aromatic compound.

Typical examples of polymerizable phenolic polymerisation inhibitors, according to a preferred embodiment of the present invention are given in Table 8, without being limited thereto.

TABLE 8

Stabilizer-1

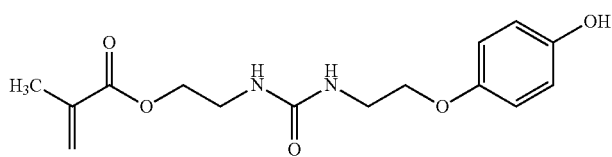 [SMILES: C=C(C)C(=O)OCCNC(=O)NCCOc1ccc(O)cc1]

Stabilizer-2

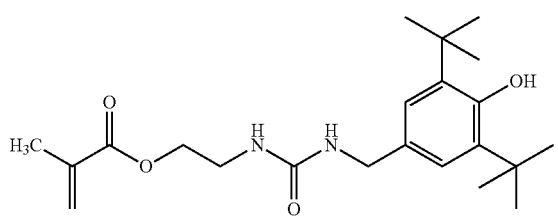 [SMILES: C=C(C)C(=O)OCCNC(=O)NCc1cc(C(C)(C)C)c(O)c(C(C)(C)C)c1]

Stabilizer-3

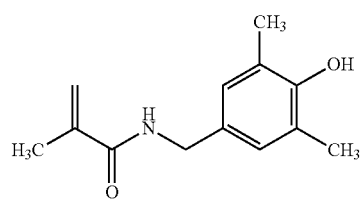 [SMILES: C=C(C)C(=O)NCc1cc(C)c(O)c(C)c1]

Stabilizer-4

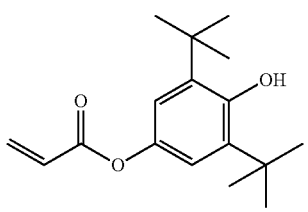 [SMILES: C=CC(=O)Oc1cc(C(C)(C)C)c(O)c(C(C)(C)C)c1]

Stabilizer-5

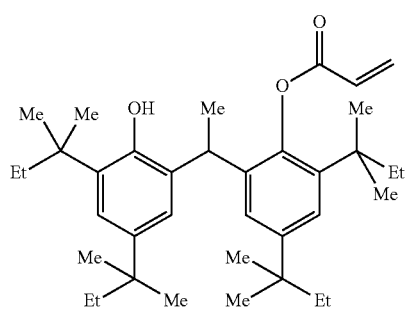 [SMILES: C=CC(=O)Oc1c(C(C)c2cc(C(C)(C)CC)cc(C(C)(C)CC)c2O)cc(C(C)(C)CC)cc1C(C)(C)CC]

Stabilizer-6

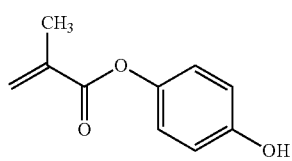

TABLE 8-continued
Stabilizer-7
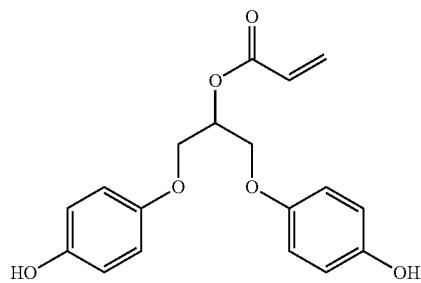 [SMILES: C=CC(=O)OC(COc1ccc(O)cc1)COc1ccc(O)cc1]
Stabilizer-8
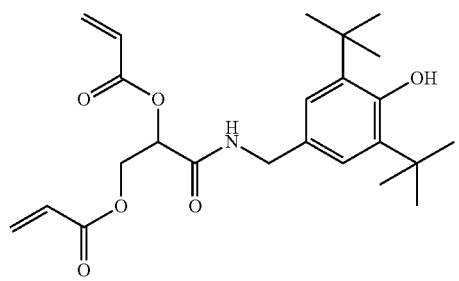 [SMILES: C=CC(=O)OCC(OC(=O)C=C)C(=O)NCc1cc(C(C)(C)C)c(O)c(C(C)(C)C)c1]
Stabilizer-9
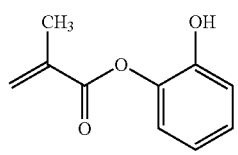
Stabilizer-10
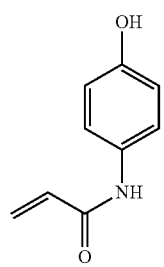
Stabilizer-11
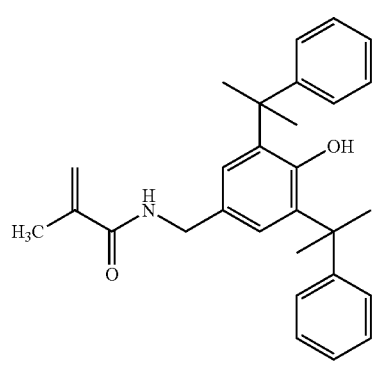 [SMILES: C=C(C)C(=O)NCc1cc(C(C)(C)c2ccccc2)c(O)c(C(C)(C)c2ccccc2)c1]
Stabilizer-12
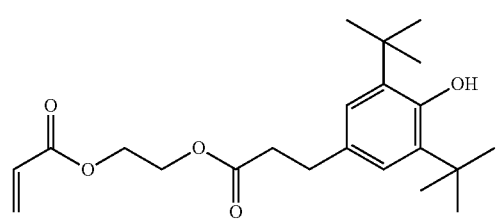 [SMILES: C=CC(=O)OCCOC(=O)CCc1cc(C(C)(C)C)c(O)c(C(C)(C)C)c1]

TABLE 8-continued

Stabilizer-13

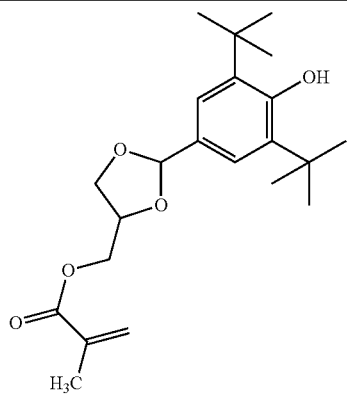

Stabilizer-14

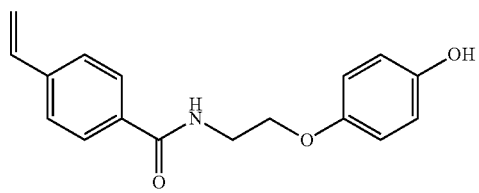 [SMILES: C=Cc1ccc(C(=O)NCCOc2ccc(O)cc2)cc1]

Stabilizer-15

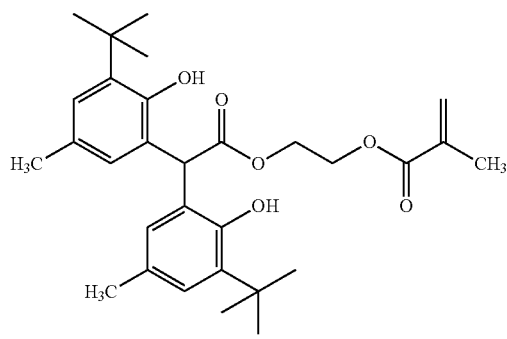 [SMILES: C=C(C)C(=O)OCCOC(=O)C(c1cc(C)cc(C(C)(C)C)c1O)c1cc(C)cc(C(C)(C)C)c1O]

Stabilizer-16

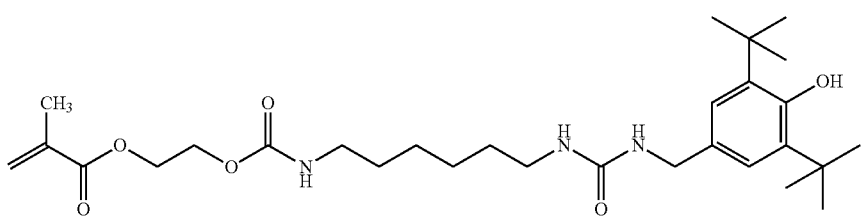 [SMILES: C=C(C)C(=O)OCCOC(=O)NCCCCCCNC(=O)NCc1cc(C(C)(C)C)c(O)c(C(C)(C)C)c1]

Since excessive addition of these polymerization inhibitors may lower the ink sensitivity to curing, it is preferred that the amount capable of preventing polymerization is determined prior to blending. The amount of a polymerization inhibitor is preferably lower than 5 wt %, more preferably lower than 3 wt % of the total ink.

Surfactants

The surfactant(s) can be anionic, cationic, non-ionic, or zwitter-ionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In radiation curable inkjet inks a fluorinated or silicone compound may be used as a surfactant, however, a cross-linkable surfactant would be preferred. It is therefore preferred to use a copolymerizable monomer having surface-active effects, for example, polyacrylate copolymers, silicone modified acrylates, silicone modified methacrylates, acrylated siloxanes, polyether modified acrylic modified siloxanes, fluorinated acrylates, and fluorinated methacrylates; these acrylates can be mono-, di-, tri- or higher functional (meth)acrylates.

Surfactants are known for use in inkjet inks to reduce the surface tension of the ink and to reduce the contact angle on the substrate, i.e. to improve the wetting of the substrate by the ink. On the other hand, the jettable fluid must meet stringent performance criteria in order to be adequately jettable with high precision, reliability and during an extended period of time. To achieve both wetting of the substrate by the ink and high jetting performance, typically, the surface tension of the ink is reduced by the addition of one or more surfactants. In the case of curable inkjet inks, however, the surface tension of the inkjet ink is not only determined by the amount and type of surfactant, but also by the polymerizable compounds, the polymeric dispersants and other additives in the ink composition.

Depending upon the application a surfactant can be used with a high, low or intermediate dynamic surface tension. Silicone surfactants are generally known to have low dynamic surface tensions while fluorinated surfactants are known to have higher dynamic surface tensions.

Useful commercially available fluorinated surfactants are for example the ZONYL™ range of fluoro-surfactants from DUPONT and the FLUORAD™ range of fluoro-surfactants from 3M. Other fluorinated surfactants are e.g. described in EP 1412438 A (3M).

Silicone surfactants are often preferred in curable inkjet inks, especially the reactive silicone surfactants, which are able to be polymerized together with the polymerizable compounds during the curing step.

Useful commercially available silicone surfactants are often polysiloxane surfactants, especially polyether modified polysiloxanes, preferably with one or more acrylate function in order to become polymerizable.

Examples of useful commercial silicone surfactants are those supplied by BYK CHEMIE GMBH (including BYK™-302, 307, 310, 331, 333, 341, 345, 346, 347, 348, UV3500, UV3510 and UV3530), those supplied by TEGO CHEMIE SERVICE (including Tego RAD™ 2100, 2200N, 2250, 2300, 2500, 2600 and 2700), EBECRYL™ 350 a polysilixone diacrylate and EBECRYL™ 1360 a polysilixone hexaacrylate from CYTEC INDUSTRIES BV and EFKA™-3000 series (including EFKA™-3232 and EFKA™-3883) from EFKA CHEMICALS B.V.

Inkjet Printing Methods

The inkjet printing method according to a preferred embodiment of the present invention includes the step of applying a layer having a composition as defined above for the curable liquid or ink on a substrate.

In a preferred embodiment of the inkjet printing method, the applied layer is a white primer, preferably containing a titanium dioxide pigment. White primers can be advantageously used, for example, on transparent substrates to enhance the contrast and the vividness of colour inks. White curable inks are then either used for so-called "surface printing" or "backing printing" to form a reflection image on a transparent substrate. In surface printing, a white background is formed on a transparent substrate using a white ink and further thereon, a color image is printed, where after the formed final image is viewed from the printed face. In so-called backing printing, a color image is formed on a transparent substrate using color inks and then a white ink is applied onto the color inks, and the final formed image is observed through the transparent substrate. In a preferred embodiment a colour inkjet ink is jetted on partially cured white inkjet ink. If the white ink is only partially cured, an improved wettability of the colour ink on the white ink layer is observed. Partially curing immobilizes the ink on the substrate surface. A quick test to verify that the white inkjet ink is partially cured can be done by rubbing a finger or a cloth across the printed surface, whereby it is observed that ink can be smeared or smudged on the surface.

In another preferred embodiment of the inkjet printing method, the applied layer is a colourless layer. This layer can be present as a primer, for example, for improving the adhesion of the image, or as an outermost layer, for example, for improving the glossiness of the image.

The above layer is preferably applied by a printing technique selected from the group consisting of inkjet printing, flexographic printing, offset printing and screen printing.

Alternatively, above layer is applied by a coating technique selected from the group consisting of dip coating, knife coating, extrusion coating, spin coating, slide hopper coating and curtain coating.

Inkjet Printing Device

Curable liquids and inks according to a preferred embodiment of the present invention may be jetted by one or more printing heads ejecting small droplets of ink in a controlled manner through nozzles onto an ink-receiver surface, which is moving relative to the printing head(s).

A preferred printing head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet printing heads can be used and include various types, such as a continuous type and thermal, electrostatic and acoustic drop on demand type.

At high printing speeds, the inks must be ejected readily from the printing heads, which puts a number of constraints on the physical properties of the ink, e.g. a low viscosity at the jetting temperature, which may vary from 25° C. to 110° C., a surface energy such that the printing head nozzle can form the necessary small droplets, a homogenous ink capable of rapid conversion to a dry printed area, . . . .

The inkjet printing head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet printing heads or multiple staggered inkjet printing heads which cover the entire width of the ink-receiver surface. In a single pass printing process the inkjet printing heads usually remain stationary and the ink-receiver surface is transported under the inkjet printing heads.

Curing Device

Curable liquids and inks according to a preferred embodiment of the present invention can be cured by exposing them to actinic radiation, by thermal curing and/or by electron beam curing. Curable liquids and inks including a diffusion hindered photoinitiator are preferably cured by radiation curing, more preferably by ultraviolet radiation. Curable liquids and inks including no initiator are cured by electron beam curing.

The curing device may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductor such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1,200 ppm.

Thermal curing can be performed image-wise by use of a thermal head, a heat stylus, hot stamping, a laser beam, etc. If a laser beam is used, then preferably an infrared laser is used in combination with an infrared dye in the curable ink.

When electron beams are employed, the exposure amount of the aforesaid electron beam is preferably controlled to be in the range of 0.1-20 Mrad. An exposure amount of not less than 0.1 Mrad does not result in sufficient curing of the curable liquids and inks. An exposure amount of at not more than 20 Mrad is not preferred because it is able to avoid deteriorating deteriorate supports, especially paper and certain type of plastics. Accepted as electron beam exposure systems are, for example, a scanning system, a curtain beam system, and a broad beam system. Appropriate acceleration voltage during electron beam exposure is 100-300 kV. The most important advantage of using an electron beam exposure system, compared to the ultraviolet radiation exposure, is that for printing on toys and food packaging materials curable liquids and inks lacking an initiator can be used. Hence, no toxicological problems can occure due to extraction of the initiator.

Preparation of Curable Inks

The average particle size and distribution is an important feature for inkjet inks. The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and as much as possible under light conditions in which actinic radiation has been substantially excluded.

The inkjet ink may contain more than one pigment, and may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical device and residence conditions selected, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

EXAMPLES

Materials

All materials used in the following examples were readily available from standard sources such as Aldrich Chemical Co. (Belgium) and Acros (Belgium) unless otherwise specified. The water used was deionized water.

RT355D is an abbreviation for CINQUASIA™ Magenta RT-355-D, a quinacridone pigment, available from CIBA SPECIALTY CHEMICALS.

PY150 is an abbreviation used for CHROMOPHTAL™ Yellow LA2, a C.I. Pigment Yellow 150 pigment from CIBA SPECIALTY CHEMICALS.

PY150-2 is an abbreviation used for Yellow Pigment E4GN-GT, a C.I. Pigment Yellow 150 pigment from LANXESS.

PB15:4 is an abbreviation used for HOSTAPERM™ Blue P-BFS, a C.I. Pigment Blue 15:4 pigment from Clariant.

S35000 is an abbreviation used for SOLSPERSE™ 35000, a polyethyleneimine-polyester hyperdispersant from NOVEON.

S39000 is an abbreviation used for SOLSPERSE™ 39000, a polyethyleneimine-polyester hyperdispersant from NOVEON.

S35000-SOL is a 30% solution of S35000 in VEEA.

S39000-SOL is a 30% solution of S39000 in VEEA.

DB162 is an abbreviation used for the polymeric dispersant DISPERBYK™ 162 available from BYK CHEMIE GMBH whereof the solvent mixture of 2-methoxy-1-methylethylacetate, xylene and n-butylacetate was removed.

VEEA is 2-(vinylethoxy)ethyl acrylate, a difunctional monomer available from NIPPON SHOKUBAI, Japan.

DPGDA is dipropyleneglycoldiacrylate from SARTOMER.

SR489 is tridecyl acrylate from SARTOMER.

M600 is dipentaerythritol hexaacrylate and an abbreviation for MIRAMER™ M600 available from RAHN AG.

M4004 is pentaerythritol ethoxylated tetraacrylate (PPTTA) available from RAHN AG.

SR399LV is a low viscosity dipentaerythritol pentaacrylate and an abbreviation for SARTOMER™ 399LV available from SARTOMER.

MVE is ethyleneglycol monovinylether available from BASF.

DVE is thriethyleneglycol divinylether available from BASF.

MMA is N-decylmethacrylate available from ABCR GMBH.

DMA is tetraethyleneglycol dimethacrylate and an abbreviation for SARTOMER™ 209 available from SARTOMER.

DAET is Bis(b-allyloxyethyl)ether available from PFALTZ & BAUER.

DAES is diallyl succinate available from ALDRICH.

SR256 is 2-(2-ethoxy ethoxy)ethyl acrylate and an abbreviation for SARTOMER™ SR256 available from SARTOMER.

Acryloyloxyethyl succinate available from ALDRICH.

IRGACURE™ 127 is 2-hydroxy-1-{4-[4-(2-hydroxy-2-methyl-propionyl)-benzyl]-phenyl}-2-methyl-propan-1-one, a photoinitiator available from CIBA SPECIALTY CHEMICALS.

DAROCUR™ ITX is 2-isopropyl isothioxanthone, a photo-initiator available from CIBA SPECIALTY CHEMICALS.

DAROCUR™ 1173 is 2-hydroxy-2-methylpropiophenone, a photo-initiator available from CIBA SPECIALTY CHEMICALS.

KIP150 is oligo[2-hydroxy-2-methyl-1-[4-(1-methylvinyl)phenyl]propanone] and an abbreviation for ESACURE™ KIP150 available from LAMBERTI.

GENOPOL™ TX1 is a polymeric thioxanthone derivative, useful as a photoinitiator, available from RAHN AG.

GENOPOL™ AB1 is a polymeric aminobenzoate derivate, useful as a synergist for UV-curable compositions, available from RAHN AG.

Tegosol is a 1 wt % solution of TEGO™ Rad 2100 in VEEA, TEGO™ Rad 2100 is a surfactant available from TEGO CHEMIE SERVICES GMBH.

Byksol is a 1 wt % solution of BYK™-333 in VEEA, BYK™-333 is a surfactant available from BYK CHEMIE GMBH.

BHT is an abbreviation for 2,6-di-tert.butyl-4-methylphenol, available from ALDRICH CHEMICAL CO.

MPH is an abbreviation for 4-methoxyphenol, available from ALDRICH CHEMICAL CO.

GENORAD™ 16 is a polymerization inhibitor from RAHN AG.

PET100 is an 100 μm unsubbed PET substrate with on the backside an antiblocking layer with antistatic properties available from AGFA-GEVAERT N.V. as P100C PLAIN/ABAS.

Measurement Methods

1. TDE-Level

The TDE-level represents the amount of volatile extractables by thermal desorption. The amount of volatile extractables is determined on fully cured coatings by direct thermal desorption method, i.e. without sample preparation. The fully cured coating on a PET100 substrate having a backing layer was analysed with a GERSTEL™ TDS2 ThermoDesorption System from Gerstel Gmbh & Co. KG using as operation conditions: 1.54 cm$^2$ of the cured coating was analyzed during 10 minutes at 150° C. with on-line GC evaluation of peak intensity for the desorbed components. The oven program was set to 40° C. for 30 seconds, followed by a temperature increase at a rate of 15° C./minute until 300° C., and keeping the sample at 300° C. for 5 minutes. The chromatographic column was a Db1 column from J&W (30m×0.32 mm, 1 μm film thickness); the carrier gas was He at a flow rate of 2 mL/min. The desorbed compounds were trapped on TenaxTA at −60° C.

The back coating on the PET100 substrate contained volatile compounds, including NMP. The amount of NMP detected was used as an internal standard to calculate the amount of volatile compounds from the cured coating expressed in ppm (μg extractable compound per g of curable liquid). The amount of volatile compounds of the cured coating is obtained by subtraction of the amount of volatile compounds of the PET100 substrate from the total amount of volatile compounds of cured coating and PET100 substrate. This amount is very much depending upon the composition of the curable liquid. The evaluation scale used for the examples is given by Table 9.

TABLE 9

| Total amount of desorbed components from the cured coating | Evaluation |
|---|---|
| >5,000 ppm | bad |
| >3,000 ppm | poor |
| 1,000-3,000 ppm | acceptable |
| <1,000 ppm | good |
| <500 ppm | very good |

3. Smell

The smell was evaluated by a panel of three persons by their nose.

4. Curing Degree

The curing degree is tested on a coating immediately after curing with UV light. The cured coating is rubbed with the means of a Qtip. When the surface is not damaged, the coating is fully cured. When some of the cured coating can be damaged, the coating is only partly cured. When the whole cured coating is damaged, the coating is not cured.

5. Viscosity

The viscosity of the formulations was measured using a Brookfield DV-II+ viscometer at 25° C. at 3 rotations per minute (RPM) using a CPE 40 spindle. A viscosity of less than 50 mPa·s was regarded to be suitable for inkjet printing.

6. Brittleness

The brittleness is tested on a coating after full curing of the coating with UV light under nitrogen inerting atmosphere. The curable composition is coated on a clear PET film. After curing, the cured coating is bended. Brittle layers peel off in parts from the support, while flexible coatings remain undamaged.

7. Average Particle Size

The average particle size of the pigment dispersions was determined by photon correlation spectroscopy at a wavelength of 633 nm with a 4 mW HeNe laser on a diluted sample of the pigment dispersion. The particle size analyzer used was a MALVERN™ Nano-S available from Goffin-Meyvis.

The sample was prepared by addition of one drop of dispersion to a cuvet containing 1.5 mL ethyl acetate and mixed until a homogenous sample was obtained. The measured particle size is the average value of 3 consecutive measurements consisting of 6 runs of 20 seconds.

8. Stability of the Curable Composition

The stability of the curable composition was evaluated by comparing the viscosity of the freshly prepared composition and the viscosity after a heat treatment of 6 days at 83° C. Very unstable compositions become solid upon this heat treatment. Very stable compositions have a viscosity which has an increase in viscosity limited to 25% of the fresh composition. Since, this is a very severe test, compositions are considered to be stable when the formulation is not solidified at all (not even partly) after the heat treatment.

Example 1

This example illustrates the synthesis of polymerizable compounds A suitable for curable inks in accordance with a preferred embodiment of the present invention. Examples are given for different types of polymerizable compounds.

Polymerizable Compound PC-1.

The synthesis of the allyl ester acrylate compound PC-1 proceeded according to the following scheme:

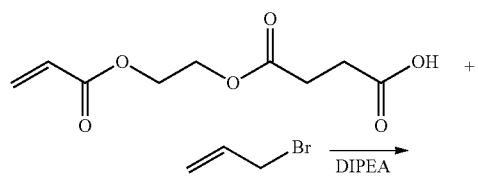

-continued

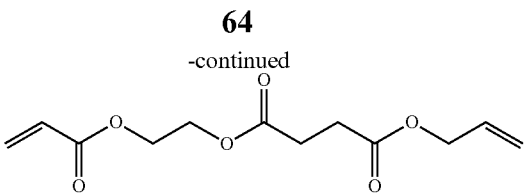

30 g (0.14 mol) of acryloyloxyethyl succinate was dissolved in 150 mL of acetone. 28 mL (0.16 mol) of diisopropyl ethyl amine and 20 mg of BHT were added. 20 g (0.16 mol) of allyl bromide was added and the mixture was refluxed for two hours. The solvent was removed under reduced pressure and the residue was redissolved in 200 mL of methylene chloride. The methylene chloride fraction was extracted twice with 150 mL of 1 N NaOH, once with 150 mL water and twice with 150 mL of 1 N HCl. The organic fraction was dried over $MgSO_4$, 30 mg of BHT was added and the solvent was removed under reduced pressure. PC-1 was purified on a Merck SVP D40-column (Si60 15-40 μm, 90 g) using a step gradient elution from methylene chloride/hexane 30/70 to methylene chloride (15 minutes isocratic 30/70, immediately followed by 34 minutes 100% methylene chloride) using a flow rate of 40 mL/min. 10 mg BHT was added before evaporation of the eluent. 16.6 g of PC-1 was isolated.

Polymerizable Compounds PC-2, PC-3 and PC-4

The allyl ether acrylates PC-2, PC-3 and PC-4 were all prepared in the same manner according to the following scheme:

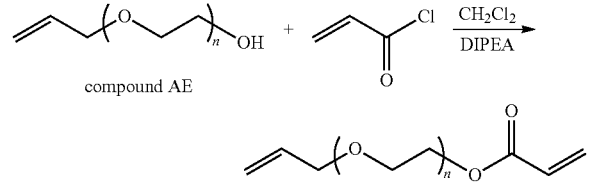

0.14 mol of the appropriate allyl ether (=compound AE) was dissolved in 100 mL of methylene chloride. 29.3 mL (0.17 mol) of diisopropyl ethyl amine in 30 mL of methylene chloride was added. A solution of 14.5 mL (15.93 g, 0.17 mol) acryloyl chloride in 20 mL of methylene chloride was added dropwise, while the temperature was kept between 10 and 20° C. The reaction was allowed to continue for one and a half hour. The reaction mixture was extracted three times with 100 mL of 2N NaOH, once with 100 mL water and two times with 100 mL of 2N HCl. The organic fraction was dried over $MgSO_4$, 20 mg of BHT was added and the solvent was evaporated under reduced pressure.

For polymerizable compound PC-2, the compound AE (n=4) was prepared according to Perret-Aebi et al., Angewandte Chemie, International Edition (2004), 43(34), 4482-4485. PC-2 was purified on a Merck SVP D40-column (Si60 15-40 μm, 90 g) using methylene chloride as eluent at a flow rate of 40 mL/min. 10 mg BHT was added before evaporation of the eluent. 17.25 g of polymerizable compound PC-2 was isolated.

For polymerizable compound PC-3, the compound AE (n=2) was available from FLUKA. The polymerizable compound PC-3 was purified on a Prochrom LC80-system, using Kromasil 60A 10 μm spherical silica. A gradient elution from 100% methylene chloride to methylene chloride/methanol 95/5, over 26 minutes was used, at a flow rate of 150 mL/min. 10 mg BHT was added before evaporation of the eluent.

For polymerizable compound PC-4, the compound AE (n=1) was available from ALDRICH. The polymerizable compound PC-4 was purified on a Merck SVP D40-column (Si60 15-40 μm, 90 g) using a step gradient elution from 100% methylene chloride to methylene chloride/methanol 99/1 (25 min isocratic elution with 100% methylene chloride, immediately followed by elution with methylene chloride/methanol 99/1). 10 mg BHT was added before evaporation of the eluent.

Polymerizable Compound PC-5

The synthesis of the vinyl carbonate acrylate compound PC-5 proceeded according to the following scheme:

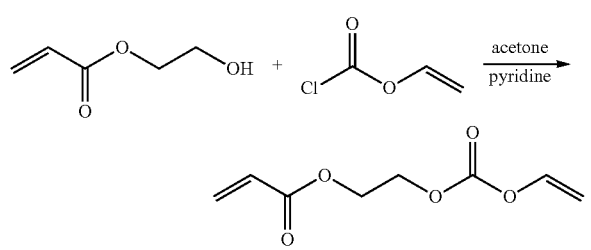

5 g (43 mmol) of hydroxyethyl acrylate was dissolved in 40 mL of acetone. 20 mg of BHT was added and the reaction mixture was cooled to 10° C. 3.5 mL (43 mmol) of pyridine was added, followed by the dropwise addition of 4.6 g (43 mmol) of vinyl chloroformate, while the reaction temperature was kept below 12° C. The reaction was allowed to continue for 2 hours at room temperature. The precipitated pyridine hydrochloride was removed by filtration and the solvent was removed under reduced pressure. The residue was dissolved in 100 mL of ethyl acetate and extracted twice with 50 mL of 0.1 N HCl. The organic fraction was dried over MgSO$_4$ and evaporated under reduced pressure. The polymerizable compound PC-5 was purified on a Prochrom LC80-system, using Kromasil 60A 10 μm spherical silica. Methylene chloride was used as eluent at a flow rate of 150 mL/min. 10 mg BHT was added before evaporation of the eluent. 2.9 g of polymerizable compound PC-5 was isolated.

Polymerizable Compound PC-6

The synthesis of the allyl carbonate acrylate compound PC-6 proceeded according to the following scheme:

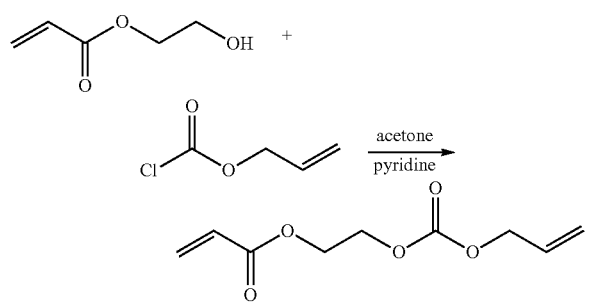

22 g (0.19 mol) of hydroxyethyl acrylate was dissolved in 300 mL of acetone. 0.75 g of BHT and 15.4 mL (0.19 mol) of pyridine were added and the reaction mixture was cooled to 0° C. 22.7 g (0.19 mol) of allyl chloroformate was added dropwise while the reaction temperature was kept below 10° C. The reaction was allowed to continue for 1 hour at room temperature. The precipitated pyridine hydrochloride was removed by filtration and the solvent was evaporated under reduced pressure. The residue was redissolved in 200 mL of ethyl acetate and extracted twice with 0.1 N HCl. The organic fraction was dried over MgSO$_4$ and evaporated under reduced pressure. The polymerizable compound PC-6 was purified on a Prochrom LC80-system, using Kromasil 60A 10 μm spherical silica. Methylene chloride was used as eluent at a flow rate of 150 mL/min. 10 mg BHT was added before evaporation of the eluent. 15 g of polymerizable compound PC-6 was isolated.

Polymerizable Compound PC-9

The synthesis of the fumarate acrylate compound PC-9 proceeded according to the following scheme:

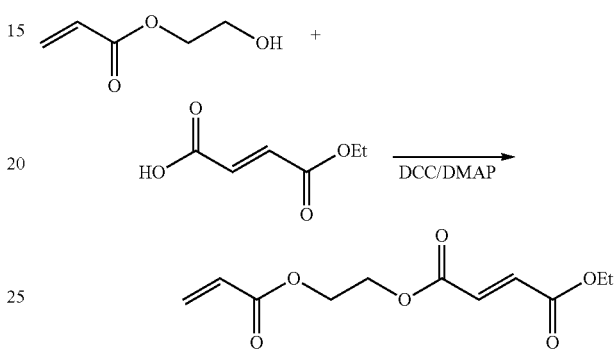

5 g (43 mmol) of hydroxyethyl acrylate, 20 mg of BHT and 7.4 g (52 mmol) of fumaric acid monoethyl ester were dissolved in 100 mL of methylene chloride. The reaction mixture was cooled to 0° C. and a solution of 10.1 g (49 mmol) of DCC (=dicyclohexyl carbodiimid) and 1.9 g (17 mmol) of DMAP (=4-dimethylaminopyridine) in 30 mL of methylene chloride was added, while keeping the reaction temperature below 5° C. The reaction was allowed to continue for 1 hour at 0° C., followed by one and a half hour at room temperature. The reaction mixture was cooled to 0° C. and the precipitated dicyclohexylureum was removed by filtration. The solvent was evaporated under reduced pressure and polymerizable compound PC-9 was purified on a Prochrom LC80-system, using Kromasil 60A 10 μm spherical silica. Methylene chloride was used as eluent at a flow rate of 150 mL/min. 10 mg BHT was added before evaporation of the eluent. 3.46 g of polymerizable compound PC-9 was isolated.

Comparative Polymerizable Compounds

A comparative monomer CM-1 was synthesised according to the following scheme:

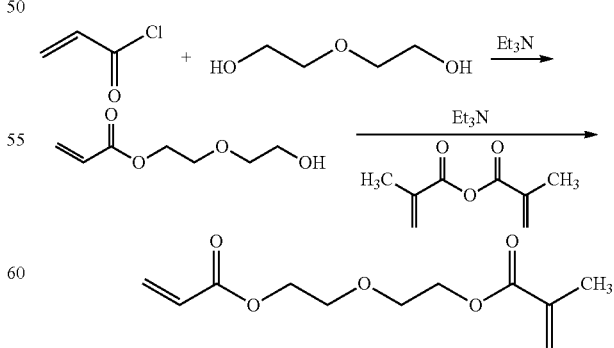

Diethylene Glycol Monoacrylate:

25 g (0.235 mol) of diethylene glycol was dissolved in 150 mL of THF. 18 mL of (0.13 mol) of triethyl amine was added, followed by the dropwise addition of 10.8 g (8 mL, 0.12 mol) of acryloyl chloride. The reaction temperature was kept below 30° C. The reaction was allowed to continue for 2 hours at room temperature. The precipitated triethyl amine hydrochloride was removed by filtration, 100 mg BHT was added and the solvent was removed under reduced pressure. Diethylene glycol monoacrylate was purified on a Prochrom LC80-system, using Kromasil 60A 10 μm spherical silica. Methylene chloride/ethyl acetate 60/40 was used as eluent at a flow rate of 200 mL/min. 10 mg BHT was added before evaporation of the eluent. 9.4 g of diethylene glycol monoacrylate was isolated.

Comparative Monomer CM-1:

8.1 g (51 mmol) of diethylene glycol monoacrylate was dissolved in 40 methylene chloride. 7.7 mL (55 mmol) of triethyl amine and 7.9 g (51 mmol) of methacrylic anhydride were added. The reaction mixture was refluxed for 3 hours. The solvent was evaporated under reduced pressure and Comparative monomer-1 was purified on a Prochrom LC80-system, using Kromasil 60A 10 μm spherical silica. Methylene chloride/ethyl acetate 93/7 was used as eluent at a flow rate of 200 mL/min. 10 mg BHT was added before evaporation of the eluent. 6.5 g of comparative monomer CM-1 was isolated.

Example 2

This example illustrates the influence of the weight percentages of compounds A, B and/or C in the polymerizable composition of the free radical curable liquid.

Preparation of the Free Radical Curable Liquids

All free radical curable liquids COMP-1 to COMP-7 and INV-1 to INV-28 were prepared in the same manner according to Table 10.

The preparation is exemplified for inventive liquid INV-10. Liquid INV-10 was prepared by mixing 58.50 g of VEEA, 9.75 g of DPGDA, 29.25 g of M600 and 2.50 g of INI-C1 as the polymerizable composition for 20 minutes. Then 30 mg of BYK333 was added as a surfactant to the polymerizable composition and the obtained free radical curable liquid was stirred for 30 minutes. All prepared free radical curable liquids contained 30 mg of BYK333 and 2.50 g of photoinitiator.

The compound INI-C1 is a polymerizable photoinitiator having one acrylate group. Therefore, it has to be taken in to account as a compound B for calculating the weight percentages of the compounds A, B and C in the polymerizable composition of the free radical curable liquid. Table 10 shows the weight percentages of all other compounds A, B and/or C in the polymerizable composition, all based upon the total weight of the polymerizable composition.

The polymerizable photoinitiator INI-C1 was prepared according to the synthesis disclosed in Example 2 of DE 3534645 A (MERCK PATENT GMBH).

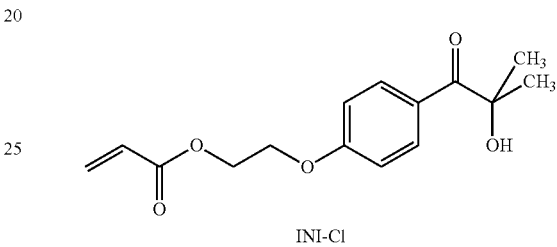

INI-C1

In a number of free radical curable liquids, for example, liquids COMP-1 to COMP-5, the 2.50 g of polymerizable photoinitiator INI-C1 was replaced by 2.50 g of the non-polymerizable, duofunctional photoinitiator IRGACURE™ 127 (=INI-A1 of Table 4). In these cases, the last column of wt % INI-C1 in Table 10 remains empty.

TABLE 10

| Liquid | Compound A | | Compound B | | Compound C | | INI-C1 |
|---|---|---|---|---|---|---|---|
| | Type | wt % | Type | wt % | Type | wt % | wt % |
| COMP-1 | VEEA | 3.05 | DPGDA | 96.95 | — | — | — |
| COMP-2 | VEEA | 27.29 | DPGDA | 72.71 | — | — | — |
| COMP-3 | VEEA | 51.52 | DPGDA | 48.48 | — | — | — |
| COMP-4 | VEEA | 75.76 | DPGDA | 24.24 | — | — | — |
| COMP-5 | VEEA | 41.05 | SR489 | 58.95 | — | — | — |
| COMP-6 | — | — | — | — | M600 | 97.50 | 2.50 |
| COMP-7 | VEEA | 19.50 | — | — | M600 | 78.00 | 2.50 |
| INV-1 | VEEA | 100.00 | — | — | — | — | — |
| INV-2 | VEEA | 78.32 | SR489 | 21.68 | — | — | — |
| INV-3 | VEEA | 79.48 | DPGDA | 20.52 | — | — | — |
| INV-4 | VEEA | 53.63 | — | — | M4004 | 43.87 | 2.50 |
| INV-5 | VEEA | 79.48 | — | — | SR399LV | 20.52 | — |
| INV-6 | VEEA | 79.48 | — | — | M600 | 20.52 | — |
| INV-7 | VEEA | 77.49 | — | — | M600 | 20.01 | 2.50 |
| INV-8 | VEEA | 63.38 | — | — | M600 | 34.12 | 2.50 |
| INV-9 | VEEA | 48.75 | — | — | M600 | 48.75 | 2.50 |
| INV-10 | VEEA | 58.50 | DPGDA | 9.75 | M600 | 29.25 | 2.50 |
| INV-11 | VEEA | 58.51 | DPGDA | 34.12 | M600 | 4.87 | 2.50 |
| INV-12 | VEEA | 58.50 | DPGDA | 37.05 | M600 | 1.95 | 2.50 |
| INV-13 | VEEA | 41.26 | DPGDA | 38.22 | M600 | 20.52 | — |
| INV-14 | VEEA | 39.00 | DPGDA | 29.25 | M600 | 29.25 | 2.50 |
| INV-15 | VEEA | 39.00 | DPGDA | 48.75 | M600 | 9.75 | 2.50 |
| INV-16 | VEEA | 29.25 | DPGDA | 51.19 | M600 | 17.06 | 2.50 |
| INV-17 | VEEA | 58.51 | DPGDA | 34.12 | M4004 | 4.87 | 2.50 |
| INV-18 | VEEA | 24.38 | SR489 | 53.62 | M600 | 19.50 | 2.50 |
| INV-19 | PC-4 | 76.43 | — | — | M600 | 20.52 | — |
| | VEEA | 3.05 | | | | | |
| INV-20 | PC-4 | 48.75 | — | — | — | — | 2.50 |
| | VEEA | 48.75 | | | | | |
| INV-21 | PC-4 | 48.75 | — | — | M600 | 48.75 | 2.50 |

TABLE 10-continued

| Liquid | Compound A Type | Compound A wt % | Compound B Type | Compound B wt % | Compound C Type | Compound C wt % | INI-C1 wt % |
|---|---|---|---|---|---|---|---|
| INV-22 | PC-4 | 63.38 | — | — | M600 | 34.12 | 2.50 |
| INV-23 | PC-4 | 58.50 | DPGDA | 34.12 | M600 | 4.88 | 2.50 |
| INV-24 | PC-1 VEEA | 76.43 3.05 | — | — | M600 | 20.52 | — |
| INV-25 | PC-1 | 48.75 | DPGDA | 48.75 | — | — | 2.50 |
| INV-26 | PC-1 | 48.75 | — | — | M600 | 48.75 | 2.50 |
| INV-27 | PC-1 | 63.38 | — | — | M600 | 34.12 | 2.50 |
| INV-28 | PC-1 | 39.00 | DPGDA | 48.75 | M600 | 9.75 | 2.50 |

Preparation and Evaluation of Cured Samples

The free radical curable liquids COMP-1 to COMP-7 and INV-1 to INV-28 were coated on a PET100 substrate using a bar coater and a 10 μm wired bar. Each coated sample was cured using a Fusion DRSE-120 conveyer, equipped with a Fusion VPS/I600 lamp (D-bulb), which transported the samples twice under the UV-lamp on a conveyer belt at a speed of 10 m/min. The samples were cured under nitrogen inerting conditions. Before a coated sample was placed on the conveyer belt, the coated sample was mounted on a metal plate and on top of the plate a metal frame of 1 cm height with a non UV-absorbing quartz glass window was placed, so that a sealed chamber was formed with the coated sample inside. Then, the trapped air in the chamber was replaced by nitrogen gas by introducing pure nitrogen gas into the chamber for 30 seconds.

All cured samples were found to be fully cured. Each of the cured samples COMP-1 to COMP-7 and INV-1 to INV-28 were then evaluated on their amount of volatile extractables and their brittleness.

The difference between cured samples having high or low amounts of volatile extractables by thermal desorption is immediately apparent from the obtained thermal desorption chromatograms as illustrated in the FIGURE. The top chromatogram "blank" is the thermal desorption chromatogram of the PET100 substrate possessing a backlayer, the middle chromatogram "sample-1" represents the chromatogram obtained for the cured sample of the liquid INV-6 and the bottom chromatogram "sample-2" represents the chromatogram obtained for the cured sample of the liquid COMP-6.

All the results are shown by Table 11.

TABLE 11

| Cured sample of | TDE-level | Viscosity | Brittleness cured ink |
|---|---|---|---|
| COMP-1 | bad | OK | OK |
| COMP-2 | bad | OK | OK |
| COMP-3 | bad | OK | OK |
| COMP-4 | poor | OK | OK |
| COMP-5 | poor | OK | OK |
| COMP-6 | very good | too high | very brittle |
| COMP-7 | poor | too high | very brittle |
| INV-1 | very good | OK | OK |
| INV-2 | good | OK | OK |
| INV-3 | good | OK | OK |
| INV-4 | very good | OK | OK |
| INV-5 | very good | OK | OK |
| INV-6 | very good | OK | OK |
| INV-7 | very good | OK | OK |
| INV-8 | good | OK | OK |
| INV-9 | good | OK | OK |
| INV-10 | very good | OK | OK |
| INV-11 | very good | OK | OK |
| INV-12 | very good | OK | OK |
| INV-13 | good | OK | OK |
| INV-14 | very good | OK | OK |
| INV-15 | very good | OK | OK |
| INV-16 | very good | OK | OK |
| INV-17 | very good | OK | OK |
| INV-18 | very good | OK | OK |
| INV-19 | very good | OK | OK |
| INV-20 | good | OK | OK |
| INV-21 | very good | OK | OK |
| INV-22 | very good | OK | OK |
| INV-23 | very good | OK | OK |
| INV-24 | good | OK | OK |
| INV-25 | good | OK | OK |
| INV-26 | very good | OK | OK |
| INV-27 | very good | OK | OK |
| INV-28 | good | OK | OK |

From Table 11, it should be clear that the weight percentages of compounds A, B and/or C in the polymerizable composition of the free radical curable liquid determine the amount of volatile extractables even when diffusion hindered photoinitiators are used and no other volatile compounds are present.

Example 3

This example illustrates that the addition of a large amount of polymerizable compound not falling under the definition of compounds A, B or C does not lead to curable liquids exhibiting a low amount of extractables after curing.

Preparation of the Free Radical Curable Liquids

All free radical curable liquids COMP-8 to COMP-11 and INV-29 were prepared in the same manner by mixing 67.0 g of VEEA, 20.0 g of a second monomer according to Table 12, 2.5 g of IRGACURE™ 127, 2.5 g of GENOPOL™ TX1, 5.0 g of GENOPOL™ AB1 and 3.0 g of BYKSOL. The free radical curable liquid was stirred for 30 minutes.

The polymerizable composition of the free radical curable liquids COMP-8 to COMP-11 and INV-29 consisted of 77.8 wt % of Compound A (VEEA) and 22.2 wt % of the second monomer based upon the total weight of the polymerizable composition.

Preparation and Evaluation of Cured Samples

Fully cured samples of the free radical curable liquids COMP-8 to COMP-11 and INV-29 were prepared in exactly the same manner as disclosed by EXAMPLE 2.

The amount of volatile extractables by thermal desorption was determined and is shown in Table 12.

TABLE 12

| Cured samples of | Second monomer | TDE-level |
|---|---|---|
| COMP-8 | MVE | bad |
| COMP-9 | DVE | bad |
| COMP-10 | MMA | bad |
| COMP-11 | DMA | bad |
| INV-29 | SR399LV | good |

Table 12 shows that replacement of SR399LV (compound C) by non-acrylated vinylethers or methacrylates does no longer deliver a good TDE-level.

Example 4

This example illustrates that it is necessary that the polymerizable groups G1 and G2 are part of the same polymerizable compound A, and that the polymerizable compound A cannot be replaced by two polymerizable compounds, one having one or more G1-groups and the other one having one or more G2 groups.

Preparation of the Free Radical Curable Liquids

All free radical curable liquids COMP-12 to COMP-15 were prepared in the same manner as in EXAMPLE 3, but using the compounds according to Table 13.

TABLE 13

| wt % of compound | COMP-12 | COMP-13 | COMP-14 | COMP-15 |
|---|---|---|---|---|
| SR256 | 37.25 | 37.25 | — | — |
| MVE | 37.25 | — | — | — |
| DVE | — | 37.25 | — | — |
| DPGDA | — | — | 37.25 | 37.25 |
| DAET | — | — | 37.25 | — |
| DAES | — | — | — | 37.25 |
| SR399LV | 20.00 | 20.00 | — | — |
| M600 | — | — | 20.00 | 20.00 |
| IRGACURE ™ 127 | 2.50 | 2.50 | 2.50 | 2.50 |
| BYKSOL | 3.00 | 3.00 | 3.00 | 3.00 |

Preparation and Evaluation of Cured Samples

The coated samples of the free radical curable liquids COMP-12 to COMP-15 were prepared and cured in the exactly the same manner as disclosed by EXAMPLE 2.

The curing degree was determined for each of the cured samples of the free radical curable liquids COMP-12 to COMP-15. Only the cured samples of the free radical curable liquids COMP-13 and COMP-14 appeared to be fully cured. However, the cured sample of COMP-13 exhibited a strong smell. Therefore, only for the cured sample of COMP-14 was the amount of volatile extractables by thermal desorption determined.

TABLE 14

| Cured sample of | Monomer 1 | Monomer 2 | Curing degree | TDE-level |
|---|---|---|---|---|
| COMP-12 | monoacrylate | monovinylether | partially cured | — |
| COMP-13 | diacrylate | divinylether | fully cured | — |
| COMP-14 | diacrylate | diallylether | fully cured | bad |
| COMP-15 | diacrylate | diallylester | partially cured | — |

The results in Table 14 can be best compared with the result obtained with liquid INV-5 in EXAMPLE 2 for the cured samples of COMP-12 and COMP-13, with liquid INV-19 in EXAMPLE 2 for the cured sample of COMP-14 and with liquid INV-24 in EXAMPLE 2 for the cured sample of COMP-15.

It should be clear from the results of COMP-12 and COMP-13 that the vinylether group and the acrylate group have to be present in the same molecule. The same conclusion can be made for combining an acrylate group and an allylether group in one molecule and for combining an acrylate group and an allylester group in one molecule.

Example 5

This example illustrates that the polymerizable compound A may contain more than one G1 and or G2 group.

Preparation of the Free Radical Curable Liquids

All free radical curable liquids COMP-16 to COMP-18 and INV-30 to INV-34 were prepared in the same manner by mixing 74.5 g of a monomer X according to Table 15, 20.0 g of M600, and 2.5 g of IRGACURE™ 127 and 3.0 g of BYKSOL. The free radical curable liquids were stirred for 30 minutes.

Monomer ADAE:

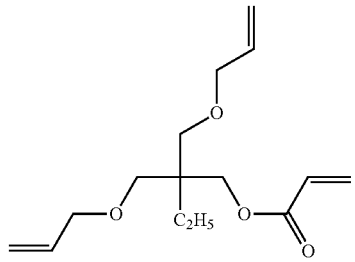 [SMILES: C=CCOCC(CC)(COCC=C)COC(=O)C=C]

Monomer DAAE:

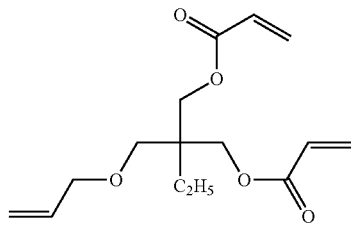 [SMILES: C=CCOCC(CC)(COC(=O)C=C)COC(=O)C=C]

Preparation and Evaluation of Cured Samples

The coated samples of the free radical curable liquids COMP-16 to COMP-18 and INV-30 to INV-34 were prepared and cured in the exactly the same manner as disclosed by EXAMPLE 2.

The curing degree was determined for each of the cured samples. Only the cured samples of the free radical curable liquids COMP-17 and COMP-18 could not or only partially fully cured and therefore the amount of volatile extractables by thermal desorption was determined. The results are shown in Table 15.

TABLE 15

| Cured sample of | Monomer X | # Acrylate groups | Other group(s) Type | # | Curing degree | TDE-level |
|---|---|---|---|---|---|---|
| COMP-16 | DPGDA | 2 | — | 0 | fully cured | bad |
| COMP-17 | DAET | 0 | allylether | 2 | not cured | — |
| COMP-18 | DAES | 0 | allylester | 2 | partially cured | — |
| INV-30 | VEEA | 1 | vinylether | 1 | fully cured | very good |
| INV-31 | PC-4 | 1 | allylether | 1 | fully cured | very good |
| INV-32 | PC-1 | 1 | allylether | 1 | fully cured | good |
| INV-33 | ADAE | 1 | allylether | 2 | fully cured | good |
| INV-34 | DAAE | 2 | allylether | 1 | fully cured | very good |

From Table 15, it should be clear that a low amount of volatile extractables was observed when the monomer fulfilled the requirements of a polymerizable compound A according to a preferred embodiment of the present invention.

Example 6

This example illustrates the effect on the amounts of extractables after curing of the photoinitiator type used in the radiation curable liquids.

Preparation of the Free Radical Curable Liquids

All free radical curable liquids COMP-19 and COMP-20 and INV-35 to INV-42 were prepared in the same manner as in EXAMPLE 3, but using the compounds according to Table 16 and Table 17.

TABLE 16

| wt % of: | COMP-19 | COMP-20 | INV-35 | INV-36 | INV-37 |
|---|---|---|---|---|---|
| VEEA | 74.50 | 74.50 | 74.50 | 74.50 | 74.50 |
| SR399LV | 20.00 | 20.00 | 20.00 | 20.00 | 20.00 |
| DAROCUR ™ ITX | 2.50 | — | — | — | — |
| DAROCUR ™ 1173 | — | 2.50 | — | — | — |
| IRGACURE ™ 127 | — | — | 2.50 | — | — |
| KIP150 | — | — | — | 2.50 | — |
| INI-C1 | — | — | — | — | 2.50 |
| BYKSOL | 3.00 | 3.00 | 3.00 | 3.00 | 3.00 |

TABLE 17

| wt % of: | INV-38 | INV-39 | INV-40 | INV-41 | INV-42 |
|---|---|---|---|---|---|
| VEEA | 72.00 | 67.00 | 62.00 | 67.00 | 67.00 |
| SR399LV | 20.00 | 20.00 | 20.00 | 20.00 | 20.00 |
| IRGACURE ™ 127 | 2.50 | 2.50 | 2.50 | — | — |
| KIP150 | — | — | — | 5.00 | 2.50 |
| INI-C1 | — | — | — | — | 2.50 |
| GENOPOL ™ TX1 | 2.50 | 2.50 | 2.50 | — | — |
| GENOPOL ™ AB1 | — | 5.00 | — | 5.00 | 5.00 |
| COINI-1 | — | — | 10.00 | — | — |
| BYKSOL | 3.00 | 3.00 | 3.00 | 3.00 | 3.00 |

Synthesis of Co-Initiator COINI-1

The synthesis was performed according to the following scheme:

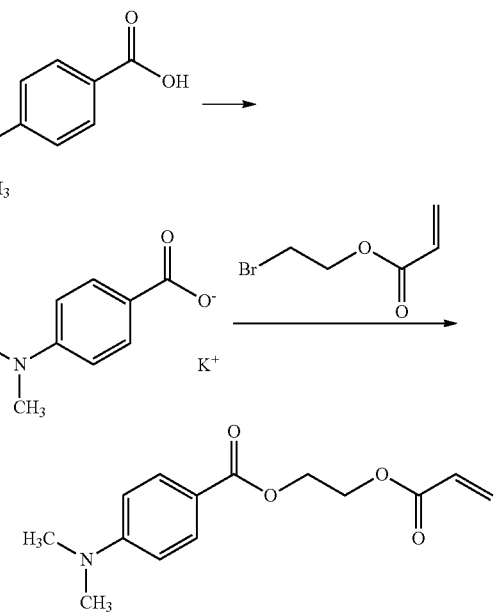

14.2 g (0.215 mol) of 85% KOH was dissolved in 100 mL ethanol. The temperature rose to 30° C. 30 g (0.178 mol) of 4-dimethylamino benzoic acid was added and the mixture was stirred for 90 minutes. The solvent was evaporated under reduced pressure. The residue was treated with 300 mL methyl tert.butyl ether, isolated by filtration and dried.

9.4 g (47 mmol) of 4-dimethylamino benzoic acid potassium salt was added to a solution of 10 g (56 mmol) of 2-bromoethyl acrylate in 40 mL dimethyl acetamide. 1 g of BHT was added and the mixture was heated to 60° C. for 2 hours. The reaction was allowed to cool down to room temperature. The formed potassium bromide was removed by filtration and 150 mL of methyl tert.butyl ether was added. The mixture was extracted with 150 mL of water. The organic fraction was isolated and dried over $MgSO_4$ and evaporated under reduced pressure. The residue was redissolved in 150 mL of methyl tert.butyl ether and extracted with 150 mL of a 1 M $NaHCO_3$-solution. The organic layer was dried over $MgSO_4$ and evaporated under reduced pressure. The residue was treated with water. COINI-1 precipitated from the medium, was isolated by filtration and dried. 4.3 g of COINI-1 was isolated.

Preparation and Evaluation of Cured Samples

Only the cured sample of COMP-19 exhibited a strong smell. All other cured samples exhibited no or moderate smell and were evaluated for their amount of volatile extractables by thermal desorption. The results are shown in Table 18.

TABLE 18

| Cured sample of | Curing degree | Smell | TDE-level | Viscosity |
|---|---|---|---|---|
| COMP-19 | fully cured | strong smell | — | OK |
| COMP-20 | fully cured | moderate smell | bad | OK |
| INV-35 | fully cured | no smell | very good | OK |
| INV-36 | fully cured | moderate smell | good | OK |

TABLE 18-continued

| Cured sample of | Curing degree | Smell | TDE-level | Viscosity |
|---|---|---|---|---|
| INV-37 | fully cured | no smell | very good | OK |
| INV-38 | fully cured | no smell | very good | OK |
| INV-39 | fully cured | no smell | good | OK |
| INV-40 | fully cured | no smell | good | OK |
| INV-41 | fully cured | no smell | good | OK |
| INV-42 | fully cured | no smell | very good | OK |

From Table 18, it is clear that a monofunctional photoinitiator exhibits a large amount of volatile extractables by thermal desorption. Good results were obtained for duo- or polyfunctional photoinitiators and polymeric photoinitiators, but especially with polymerizable photoinitiators a very small amount of volatile extractables by thermal desorption was observed.

Example 7

This example illustrates that the free radical polymerizable composition can be used to prepare free radical curable inkjet inks exhibiting low amounts of extractables after curing.
Preparation of the Cyan Pigment Dispersion C1
A concentrated pigment dispersion C1 was prepared by mixing for 30 minutes the components according to Table 19 in a 1000 mL vessel using a DISPERLUX™ YELLOW075 (from DISPERLUX S.A.R.L., Luxembourg). The vessel was then connected to a EIGER™ Lab Bead mill (from EIGER TORRANCE Ltd.) having a bead filling of 52% with 0.4 mm yttrium stabilized zirconium oxide beads ("high wear resistant zirconia grinding media" from TOSOH Co.) and milling for 100 minutes. After milling the dispersion was separated from the beads using a filter cloth.

TABLE 19

| Component | Quantity |
|---|---|
| PB15:4 | 140.0 g |
| S39000-SOL | 466.7 g |
| Genorad 16 | 14.0 g |
| VEEA | 79.3 g |

The average particle size of the concentrated pigmented dispersions C1 was 109 nm measured with the Malvern Nano-S.
Preparation of the Curable Inks
The comparative pigmented curable ink COMP-21 and the inventive pigmented curable inks INV-43 and INV-44 were prepared by adding to the cyan dispersion C1 the components according to Table 20. The weight % (wt %) of the components are based on the total weight of the curable ink.

TABLE 20

| wt % of: | COMP-21 | INV-43 | INV-44 |
|---|---|---|---|
| C1 | 15.00 | 15.00 | 15.00 |
| VEEA | 18.26 | 59.50 | 59.50 |
| SR399LV | — | 20.00 | — |
| M600 | — | — | 20.00 |

TABLE 20-continued

| wt % of: | COMP-21 | INV-43 | INV-44 |
|---|---|---|---|
| SR256 | 61.24 | — | — |
| IRGACURE ™ 127 | 2.50 | 2.50 | 2.50 |
| Byksol | 3.00 | 3.00 | 3.00 |

Preparation and Evaluation of Cured Samples
Fully cured samples of the comparative pigmented curable ink COMP-21 and the inventive pigmented curable inks INV-43 and INV-44 were prepared in exactly the same manner as disclosed by EXAMPLE 2.
The amount of volatile extractables by thermal desorption was determined and is shown in Table 21.

TABLE 21

| Cured sample of | Curing degree | Smell | TDE-level |
|---|---|---|---|
| COMP-21 | fully cured | strong smell | bad |
| INV-43 | fully cured | no smell | good |
| INV-44 | fully cured | no smell | very good |

From Table 21, it is clear that small amount of volatile extractables by thermal desorption were observed for free radical curable inkjet inks in accordance with a preferred embodiment of the present invention.

Example 8

This example illustrates the synthesis of polymerizable inhibitors for free radical polymerizable compositions fluids and inks in accordance with a preferred embodiment of the present invention.

Synthesis of Stabilizer-1: 2-methyl-propenoic acid 2-[[(2-(4-hydroxy-phenoxy)-ethyl)amino]carbonyl]aminoethyl ester

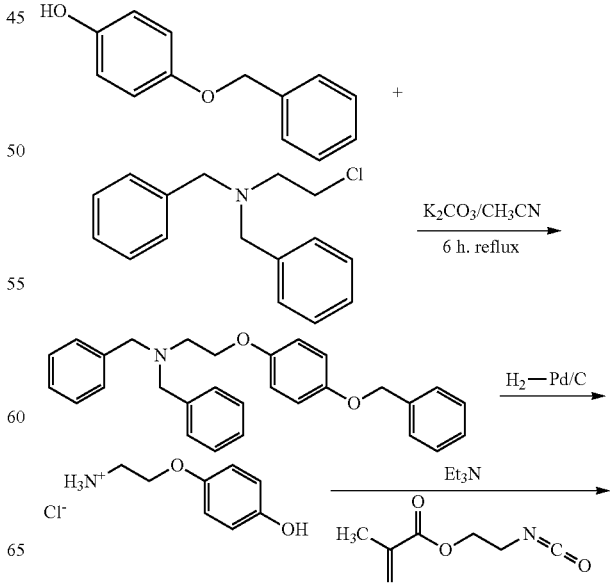

-continued

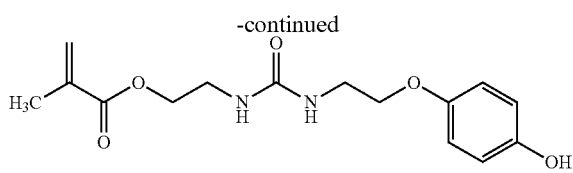

N,N,O-tribenzyl-hydroquinone-mono(2-aminoethyl)-ether: 25 g (84.4 mmol) N,N-dibenzyl-2-chloroethylamine hydrochloride and 34.5 g (250 mmol) $K_2CO_3$ were refluxed in 320 mL acetonitrile. 17.25 g (84.6 mmol) 4-benzyloxyphenol was added and the reaction mixture was refluxed for 6 hours. The reaction mixture was allowed to cool down to room temperature and the precipitated salts were removed by filtration. The solvent was removed under reduced pressure. 36.1 g of the crude N,N,O-tribenzyl-hydroquinone-mono(2-aminoethyl)-ether was isolated. N,N,O-tribenzyl-hydroquinone-mono(2-aminoethyl)-ether was purified using preparative column chromatography (Kieselgel 60, cyclohexane/ethyl acetate: 20/1. 21.1 g (59%) of N,N,O-tribenzyl-hydroquinone-mono(2-aminoethyl)-ether was isolated (m.p.: 45-47° C.).

Hydroquinone-mono(2-aminoethyl)ether chlorohydrate 25.6 g (60.7 mmol) N,N,O-tribenzyl-hydroquinone-mono(2-aminoethyl)-ether was dissolved in hot ethanol. 7.7 mL concentrated hydrochloric acid and 4.7 g Pd/C were added and N,N,O-tribenzyl-hydroquinone-mono(2-aminoethyl)-ether was hydrogenated at 50° C. and under a pressure of 3 atmosphere. The catalyst was removed by filtration and washed with 50 mL ethanol. The solvent was removed under reduced pressure. The residue was treated with 50 mL acetonitrile, isolated by filtration and dried under reduced pressure at 40° C. 9.8 g (85%) of hydroquinone-mono(2-aminoethyl) ether chlorohydrate was isolated (m.p.: 169-171° C.)

2-methyl-propenoic acid 2-[[(2-(4-hydroxy-phenoxy)-ethyl)amino]carbonyl]aminoethyl ester 3 g (16 mmol) hydroquinone-mono(2-aminoethyl)ether chlorohydrate was dissolved in 100 mL methylene chloride. 2.7 mL (19 mmol) triethyl amine was added, followed by the addition of 2.9 mL (19 mmol) 2-methyl-2-pronenoic acid-2-isocyanatoethyl ester. The reaction was allowed to continue for 5 hours at room temperature. The reaction mixture was extracted with 100 mL of a 0.1 N HCl solution, dried over $MgSO_4$ and evaporated under reduced pressure. The crude 2-methyl-propenoic acid 2-[[(2-(4-hydroxy-phenoxy)-ethyl)amino]carbonyl]aminoethyl ester was purified by preparative column chromatography on a Merck SVP D40 column, using a gradient elution from methylene chloride to methylene chloride/methanol 95/5. 2.4 g (49%) of 2-methyl-propenoic acid 2-[[(2-(4-hydroxy-phenoxy)-ethyl)amino]carbonyl] aminoethyl ester was isolated.

Synthesis of Stabilizer-2: of 2-methyl-propenoic acid 2-[[(2-(4-hydroxy-3,5-di tert.butyl-phenyl)-methyl) amino]carbonyl]aminoethyl ester

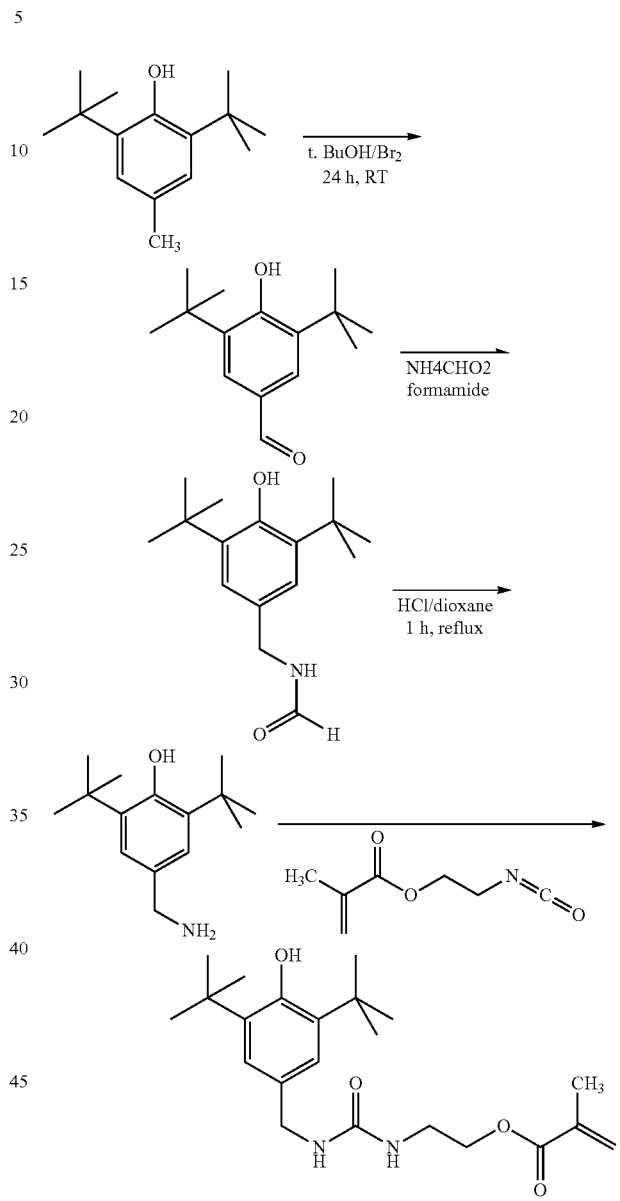

3,5-di-tert.butyl-4-hydroxybenzaldehyde 20 g (91 mmol) 2,6-di-tert.butyl-4-methylphenol was dissolved in 1 l tert.butanol. 9.2 mL (28.9 g, 180 mmol) bromine was added drop wise at room temperature. The reaction is allowed to continue at room temperature for 16 hours. 3,5-di-tert.butyl-4-hydroxybenzaldehyde crystallized from the medium. 3,5-di-tert.butyl-4-hydroxybenzaldehyde was isolated by filtration and dried. 7.82 g 3,5-di-tert.butyl-4-hydroxybenzaldehyde was isolated. The filtrate was concentrated to 150 mL and a second crop crystallized from the medium. 3,5-di-tert.butyl-4-hydroxybenzaldehyde was isolated by filtration and dried. 4.49 g 3,5-di-tert.butyl-4-hydroxybenzaldehyde was isolated. The two fractions of 3,5-ditert.butyl-4-hydroxybenzaldehyde were pooled and 12.31 g (58%) 3,5-di-tert.butyl-4-hydroxybenzaldehyde was isolated (m.p.: 186-8° C.).

N-formyl-3,5-di-tert.butyl-4-hydroxybenzyl-amine

A mixture of 11.09 g (47 mmol) 3,5-di-tert.butyl-4-hydroxybenzaldehyde, 40 g ammonium formate and 40 mL formamide were stirred and heated to 170° C. for 30 minutes. The mixture was allowed to cool down to room temperature and treated with 100 mL water. The crude N-formyl-3,5-di-tert.butyl-4-hydroxybenzyl-amine precipitated from the mixture, was isolated by filtration, washed with water and dried. The crude N-formyl-3,5-di-tert.butyl-4-hydroxybenzyl-amine was recrystallized from toluene/heptane 1/1. 9.36 g (76%) of N-formyl-3,5-di-tert.butyl-4-hydroxybenzyl-amine was isolated (130-1° C.).

3,5-di-tert.butyl-4-hydroxybenzyl amine 9.81 g (37.3 mmol) N-formyl-3,5-di-tert.butyl-4-hydroxybenzyl-amine was dissolved in 24 mL dioxane and 7.2 mL concentrated hydrochloric acid. The mixture was heated to reflux for one hour. The mixture was allowed to cool down to room temperature and diluted with 50 mL water. The mixture was made alkaline, using a 10% ammonia solution. 3,5-di-tert.butyl-4-hydroxybenzyl amine precipitated from the medium, was isolated by filtration and dried. 8.5 g (97%) of 3,5-di-tert.butyl-4-hydroxybenzyl amine was isolated (m.p.: 159-9° C.). 3,5-di-tert.butyl-4-hydroxybenzyl amine has a tendency to lose ammonia upon heating, forming the corresponding di- and tribenzyl derivatives.

2-methyl-propenoic acid 2-[[(2-(4-hydroxy-3,5-di tert.butyl-phenyl)-methyl)amino]carbonyl]aminoethyl ester 4 g (17 mmol) 3,5-di-tert.butyl-4-hydroxybenzyl amine was dissolved in 90 mL methylene chloride. 10 mg BHT was added, followed by the addition of 2.5 mL (17 mmol) 2-methyl-2-pronenoic acid-2-isocyanatoethyl ester. The reaction was allowed to continue for 30 minutes at room temperature. The solvent was removed under reduced pressure. The residue was treated with 200 mL water and the crude 2-methyl-propenoic acid 2-[[(2-(4-hydroxy-3,5-di tert.butyl-phenyl)-methyl)amino]carbonyl]aminoethyl ester was isolated by filtration. 2-methyl-propenoic acid 2-[[(2-(4-hydroxy-3,5-di tert.butyl-phenyl)-methyl)amino]carbonyl]aminoethyl ester was purified by preparative column chromatography on a Merck SVP D40 column, using a gradient elution from methylene chloride to methylene chloride/methanol 90/10. 4.8 g (58%) 2-methyl-propenoic acid 2-[[(2-(4-hydroxy-3,5-di tert.butyl-phenyl)-methyl)amino]carbonyl]aminoethyl ester was isolated.

Synthesis of Stabilizer-3:
N-(4-hydroxy-3,5-dimethyl-benzyl)-methacrylamide

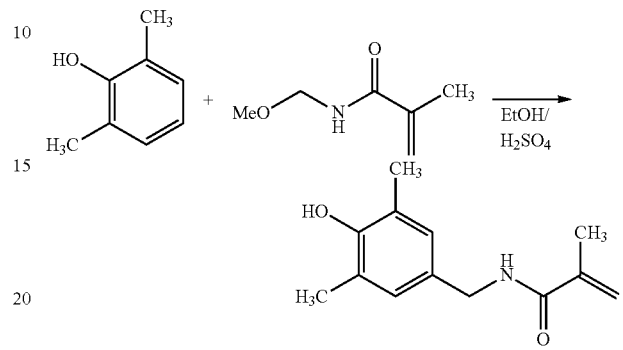

611 g (5 mol) 2,6-dimethyl-phenol was dissolved in 440 mL ethanol. 0.5 g phenothiazine was added as stabilizer. 718 g (5 mol) N-methoxymethyl-acrylamide was added over 15 minutes and the reaction mixture was heated to 55° C. 3 mL concentrated sulfuric acid was added drop wise, while the temperature was kept below 60° C. The reaction mixture was heated to 80° C. over 90 minutes and the reaction was allowed to continue for 5 hours at 80° C. The reaction mixture was allowed to cool down to 60° C. and N-(4-hydroxy-3,5-dimethyl-benzyl)-methacrylamide was forced to crystallize by adding a small amount of N-(4-hydroxy-3,5-dimethyl-benzyl)-methacrylamide. The reaction mixture was further cooled to room temperature and N-(4-hydroxy-3,5-dimethyl-benzyl)-methacrylamide was isolated by filtration. N-(4-hydroxy-3,5-dimethyl-benzyl)-methacrylamide was washed with 180 mL ethanol and dried under reduced pressure at 50° C. 861 g (79%) of N-(4-hydroxy-3,5-dimethyl-benzyl)-methacrylamide was isolated (m.p.: 136-138° C.).

Example 9

This example illustrates the reduction in volatile extractables of the stabilizer from curable compositions including a polymerizable stabilizer compared to a non-polymerizable stabilizer.

Preparation of the Curable Compositions

The comparative liquid curable compositions COMP-22 to COMP-24 and the inventive liquid curable compositions INV-45 to INV-47 were prepared by mixing the components according to Table 22. The weight % (wt %) of the components are based on the total weight of the curable composition.

TABLE 22

| wt % of | COMP-22 | COMP-23 | COMP-24 | INV-45 | INV-46 | INV-47 |
|---|---|---|---|---|---|---|
| VEEA | 74.5 | 73.5 | 73.5 | 73.5 | 73.5 | 73.5 |
| M600 | 20.0 | 20.0 | 20.0 | 20.0 | 20.0 | 20.0 |
| IRGACURE ™ 127 | 2.5 | 2.5 | 2.5 | 2.5 | 2.5 | 2.5 |
| Tegosol | 3.0 | 3.0 | 3.0 | 3.0 | 3.0 | 3.0 |
| BHT | — | 1.0 | — | — | — | — |
| MPH | — | — | 1.0 | — | — | — |
| STAB-1 | — | — | — | 1.0 | — | — |
| STAB-2 | — | — | — | — | 1.0 | — |
| STAB-3 | — | — | — | — | — | 1.0 |

The comparison compositions COMP-23 and COMP-24 include non-polymerizable stabilizers, while to the comparison composition COMP-22 no stabilizer was added.

Evaluation of the Curable Compositions

The comparative curable compositions COMP-22 to COMP-24 and the inventive curable compositions INV-45 to INV-47 were coated on PET100 using a bar coater and a 10 μm wired bar. Each coated sample was cured using a Fusion DRSE-120 conveyer, equipped with a Fusion VPS/1600 lamp (D-bulb), which transported the samples under the UV-lamp on a conveyer belt at a speed of 20 m/min.

The curing was performed under a nitrogen inerting condition. The coated substrate was mounted on the metal plate and on top a metal frame was placed of 1 cm height with a non-UV-absorbing quartz glass window, and then filled during 30 seconds with pure nitrogen gas before the coating was placed on the conveyer belt.

All the samples were completely cured. The volatile extractables were measured according to the method of thermal desorption described above. The results are illustrated in Table 23.

TABLE 23

| Cured sample of | Peak of stabilizer (fragments) | Estimated amount of extracted stabilizer |
| --- | --- | --- |
| COMP-22 | NO | — |
| COMP-23 | YES | 3.8 mg/m² |
| COMP-24 | YES | 4.3 mg/m² |
| INV-45 | NO | — |
| INV-46 | NO | — |
| INV-47 | NO | — |

The thermal desorption spectra of the comparison compositions COMP-2" and COMP-24 include a peak signal appointed to the non-polymerizable stabilizer. The thermal desorption spectra of the inventive samples did not show a peak signal appointed to the polymerizable stabilizer. Therefore, the use of a polymerizable stabilizer is favourable for curable compositions, especially in the case when the amount of extractables needs to be minimized, for instance in the case of printing on food packages.

Example 10

This example illustrates the effect on the stability of a curable composition by the addition of a polymerizable stabilizer in a pigmented ink including a magenta pigment.

Preparation of the Magenta Dispersion CPD1

A concentrated pigment dispersion CPD1 was prepared by mixing for 30 minutes the components according to Table 24 in a 1000 mL vessel using a DISPERLUX™ YELLOW075 (from DISPERLUX S.A.R.L., Luxembourg). The vessel was then connected to a EIGER™ Lab Bead mill (from EIGER TORRANCE Ltd.) having a bead filling of 52% with 0.4 mm yttrium stabilized zirconium oxide beads ("high wear resistant zirconia grinding media" from TOSOH Co.) and milling for 280 minutes. After milling the dispersion was separated from the beads using a filter cloth.

TABLE 24

| Component | Quantity |
| --- | --- |
| RT355D | 160.0 g |
| S39000-sol | 533.3 g |
| Genorad 16 | 8.0 g |
| VEEA | 98.7 g |

The average particle size of the concentrated pigmented dispersions CPD1 was 95 nm measured with the Malvern Nano-S.

Preparation of the Curable Ink

The comparative pigmented curable inks COMP-25 to COMP-28 and the inventive pigmented curable inks INV-48 to INV-50 were prepared by adding to the magenta dispersion the components according to Table 25. The weight % (wt %) of the components are based on the total weight of the curable ink.

TABLE 25

| wt % of | COMP-25 | COMP-26 | COMP-27 | COMP-28 | INV-48 | INV-49 | INV-50 |
| --- | --- | --- | --- | --- | --- | --- | --- |
| CPD1 | 20.0 | 20.0 | 20.0 | 20.0 | 20.0 | 20.0 | 20.0 |
| VEEA | 54.5 | 53.5 | 53.5 | 53.5 | 53.5 | 53.5 | 53.5 |
| M600 | 20.0 | 20.0 | 20.0 | 20.0 | 20.0 | 20.0 | 20.0 |
| IRGACURE ™ 127 | 2.5 | 2.5 | 2.5 | 2.5 | 2.5 | 2.5 | 2.5 |
| Byksol | 3.0 | 3.0 | 3.0 | 3.0 | 3.0 | 3.0 | 3.0 |
| BHT | — | 1.0 | — | — | — | — | — |
| MPH | — | — | 1.0 | — | — | — | — |
| GENORAD ™ 16 | — | — | — | 1.0 | — | — | — |
| STAB-1 | — | — | — | — | 1.0 | — | — |
| STAB-2 | — | — | — | — | — | 1.0 | — |
| STAB-3 | — | — | — | — | — | — | 1.0 |

The comparison inks COMP-26 to COMP-28 include non-polymerizable stabilizers, while to the comparison ink COMP-25 no stabilizer was added.

Evaluation of the Curable Inks

The stability of the curable inks was evaluated according to the method described above.

The results are given in Table 26.

TABLE 26

| Curable ink | Viscosity of fresh formulation | Viscosity after 6 days at 83° C. |
| --- | --- | --- |
| COMP-25 | 15.3 | solid |
| COMP-26 | 18.0 | solid |
| COMP-27 | 14.6 | solid |
| COMP-28 | 14.6 | solid |

TABLE 26-continued

| Curable ink | Viscosity of fresh formulation | Viscosity after 6 days at 83° C. |
|---|---|---|
| INV-48 | 15.4 | 19.8 |
| INV-49 | 13.1 | 23.2 |
| INV-50 | 9.6 | 11.8 |

From Table 26, it should be clear that the inventive inks INV-48 to INV-50 exhibit an improved stability compared to the comparison inks formulated from the same concentrated magenta pigment dispersion. Since the jetting process of inkjet inks, is very dependent upon the ink viscosity, the inventive polymerizable stabilizers deliver an improvement of viscosity stability in order to prevent that aged inkjet inks are not jettable anymore because unstable curable inkjet inks increase in ink viscosity and even can solidify.

Example 11

This example illustrates the effect on the stability by the addition of a polymerizable stabilizer in a pigmented ink including a yellow pigment.

Preparation of the Yellow Dispersion CPD2

A concentrated pigment dispersion CPD2 was prepared by mixing for 30 minutes the components according to Table 27 in a 1000 mL vessel using a DISPERLUX™ YELLOW075 (from DISPERLUX S.A.R.L., Luxembourg). The vessel was then connected to a EIGER™ Lab Bead mill (from EIGER TORRANCE Ltd.) having a bead filling of 52% with 0.4 mm yttrium stabilized zirconium oxide beads ("high wear resistant zirconia grinding media" from TOSOH Co.) and milling for 200 minutes. After milling the dispersion was separated from the beads using a filter cloth.

TABLE 27

| Component | Quantity |
|---|---|
| PY150 | 140.0 g |
| S35000-SOL | 466.7 g |
| GENORAD ™ 16 | 7.0 g |
| VEEA | 86.3 g |

The average particle size of the concentrated pigmented dispersions CPD2 was 160 nm measured with the Malvern Nano-S.

Preparation of the Curable Inks

The comparative pigmented curable inks COMP-29 to COMP-31 and the inventive pigmented curable inks INV-51 and INV-52 were prepared by adding to the yellow dispersion CPD2 the components according to Table 28. The weight % (wt %) of the components are based on the total weight of the curable composition.

TABLE 28

| wt % of | COMP-29 | COMP-30 | COMP-31 | INV-51 | INV-52 |
|---|---|---|---|---|---|
| CPD2 | 15.0 | 15.0 | 15.0 | 15.0 | 15.0 |
| VEEA | 58.5 | 57.5 | 56.5 | 58.5 | 56.5 |
| M600 | 20.0 | 20.0 | 20.0 | 20.0 | 20.0 |
| IRGACURE ™ 127 | 2.5 | 2.5 | 2.5 | 2.5 | 2.5 |
| Tegosol | 3.0 | 3.0 | 3.0 | 3.0 | 3.0 |
| BHT | 1.0 | 2.0 | 3.0 | — | — |
| STAB-1 | — | — | — | 1.0 | 3.0 |

Evaluation of the Curable Inks

The stability of the curable inks was evaluated according to the method described above.

The results are given in Table 29.

TABLE 29

| Curable ink | Viscosity of fresh formulation | Viscosity after 6 days at 83° C. |
|---|---|---|
| COMP-29 | 30.6 | solid |
| COMP-30 | 30.6 | solid |
| COMP-31 | 30.6 | solid |
| INV-51 | 30.6 | solid |
| INV-52 | 30.6 | 28.7 |

The results of Table 29 illustrate that the use of the conventional non-polymerizable stabilizer BHT did not stabilize the ink, even in a relative high amount (3 wt %) (formulations COMP-29 to COMP-31). The yellow pigmented ink was stabilized by the addition of 3 wt % of the inventive STAB-1 (ink INV-52). For some unknown reason, it was found that polymerizable inhibitors were more efficient. Since the jetting process of inkjet inks, is very dependent upon the ink viscosity, the inventive polymerizable stabilizers deliver an improvement of viscosity stability in order to prevent that aged inkjet inks are not jettable anymore because unstable curable inkjet inks increase in ink viscosity and even can solidify.

Preparation of the Yellow Dispersion CPD3

A concentrated pigment dispersion CPD3 was prepared by mixing for 30 minutes the components according to Table 30 in a 1000 mL vessel using a DISPERLUX™ YELLOW075 (from DISPERLUX S.A.R.L., Luxembourg). The vessel was then connected to a EIGER™ Lab Bead mill (from EIGER TORRANCE Ltd.) having a bead filling of 52% with 0.4 mm yttrium stabilized zirconium oxide beads ("high wear resistant zirconia grinding media" from TOSOH Co.) and milling for 220 minutes. After milling the dispersion was separated from the beads using a filter cloth.

TABLE 30

| Component | Quantity |
|---|---|
| PY150-2 | 140.0 g |
| S35000-SOL | 466.7 g |
| GENORAD ™ 16 | 7.0 g |
| VEEA | 86.3 g |

The average particle size of the concentrated pigmented dispersions CPD3 was 136 nm measured with the Malvern Nano-S.

Preparation of the Curable Inks

The comparative pigmented curable inks COMP-32 to COMP-34 and the inventive pigmented curable inks INV-53 and INV-54 were prepared by adding to the yellow dispersion CPD3 the components according to Table 31. The weight % (wt %) of the components are based on the total weight of the curable composition.

TABLE 31

| wt % of | COMP-32 | COMP-33 | COMP-34 | INV-53 | INV-54 |
|---|---|---|---|---|---|
| CPD3 | 15.0 | 15.0 | 15.0 | 15.0 | 15.0 |
| VEEA | 58.5 | 57.5 | 56.5 | 58.5 | 56.5 |
| M600 | 20.0 | 20.0 | 20.0 | 20.0 | 20.0 |

TABLE 31-continued

| wt % of | COMP-32 | COMP-33 | COMP-34 | INV-53 | INV-54 |
|---|---|---|---|---|---|
| IRGACURE ™ 127 | 2.5 | 2.5 | 2.5 | 2.5 | 2.5 |
| Tegosol | 3.0 | 3.0 | 3.0 | 3.0 | 3.0 |
| BHT | 1.0 | 2.0 | 3.0 | — | — |
| STAB-1 | — | — | — | 1.0 | 3.0 |

Evaluation of the Curable Inks

The stability of the curable inks was evaluated according to the method described above.

The results are given in Table 32.

TABLE 32

| Curable ink | Viscosity of fresh formulation | Viscosity after 6 days at 83° C. |
|---|---|---|
| COMP-32 | 28.4 | solid |
| COMP-33 | 28.4 | solid |
| COMP-34 | 28.4 | solid |
| INV-53 | 28.4 | solid |
| INV-54 | 28.4 | 23.1 |

Table 32 illustrated that the results are comparable for the first and second yellow pigment inks (compare with Table 8). Also now, the yellow pigmented ink was not stabilized by 3 wt % BHT (formulation COMP-34), while it was already stable with 3 wt % STAB-1 (formulation INV-54).

Example 12

This example illustrates the effect on the stability by the addition of a polymerizable stabilizer in a pigmented ink including a cyan pigment.

Preparation of the Cyan Dispersion CPD4

A concentrated pigment dispersion CPD4 was prepared by mixing for 30 minutes the components according to Table 33 in a 1000 mL vessel using a DISPERLUX™ YELLOW075 (from DISPERLUX S.A.R.L., Luxembourg). The vessel was then connected to a EIGER™ Lab Bead mill (from EIGER TORRANCE Ltd.) having a bead filling of 52% with 0.4 mm yttrium stabilized zirconium oxide beads ("high wear resistant zirconia grinding media" from TOSOH Co.) and milling for 100 minutes. After milling the dispersion was separated from the beads using a filter cloth.

TABLE 33

| Component | Quantity |
|---|---|
| PB15:4 | 140.0 g |
| S35000-SOL | 466.7 g |
| GENORAD ™ 16 | 7.0 g |
| VEEA | 86.3 g |

The average particle size of the concentrated pigmented dispersions CPD4 was 139 nm measured with the Malvern Nano-S.

Preparation of the Curable Inks

The comparative pigmented curable inks COMP-35 and the inventive pigmented curable ink INV-55 were prepared by adding to the cyan dispersion CPD4 the components according to Table 34. The weight % (wt %) of the components are based on the total weight of the curable composition.

TABLE 34

| wt % of | COMP-35 | INV-55 |
|---|---|---|
| CPD4 | 15.0 | 15.0 |
| VEEA | 52.0 | 51.0 |
| M600 | 20.0 | 20.0 |
| IRGACURE ™ 127 | 2.5 | 2.5 |
| GENOPOL ™ TX-1 | 2.5 | 2.5 |
| GENOPOL ™ AB-1 | 5.0 | 5.0 |
| Tegosol | 3.0 | 3.0 |
| STAB-1 | — | 1.0 |

Evaluation of the Curable Inks

The stability of the curable inks was evaluated according to the method described above.

The results are given in Table 35.

TABLE 35

| Curable ink | Viscosity of fresh formulation | Viscosity after 6 days at 83° C. |
|---|---|---|
| COMP-35 | 18.1 | solid |
| INV-55 | 18.1 | 25.4 |

Table 35 illustrates that also a cyan ink can be stabilized with the use of the inventive polymerizable stabilizer STAB-1 (ink INV-55), while the ink without stabilizer is not stable (formulation COMP-35). Since the jetting process of inkjet inks, is very dependent upon the ink viscosity, the inventive polymerizable stabilizers deliver an improvement of viscosity stability in order to prevent that aged inkjet inks are not jettable anymore because unstable curable inkjet inks increase in ink viscosity and even can solidify.

Example 13

This example illustrates the effect of the amount of an inventive polymerizable stabilizer to a pigmented ink including a magenta pigment on the curing speed of the curable ink.

Preparation of the Curable Inks

The concentrated magenta pigment dispersion CPD1 of EXAMPLE 10 was used to prepare the inks according to Table 36. The weight % (wt %) of the components are based on the total weight of the curable composition.

TABLE 36

| wt % of | INV-56 | INV-57 | INV-58 | INV-59 |
|---|---|---|---|---|
| CPD1 | 20.0 | 20.0 | 20.0 | 20.0 |
| VEEA | 51.5 | 48.5 | 42.5 | 30.5 |
| M600 | 20.0 | 20.0 | 20.0 | 20.0 |
| IRGACURE ™ 127 | 2.5 | 2.5 | 2.5 | 2.5 |
| Tegosol | 3.0 | 3.0 | 3.0 | 3.0 |
| STAB-1 | 3.0 | 6.0 | 12.0 | 24.0 |

Evaluation of the Curable Inks

The inventive curable inks INV-56 to INV-59 were coated on PET100 using a bar coater and a 10 μm wired bar. Each coated sample was cured using a Fusion DRSE-120 conveyer, equipped with a Fusion VPS/1600 lamp (D-bulb), which transported the samples under the UV-lamp on a conveyer belt at a speed of 20 m/min. The curing was performed twice, a first time under ambient air condition, the second time under nitrogen inerting condition.

For curing under a nitrogen inerting condition, the coated substrate was mounted on the metal plate and on top a metal frame was placed of 1 cm height with a non-UV-absorbing quartz glass window, and then filled during 30 seconds with pure nitrogen gas before the coating was placed on the conveyer belt.

The results are given in Table 37.

TABLE 37

| Cured sample of | Curing under ambient air condition | Curing under nitrogen inerting condition |
|---|---|---|
| INV-56 | fully cured | fully cured |
| INV-57 | partially cured | fully cured |
| INV-58 | partially cured | fully cured |
| INV-59 | partially cured | fully cured |

Table 37 illustrates the effect on the possibility to cure the pigmented ink, even in the case of a very high amount of stabilizer added to the pigmented ink. Under nitrogen inerting condition, the curing is complete, even in the case of 24 wt % STAB-1 (ink INV-59). Thus, the ability to stabilize the pigmented ink against unwanted polymerization during the storage of the ink by the addition of the polymerizable stabilizer appears not to be accompanied by a loss in curing speed under nitrogen inerting condition.

Example 14

This example illustrates the effect of a polymerizable compound A having an acrylate group and a methacrylate group on the level of extractables.

Preparation of the Free Radical Curable Liquids

The free radical curable liquids COMP-36 and COMP-37 were prepared in the same manner as in EXAMPLE 3, but using the compounds according to Table 38.

TABLE 38

| wt % of | COMP-36 | COMP-37 |
|---|---|---|
| CM-1 | 94.50 | 74.50 |
| M600 | — | 20.00 |
| IRGACURE ™ 127 | 2.50 | 2.50 |
| BYKSOL | 3.00 | 3.00 |

The synthesis of the polymerizable compound CM-1 is given above in EXAMPLE 1. The copolymerization parameters $r_1$ for methyl acrylate and $r_2$ for methylmethacrylate are 0.4 respectively 2.2, resulting in a copolymerization ratio $r_2/r_1$ of 5.5 or thus larger than 0.200.

Preparation and Evaluation of Cured Samples

The coated samples of the free radical curable liquids COMP-36 and COMP-37 were prepared and cured in the exactly the same manner as disclosed by EXAMPLE 2.

The curing degree was determined for the cured samples of the free radical curable liquids COMP-36 and COMP-37. Both cured samples of the free radical curable liquids COMP-36 and COMP-37 appeared to be fully cured. However, the cured sample of COMP-36 exhibited a strong smell. The amount of volatile extractables by thermal desorption was determined for both cured samples. The results are shown in Table 39.

TABLE 39

| Cured sample of | Curing degree | TDE-level |
|---|---|---|
| COMP-36 | fully cured | bad |
| COMP-37 | fully cured | poor |

The results in Table 39 show that a monomer having an acrylate group and a methacrylate group with a copolymerization ratio $r_2/r_1$ larger than 0.200 cannot replace the polymerizable compound A.

Example 15

This example illustrates that free radical curable inks in accordance with a preferred embodiment of the present invention, but lacking an initiator can be fully cured by using electron beam curing to exhibit low amounts of extractables.

Preparation of the Cyan Dispersion CPD5

4.0 kg of the polymeric dispersant DB162 and 267 g of the polymerization inhibitor GENORAD™ 16 were dissolved in 18.4 kg of DPGDA in a vessel of 50 L. 8.0 kg of cyan pigment PB15:4 was added to the solution and stirred for 10 minutes using a DISPERLUX™ disperser (from DISPERLUX S.A.R.L., Luxembourg). The vessel was then connected to a NETZSCH™ LMZ10 mill (from NETZSCH-Feinmahltechnik GmbH, Germany) having an internal volume of 10 L filled for 52% with 0.4 mm yttrium stabilized zirconia beads ("high wear resistant zirconia grinding media" from TOSOH Co.). The mixture was circulated over the mill for 245 minutes at a rotation speed in the mill of about 15 m/s. During the complete milling procedure the content of the mill was cooled to a temperature of 42° C. The concentrated pigment dispersion CPD5 was discharged into another 60 L vessel. After circulating it over the mill, 13.3 kg of a 30 wt % solution of DB162 in DPGDA was added to the dispersion. The resulting concentrated pigment dispersion CPD5 according to Table 40 exhibited an average particle size of 110 nm.

TABLE 40

| wt % of | dispersion CPD5 |
|---|---|
| PB15:4 | 15 |
| Disperbyk162-sol | 15 |
| Genorad 16 | 1 |
| DPGDA | 69 |

Preparation of the Cyan Dispersion CPD6

A concentrated pigment dispersion CPD6 was prepared by mixing for 30 minutes the componentw according to Table 41 in a 1000 mL vessel using a DISPERLUX™ YELLOW075 (from DISPERLUX S.A.R.L., Luxembourg). The vessel was then connected to a EIGER™ Lab Bead mill (from EIGER TORRANCE Ltd.) having abead filling of 52% with 0.4 mm yttrium stabilized zirconium beads ("high wear resistant zirconia grinding media" from TOSOH Co.) and milling for 100 minutes. After milling the dispersion was separated from the beads using a filter cloth.

TABLE 41

| Component | dispersion CPD6 |
|---|---|
| PB15:4 | 140.0 g |
| S35000-sol | 466.7 g |
| Genorad 16 | 7.0 g |
| VEEA | 86.3 g |

Preparation of the Curable Inks

The comparative pigmented curable ink COMP-38 and the inventive pigmented curable ink INV-60 were prepared by adding to the concentrated cyan dispersion CPD5 respectively CPD6 the components according to Table 42. The weight % (wt %) of the components are based on the total weight of the curable ink

TABLE 42

| wt % of component: | COMP-38 | INV-60 |
|---|---|---|
| dispersion CPD5 | 15.20 | — |
| dispersion CPD6 | — | 13.04 |
| DPGDA | 84.80 | — |
| VEEA | — | 69.57 |
| M600 | — | 17.39 |

Evaluation of the Curable Inks

The comparative pigmented curable ink COMP-38 and the inventive pigmented curable ink INV-60 were coated on PET100 using a bar coater and a 10 μm wired bar.

The coating was first brought into a nitrogen inerting condition by a flow of nitrogen gas of 4.5 bar which was led to the sample chamber of the EB-equipment to replace air by nitrogen, and then the coating was transported to be cured by the EB.

The coating was cured with e-beam using Dürr EB-equipment at an accelerating voltage of 180 kV and a current of 7 mA at a transport speed of 14 m/min, resulting in a dose of 60 kGy.

The amount of volatile extractables by thermal desorption was determined and is shown in Table 43.

TABLE 43

| Cured sample of | Curing degree | TDE-level |
|---|---|---|
| COMP-38 | fully cured | bad |
| INV-60 | fully cured | acceptable |

From Table 43, it is clear that small amount of volatile extractables by thermal desorption were observed for a free radical curable inkjet ink in accordance with a preferred embodiment of the present invention lacking a initiator and cured by electron beam.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A free radical curable liquid for use in printing, the free radical curable liquid comprising:
   no initiator or one or more initiators selected from the group consisting of polymeric initiators and polymerizable initiators;
   a polymerizable composition consisting essentially of:
   25-100 wt % of one or more polymerizable compounds A including at least one acrylate group G1 and at least one ethylenically unsaturated polymerizable functional group G2 different from the group G1;
   one or more polymerizable compounds B selected from the group consisting of monofunctional acrylates and difunctional acrylates in an amount up to 55 wt %; and
   0-55 wt % of one or more polymerizable compounds C selected from the group consisting of trifunctional acrylates, tetrafunctional acrylates, pentafunctional acrylates, and hexafunctional acrylates, wherein if the weight percentage of compounds B>24 wt %, then the weight percentage of compounds C>1 wt %; wherein
   all weight percentages of A, B, and C are based upon a total weight of the polymerizable composition;
   at least one polymerizable compound B or C is present in the polymerizable composition if the free radical curable liquid contains no initiator; and
   the polymerizable compound A has a copolymerization ratio of $0.002 < r_2/r_1 < 0.200$ with $r_1$ and $r_2$ representing copolymerization parameters of methyl-G1 and methyl-G2, respectively, determined according to a method of Kelen-Tudos if the combination of G1 and G2 is not listed in the following Table:

TABLE

| G1-group | G2-group | $r_1$ | $r_2$ |
|---|---|---|---|
| acrylate | allylether | 11.0 | 0.04 |
| acrylate | allylester | 11.0 | 0.04 |
| acrylate | allylcarbonate | 10.2 | 0.04 |
| acrylate | vinylether | 3.6 | 0.02 |
| acrylate | vinylester | 3.5 | 0.02 |
| acrylate | vinylcarbonate | 3.5 | 0.02 |
| acrylate | fumarate | 1.9 | 0.09 |
| acrylate | maleate | 1.9 | 0.09. |

2. The free radical curable liquid according to claim 1, wherein the compound A is represented by the Formula (I):

Formula (I)

wherein
GX and GY are independently selected from the group consisting of G1 and G2;
n and m are independently selected integers having a value of 0 or 1; and
L represents a (n+m+2)-valent linking group including at least one carbon atom.

3. The free radical curable liquid according to claim 2, wherein the integers n and m both have a value equal to 0.

4. The free radical curable liquid according to claim 1, wherein a molecular weight of compound A is smaller than 800 Dalton.

5. The free radical curable liquid according to claim 1, wherein the ethylenically unsaturated polymerizable functional group G2 is a vinyl ether group.

6. The free radical curable liquid according to claim 1, wherein the polymerizable composition includes 60 wt % to 90 wt % of one or more polymerizable compounds A and 10 wt % to 40 wt % of one or more polymerizable compounds C.

7. The free radical curable liquid according to claim 1, wherein the liquid includes a polymerizable photoinitiator.

8. The free radical curable liquid according to claim 1, wherein the liquid includes a polymerizable co-initiator and/or a polymerizable inhibitor.

9. A free radical curable liquid for use in printing, the free radical curable liquid comprising:
no initiator or one or more initiators selected from the group consisting of polymeric initiators and polymerizable initiators;
a polymerizable composition consisting essentially of:
25-100 wt % of one or more polymerizable compounds A including at least one acrylate group G1 and at least one ethylenically unsaturated polymerizable functional group G2 different from the group G1;
0-55 wt % of one or more polymerizable compounds B selected from the group consisting of monofunctional acrylates and difunctional acrylates; and
0-55 wt % of one or more polymerizable compounds C selected from the group consisting of trifunctional acrylates, tetrafunctional acrylates, pentafunctional acrylates, and hexafunctional acrylates, wherein if the weight percentage of compounds B>24 wt %, then the weight percentage of compounds C>1 wt %; wherein
all weight percentages of A, B, and C are based upon a total weight of the polymerizable composition;
at least one polymerizable compound B or C is present in the polymerizable composition if the free radical curable liquid contains no initiator; and
the polymerizable compound A has a copolymerization ratio of $0.002 < r_2/r_1 < 0.200$ with $r_1$ and $r_2$ representing copolymerization parameters of methyl-G1 and methyl-G2, respectively, determined according to a method of Kelen-Tudos if the combination of G1 and G2 is not listed in the following Table:

TABLE

| G1-group | G2-group | $r_1$ | $r_2$ |
|---|---|---|---|
| acrylate | allylether | 11.0 | 0.04 |
| acrylate | allylester | 11.0 | 0.04 |
| acrylate | allylcarbonate | 10.2 | 0.04 |
| acrylate | vinylether | 3.6 | 0.02 |
| acrylate | vinylester | 3.5 | 0.02 |
| acrylate | vinylcarbonate | 3.5 | 0.02 |
| acrylate | fumarate | 1.9 | 0.09 |
| acrylate | maleate | 1.9 | 0.09 | wherein the liquid includes a polymerizable co-initiator and/or a polymerizable inhibitor; and
the polymerizable inhibitor is a polymerizable phenolic polymerization inhibitor according to formula (II):

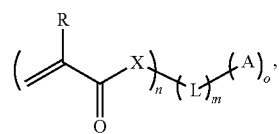

Formula (II)

wherein
R represents a hydrogen or a methyl group;
X represents O or $NR_1$;
m represents 0 or 1;
n represents an integer from 1 to 5;
o represents an integer from 1 to 6;
A represents a substituted or unsubstituted phenolic moiety;
L represents a (n+o)-valent linking group including a maximum of 20 carbon atoms; and
$R_1$ represents a group selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl group, and a substituted or unsubstituted heteroaryl group.

10. A free radical curable printing ink comprising:
a colorant; and
the free radical curable liquid according to claim 1.

11. The free radical curable printing ink according to claim 10, wherein the colorant includes a pigment.

12. A packaging material for packaging food comprising:
a cured layer of the free radical curable printing ink according to claim 10.

13. A printing method comprising:
providing the free radical curable liquid as defined by claim 1; and
applying a layer of the free radical curable liquid on a substrate.

14. The printing method according to claim 13, wherein the layer includes a pigment.

15. The printing method according to claim 13, wherein the layer is a white layer including a titanium dioxide pigment.

16. The printing method according to claim 13, wherein the layer is applied by:
a printing technique selected from the group consisting of inkjet printing, flexographic printing, offset printing, and screen printing; or
a coating technique selected from the group consisting of dip coating, knife coating, extrusion coating, spin coating, slide hopper coating, and curtain coating.

17. The printing method according to claim 13, further comprising the step of curing the layer with electron beams.

* * * * *